US009413820B2

(12) United States Patent
Chang et al.

(10) Patent No.: US 9,413,820 B2
(45) Date of Patent: *Aug. 9, 2016

(54) TERMINAL AND CONTROLLING METHOD THEREOF

(71) Applicant: LG ELECTRONICS INC., Seoul (KR)

(72) Inventors: Jae Young Chang, Seoul (KR); Min Jung Kim, Seoul (KR); Jin Ho Son, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,628

(22) Filed: Jul. 16, 2015

(65) Prior Publication Data

US 2015/0326706 A1    Nov. 12, 2015

Related U.S. Application Data

(63) Continuation of application No. 14/543,722, filed on Nov. 17, 2014, which is a continuation of application No. 12/545,376, filed on Aug. 21, 2009, now Pat. No. 8,914,462.

(30) Foreign Application Priority Data

Apr. 14, 2009    (KR) ........................ 10-2009-0032283
Jun. 9, 2009    (KR) ........................ 10-2009-0051175
Jun. 17, 2009    (KR) ........................ 10-2009-0053945
Jun. 17, 2009    (KR) ........................ 10-2009-0053946

(51) Int. Cl.
*G06F 15/16*    (2006.01)
*G06F 15/173*    (2006.01)
(Continued)

(52) U.S. Cl.
CPC ............ *H04L 67/10* (2013.01); *G06F 3/04842* (2013.01); *G06F 3/1454* (2013.01);
(Continued)

(58) Field of Classification Search
CPC ............... H04L 12/1804; H04L 29/06; H04L 29/06027; H04L 29/08846; H04L 29/12896; H04L 67/08; H04L 67/322; H04L 67/28; H04L 67/2819; H04L 67/2823; H04L 67/2842; H04L 67/289; H04L 67/327; H04L 45/741; H04L 61/106; H04L 61/605; G09G 2340/02; G09G 2340/145; G09G 5/14; G09G 5/363; G09G 2370/022; G09G 2370/042; G09G 2370/10; G09G 2370/22
USPC .......... 709/218–219, 248, 226; 715/764, 778, 715/779, 804
See application file for complete search history.

(56) References Cited

U.S. PATENT DOCUMENTS

| 5,621,430 A | 4/1997 | Bricklin |
| 5,825,336 A | 10/1998 | Fujita et al. |

(Continued)

FOREIGN PATENT DOCUMENTS

| EP | 2 000 916 A1 | 12/2008 |
| JP | 2001-078199 A | 3/2001 |

(Continued)

*Primary Examiner* — Farzana Huq
(74) *Attorney, Agent, or Firm* — Birch, Stewart, Kolash & Birch, LLP

(57) ABSTRACT

A method of controlling an external terminal from a terminal including receiving screen information from the external terminal; displaying the screen information as is displayed in the external terminal; selecting content information from the screen information, wherein the content information exists at recognized location; transmitting the location information of the selected content information to the external terminal; and receiving the selected content information corresponding to the transmitted location information from the external terminal. The location information includes coordinates information, which is relative coordinates of the selected content information.

12 Claims, 60 Drawing Sheets

(51) Int. Cl.
  *G06F 3/048* (2013.01)
  *H04L 29/08* (2006.01)
  *H04M 1/725* (2006.01)
  *G06F 3/0484* (2013.01)
  *G06F 3/14* (2006.01)
  *G09G 5/14* (2006.01)
  *G08C 17/02* (2006.01)
  *H04W 68/00* (2009.01)
  *H04W 88/02* (2009.01)

(52) U.S. Cl.
  CPC .......... *G08C 17/02* (2013.01); *G09G 5/14* (2013.01); *H04L 67/141* (2013.01); *H04M 1/7253* (2013.01); *H04M 1/72533* (2013.01); *H04M 1/72572* (2013.01); *G08C 2201/30* (2013.01); *G09G 2340/02* (2013.01); *G09G 2340/145* (2013.01); *G09G 2370/022* (2013.01); *G09G 2370/042* (2013.01); *G09G 2370/10* (2013.01); *G09G 2370/22* (2013.01); *H04M 2250/16* (2013.01); *H04W 68/00* (2013.01); *H04W 88/02* (2013.01)

(56) References Cited

U.S. PATENT DOCUMENTS

| | | | |
|---|---|---|---|
| 6,216,177 B1 * | 4/2001 | Mairs | G06F 3/1462 345/522 |
| 6,621,508 B1 | 9/2003 | Shiraishi et al. | |
| 6,697,090 B1 | 2/2004 | Nagasaka et al. | |
| 7,461,121 B2 | 12/2008 | Doi et al. | |
| 7,522,912 B2 | 4/2009 | Seo et al. | |
| 7,802,207 B2 | 9/2010 | Agboatwalla et al. | |
| 7,953,777 B2 | 5/2011 | White et al. | |
| 2001/0041973 A1 * | 11/2001 | Abkowitz | G06F 17/30905 702/23 |
| 2002/0049978 A1 | 4/2002 | Rodriguez et al. | |
| 2003/0037110 A1 * | 2/2003 | Yamamoto | H04M 3/5322 709/204 |
| 2003/0156097 A1 | 8/2003 | Kakihara et al. | |
| 2004/0048570 A1 | 3/2004 | Oba et al. | |
| 2004/0210658 A1 | 10/2004 | Guillermo et al. | |
| 2005/0015731 A1 | 1/2005 | Mak et al. | |
| 2005/0091359 A1 | 4/2005 | Soin et al. | |
| 2005/0091571 A1 | 4/2005 | Leichtling | |
| 2005/0134745 A1 | 6/2005 | Bacche et al. | |
| 2005/0240873 A1 | 10/2005 | Czerwinski et al. | |
| 2005/0262201 A1 | 11/2005 | Rudolph et al. | |
| 2006/0107303 A1 | 5/2006 | Erhart et al. | |
| 2006/0136828 A1 | 6/2006 | Asano | |
| 2006/0146765 A1 | 7/2006 | Van De Sluis et al. | |
| 2006/0152432 A1 * | 7/2006 | Delgado Acarreta | B60K 35/00 345/1.1 |
| 2006/0179127 A1 | 8/2006 | Randall | |
| 2006/0294247 A1 | 12/2006 | Hinckley et al. | |
| 2007/0050470 A1 | 3/2007 | Suzuki et al. | |
| 2007/0067524 A1 | 3/2007 | Mouri et al. | |
| 2007/0075965 A1 | 4/2007 | Huppi et al. | |
| 2007/0115346 A1 | 5/2007 | Kim et al. | |
| 2007/0124370 A1 | 5/2007 | Nareddy et al. | |
| 2007/0242051 A1 | 10/2007 | Horikiri et al. | |
| 2008/0165842 A1 | 7/2008 | Yan et al. | |
| 2008/0209066 A1 | 8/2008 | Spio et al. | |
| 2008/0209075 A1 | 8/2008 | Shamma | |
| 2008/0215980 A1 | 9/2008 | Lee et al. | |
| 2008/0256630 A1 | 10/2008 | Fujikawa | |
| 2009/0069056 A1 | 3/2009 | Lee et al. | |
| 2009/0125586 A1 | 5/2009 | Sato et al. | |
| 2009/0195513 A1 | 8/2009 | Dybalski et al. | |
| 2009/0217177 A1 | 8/2009 | Degrazia | |
| 2009/0249219 A1 | 10/2009 | Best et al. | |
| 2010/0115458 A1 * | 5/2010 | Marano | G06F 3/0485 715/784 |
| 2010/0161744 A1 | 6/2010 | Kim et al. | |
| 2010/0262925 A1 | 10/2010 | Liu et al. | |
| 2012/0282971 A1 * | 11/2012 | Kim | H04B 5/0037 455/522 |

FOREIGN PATENT DOCUMENTS

| | | |
|---|---|---|
| JP | 2004-153382 A | 5/2004 |
| KR | 1992-0011271 A | 6/1992 |
| KR | 10-2003-0093753 A | 12/2003 |
| KR | 1 515 223 A | 3/2005 |
| KR | 10-2005-0065363 A | 6/2005 |
| KR | 10-2007-0026109 A | 3/2007 |
| KR | 10-2007-0039719 A | 4/2007 |
| KR | 10-2007-0067927 A | 6/2007 |
| KR | 10-2009-0026949 A | 3/2009 |
| KR | 10-2009-0056081 A | 6/2009 |
| WO | WO 2004/075169 A2 | 9/2004 |
| WO | WO 2006/043977 A1 | 4/2006 |
| WO | WO 2007/074959 A1 | 7/2007 |

* cited by examiner

FIG. 41
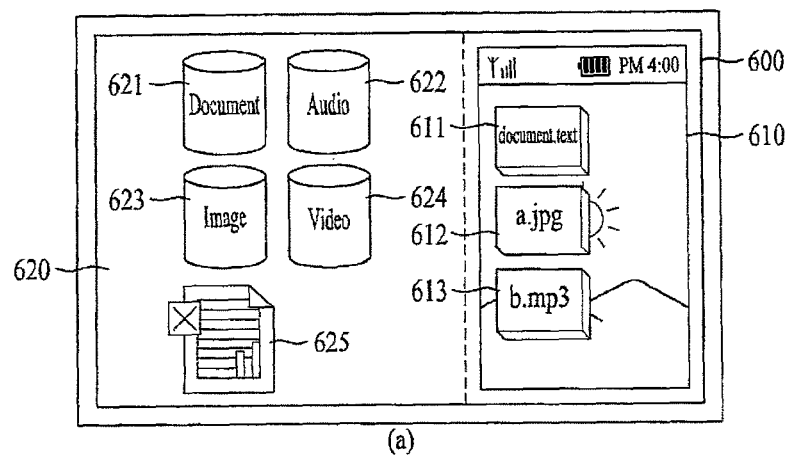
(a)
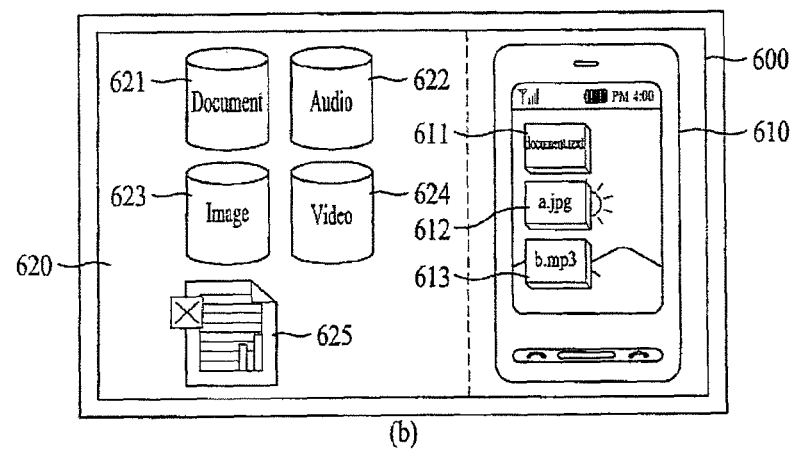
(b)
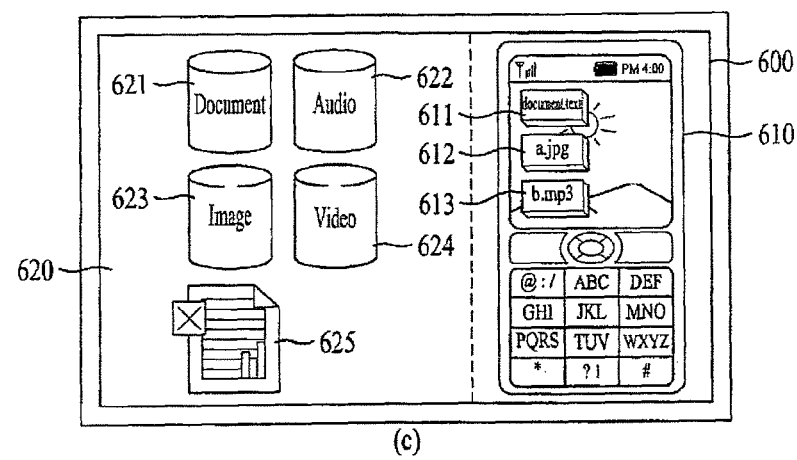
(c)

FIG. 52
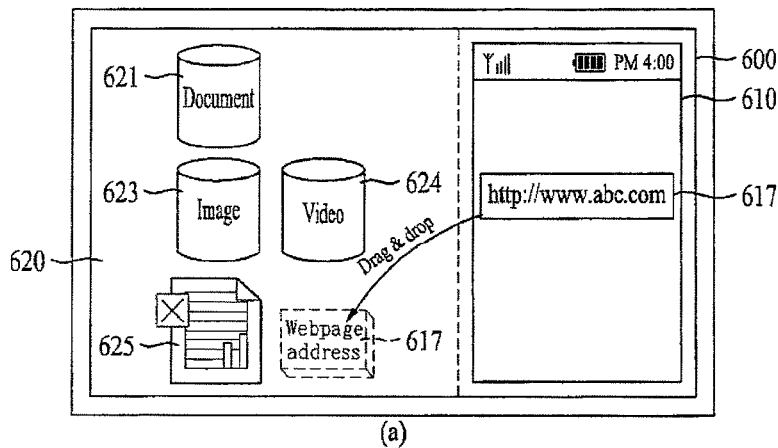
(a)
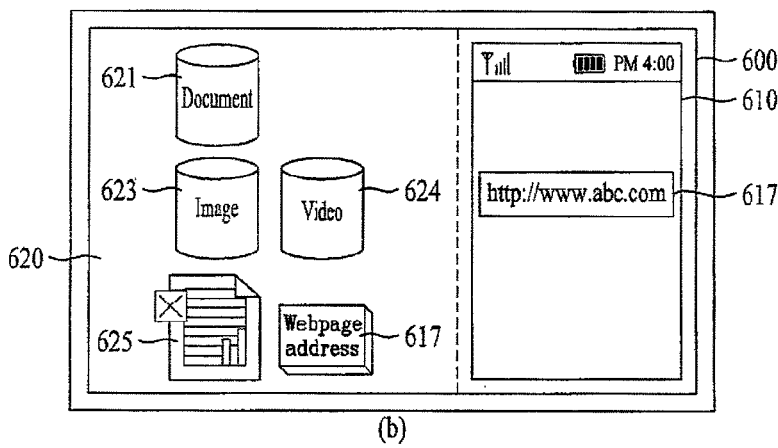
(b)
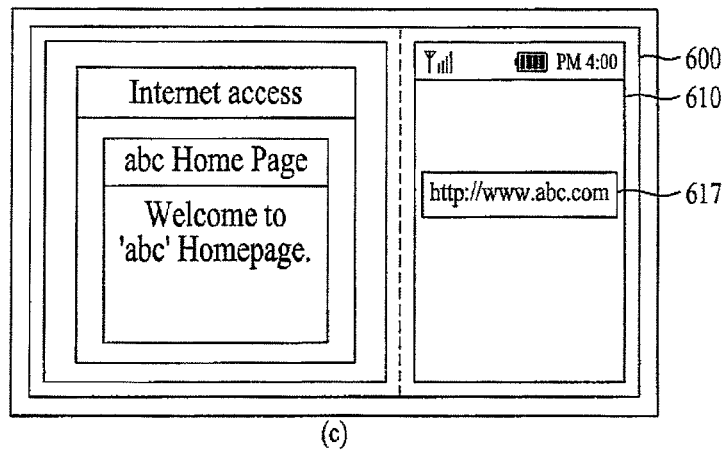
(c)

TERMINAL AND CONTROLLING METHOD THEREOF

CROSS-REFERENCE TO RELATED APPLICATIONS

This application is a Continuation of copending U.S. application Ser. No. 14/543,722, filed on Nov. 17, 2014, which is a Continuation of U.S. patent application Ser. No. 12/545,376 filed on Aug. 21, 2009 (now U.S. Pat. No. 8,914,462), which claims priority under 35 U.S.C. §119(a) to Korean Application Nos. 10-2009-0053946, filed on Jun. 17, 2009, 10-2009-0053945, filed on Jun. 17, 2009, 10-2009-0051175, filed on Jun. 9, 2009, and 10-2009-0032283, filed on Apr. 14, 2009, all of which are hereby expressly incorporated by reference into the present application.

BACKGROUND OF THE INVENTION

1. Field of the Invention

The present invention relates to a terminal, and more particularly, to a terminal and controlling method thereof. Although the present invention is suitable for a wide scope of applications, it is particularly suitable for controlling data communication operations between terminals

2. Discussion of the Related Art

A terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, terminals have been configured to receive broadcast and multicast signals which permit viewing of content such as videos and television programs.

The above-described mobile terminal connects a communication such an external device having a display unit and an input unit as a notebook computer, a personal computer, a PDA and the like and is then able to exchange (transmit and receive) data with the connected external device.

SUMMARY OF THE INVENTION

Accordingly, the present invention is directed to a terminal and controlling method thereof that substantially obviate one or more problems due to limitations and disadvantages of the related art.

An object of the present invention is to provide a terminal and controlling method thereof, by which data of a first terminal is executable in a second terminal and by which all functions of the first terminal are usable using the second terminal.

Another object of the present invention is to provide a terminal and controlling method thereof, by which when a wireless communication is connected between/among a plurality of terminals, content information contained on each screen of first and second terminals is interchangeably usable.

A further object of the present invention is to provide a terminal and controlling method thereof, by which a tripartite heterogeneous communication function can be provided to first to third terminals using a short-range communication system and a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a terminal according to the present invention includes a method of controlling an external terminal from a terminal, the method including establishing communication with the external terminal; receiving screen information that is displayed in the external terminal from the external terminal; displaying the screen information as is displayed in the external terminal on at least a portion of a screen of the terminal; selecting content information from the screen information that is displayed on the at least a portion of the screen of the terminal; and transmitting location information of the selected content information displayed on the at least a portion of the screen of the terminal to the external terminal. In another aspect of the present invention, a terminal includes a wireless communication unit configured to receive screen information that is displayed in an external terminal by a communication link with the external terminal; a display unit configured to display the screen information as is displayed in the external terminal on at least a portion of a screen of the terminal; and a control unit, when content information from the screen information that is displayed on the at least a portion of the screen is selected, the control unit is configured to transmit location information of the selected content information to the external terminal.

In another aspect of the present invention, a method of controlling a terminal includes displaying screen information including at least one content information on a screen of the terminal; establishing communication with the external terminal; transmitting the displayed screen information to the external terminal; and when a signal including a location information of the at least one content information displayed on a screen of the external terminal is received from the external terminal, executing a function of the terminal corresponding to the at least one content information.

In another aspect of the present invention, a terminal includes a display unit configured to display screen information including at least one content information; a communication unit, when communication with an external terminal is established, the communication unit is configured to transmit the screen information to the external terminal; and a control unit, when a signal including location information of the at least one content information on a screen of the external terminal is received from the external terminal, the control unit is configured to execute a function of the terminal corresponding to the received location information on the screen.

In another aspect of the present invention, a method of controlling a terminal includes establishing communication with the plurality of external terminals including a first external terminal and a second external terminal; receiving first screen information displayed on the first external terminal and second screen information displayed on the second external terminal; displaying the first screen information as is displayed in the first external terminal and the second screen information as is displayed in the second external terminal on a first portion and a second portion on a screen of the terminal, respectively; and when content information displayed within the first portion is selected, transmitting the selected content information to the second external terminal. In another aspect of the present invention, a terminal includes a wireless communication unit configured to establish communication with a plurality of external terminals including a first external terminal and a second external terminal, the wireless communication unit is further configured to receive a first screen information as is displayed on the first external terminal and a second screen information as is displayed on the second external terminal; a display unit configured to display the first screen information and the second screen information on a first portion and a second portion on a screen of the terminal, respectively; and a control unit, when content information displayed within the first portion is selected, the control unit is configured to transmit the selected content information to the second external terminal. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 41 is a diagram of a screen configuration for a state that both screen information of a second terminal and screen information of a first terminal are displayed on a screen of the second terminal together according to a seventh embodiment of the present invention;

FIGS. 48 and 52 are diagrams of screen configurations for a process for a second terminal to execute content information received from a first terminal according to a seventh embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

The suffixes 'module' and 'unit' for the elements used in the following description are given or used in common by considering facilitation in writing this disclosure only but fail to have meanings or roles discriminated from each other.

First of all, a mobile terminal described in this disclosure can include such a video and audio outputtable terminal as a mobile phone, a smart phone, a digital broadcast terminal, a PDA (personal digital assistants), a PMP (portable multimedia player), a navigation system, a laptop computer, a personal computer (PC) and the like.

In the following detailed description of the invention, assume a first terminal and a second terminal are a mobile terminal and a PC, respectively, by which the first and second terminals are non-limited.

A first terminal according to the present invention is explained in detail with reference to FIG. 1 as follows.

Figure 1:
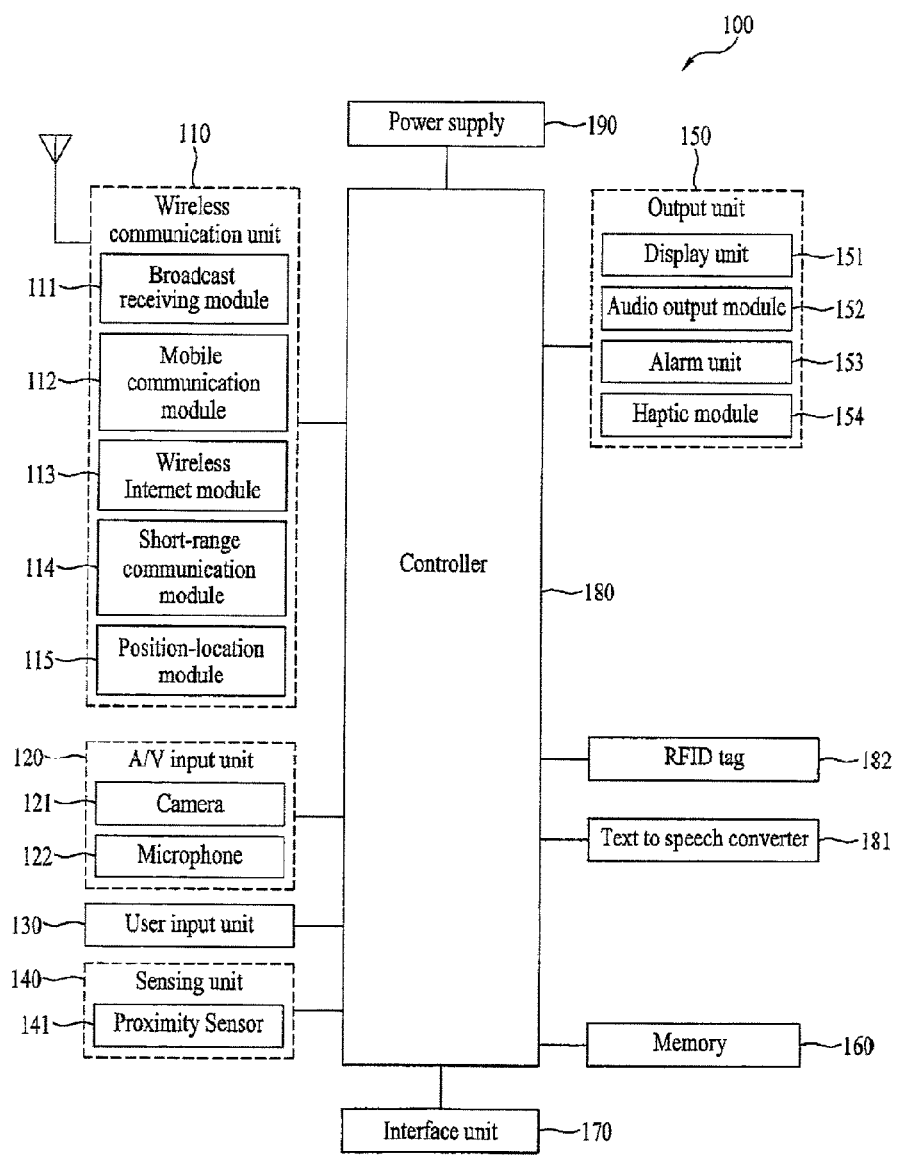
FIG. 1 is a block diagram of a first terminal of a mobile terminal type according to one embodiment of the present invention.

FIG. 1 is a block diagram of a first terminal of a mobile terminal type according to one embodiment of the present invention.

Referring to FIG. 1, a first terminal 100 according to the present invention is a mobile terminal and includes a communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the first terminal 100 are explained in sequence.

First of all, the communication unit 110 can include at least one module which permits communication between the first terminal 100 and a wireless communication system, between the first terminal 100 and a network within which the first terminal 100 is located, or between the first terminal 100 and a second terminal 200 according to the present invention.

For instance, the communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The mobile communication module 112 transmits/receives wireless signals to/from one or more network entities (e.g., a base station, an external terminal, a server, etc.). Such wireless signals may represent a speech call signal, a video communication call signal and data according to text/multimedia message transceivings.

The mobile communication module 112 is communication-connected to the second terminal 200 according to the present invention and is then able to transmit all data of the first terminal 100 to the second terminal 200 under the control of the controller 180. For example, the mobile communication module 112 is able to transmit all screen information displayed on the display module 151 to the second terminal 200. And, the mobile communication module 112 is able to transmit audio information outputted from the audio output module 152 to the second terminal 200. Moreover, the mobile communication module 112 is able to transmit a key signal inputted from the user input unit 130 or a touch signal inputted from the display module 151 of a touchscreen type to the second terminal 200.

The wireless internet module 113 supports Internet access for the first terminal 100. This module may be internally or externally coupled to the first terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The wireless internet module 113 is connected to the second terminal 200 according to the present invention by internet communication and is then able to transmit all data of the first terminal 100 to the second terminal 200 under the control of the controller 180. For example, the wireless internet module 113 is able to transmit all screen information displayed on the display module 151 to the second terminal 200. And, the wireless internet module 113 is able to transmit audio information outputted from the audio output module 152 to the second terminal 200. Moreover, the wireless internet module 113 is able to transmit a key signal inputted from the user input unit 130 or a touch signal inputted from the display module 151 of a touchscreen type to the second terminal 200.

The short-range communication module 114 facilitates relatively short-range communications. Suitable technologies for implementing this module include Bluetooth, infrared data association (IrDA), ultra-wideband (UWB), ZigBee, Wi-Fi (wireless fidelity), RFB (remote frame buffer) and the like.

The short-range communication module 114 is communication-connected to the second terminal 200 according to the present invention and is then able to transmit all data of the first terminal 100 to the second terminal 200 under the control of the controller 180. For example, the short-range communication module 114 is able to transmit all screen information displayed on the display module 151 to the second terminal 200. And, the short-range communication module 114 is able to transmit audio information outputted from the audio output module 152 to the second terminal 200. Moreover, the short-range communication module 114 is able to transmit a key signal inputted from the user input unit 130 or a touch signal inputted from the display module 151 of a touchscreen type to the second terminal 200.

The position-location module 115 identifies or otherwise obtains the location of the first terminal 100. If desired, this module may be implemented with a global positioning system (GPS) module.

Referring to FIG. 1, the audio/video (A/V) input unit 120 is configured to provide audio or video signal input to the first terminal 100. As shown, the A/V input unit 120 includes a camera 121, a microphone 122 and the like.

The camera 121 receives and processes image frames of still pictures or video, which are obtained by an image sensor in a video call mode or a photographing mode. And, the processed image frames can be displayed on the display unit 151.

At least two or more cameras can be provided under the circumstance of usage. And, the image frame processed by the camera 121 can be transmitted to the second terminal 200 via the communication unit 110.

The microphone 122 receives an external audio signal while the portable device is in a particular mode, such as phone call mode, recording mode and voice recognition mode. This audio signal is processed and converted into electric audio data.

The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

In this case, a backlight unit is provided under the user input unit 130 to generate light for identifying the keypad, the dome switch, the jog wheel and the jog switch in a dark environment.

The sensing unit 140 provides sensing signals for controlling operations of the first terminal 100 using status measurements of various aspects of the mobile terminal. For instance, the sensing unit 140 may detect an open/close status of the first terminal 100, relative positioning of components (e.g., a display and keypad) of the mobile terminal 100, a change of position of the first terminal 100 or a component of the first terminal 100, a presence or absence of user contact with the first terminal 100, orientation or acceleration/deceleration of the first terminal 100.

Meanwhile, the output unit 150 generates outputs relevant to the senses of sight, hearing, touch and the like. And, the output unit 150 includes the display unit (or display module) 151, an audio output module 152, an alarm unit 153, a haptic module 154 and the like.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

At least two display units 151 can be provided to the first terminal 100 in accordance with the implemented configuration of the first terminal 100. For instance, a plurality of display modules can be arranged on a single face of the first terminal 100 in a manner of being spaced apart from each other or being built in one body. Alternatively, a plurality of display modules can be arranged on different faces of the first terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like.

The audio output module 152 functions in various modes including a call signal receiving mode, a call mode, a recording mode, a voice recognition mode, a broadcast reception mode and the like to output audio data which is received from the wireless communication unit 110 or is stored in the memory 160.

During operation, the audio output module 152 outputs an audio signal related to a particular function (e.g., call received, message received, etc.). The audio output module 152 is often implemented using one or more speakers, buzzers, other audio producing devices, and combinations thereof.

The alarm output unit 153 outputs a signal for announcing the occurrence of a particular event associated with the first terminal 100. Typical events include a call received event, a message received event, a key signal inputted event, and a touch input received event.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The memory 160 is generally used to store various types of data to support the processing, control, and storage requirements of the controller 180. Examples of such data include program instructions for applications operating on the first terminal 100, phonebook data, message data, audio data, still pictures data, moving pictures data, etc. Moreover, data for various patterns of vibration and/or sound outputted in case of a touch input to the touchscreen can be stored in the memory 160.

And, the memory 160 is provided with an operation system (OS) program for controlling operations of the elements of the first terminal 100. Moreover, the memory 160 is provided with a plurality of applications for running content information executed in the first terminal 100.

For example, the applications can include a word processor, an image viewer, a video player, an audio player, an internet connector and the like. The above-described OS program and applications are drivable and executable under the control of the controller 180.

Moreover, the above-described OS program and applications can be stored as software in the memory 160 or can be provided as 'module' types.

Meanwhile, the interface unit 170 is often implemented to couple the first terminal 100 with external devices.

The above-described interface unit 170 may be configured using a wired/wireless headset port, an external charger port, a wired/wireless data port, a memory card port, a port for coupling to a device having an identity module, audio input/output ports, video input/output ports, an earphone port, a USB (universal serial bus) port and/or the like.

In particular, the interface unit 170 is wire-connected to the second terminal 200 via a data cable or the like and is then able to transmit all data of the first terminal 100 to the second terminal 200. For example, the interface unit 170 is ale to transmit all screen information displayed on the display module 151 to the second terminal 200. The interface unit 170 is able to transmit audio information outputted from the audio output module 152 to the second terminal 200. And, the interface unit 170 is able to transmit a key signal inputted from the user input unit 130 or a touch signal inputted from the display module 151 of the touchscreen type to the second terminal 200.

Meanwhile, the controller 180 normally controls overall operations of the first terminal 100. For instance, the controller 180 performs control and processing relevant to a voice call, a data communication, a video call and the like.

The control operating process of the controller 180 according to an embodiment of the present invention shall be explained in detail later.

A speech text converting unit 181 converts a speech signal inputted from the microphone 122 to a text signal or converts a call speech signal received from the communication unit 110 to a text signal. Moreover, the speech text converting unit 181 converts a content of a message received from the communication unit 110 to a speech signal.

The speech text converting unit 181 can include a TTS (text to speech) module.

And, the first terminal 100 according to the present invention can be provided with an RFID tag 182 for recording device information of the first terminal 100, which is used for the communication connection to the second terminal 200.

Meanwhile, the power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, the configurations of the first terminal 100 according to the present invention have been explained with reference to FIG. 1.

In the following description, the second terminal 200 according to the present invention shall be explained in detail with reference to FIG. 2.

Figure 2:
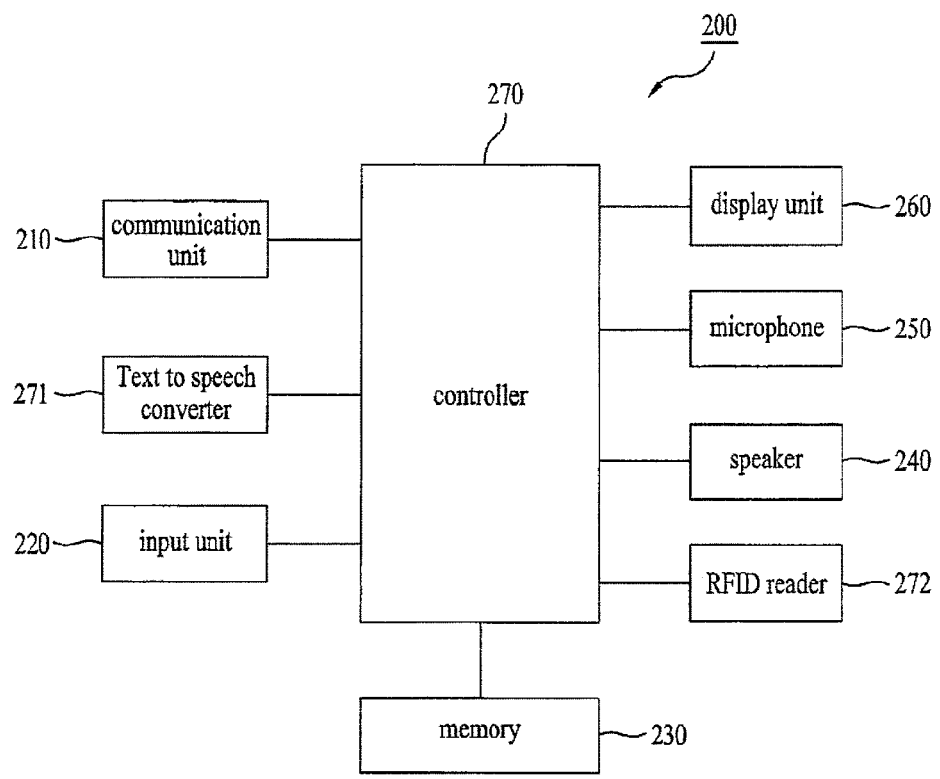
FIG. 2 is a block diagram of a second terminal of a PC type according to one embodiment of the present invention.

FIG. 2 shows that the second terminal 200 according to the present invention is a personal computer (hereinafter abbreviated 'PC'). Besides, as mentioned in the foregoing description, a stationary terminal 200 can include every device capable of communicating with the first terminal 100, displaying images and outputting audio as well as the PC.

FIG. 2 is a block diagram of a second terminal of a PC type according to one embodiment of the present invention.

Referring to FIG. 2, a second terminal 200 according to the present invention includes a communication unit 210, an input unit 220, a memory 230, a speaker 240, a microphone 250, a display unit 260 and a controller 270.

And, it is understood that the elements (e.g., a camera, an interface unit, etc.) mentioned in the foregoing description of the first terminal 100 can be additionally loaded in the second terminal 200 in addition to the above described elements.

The communication unit 210 is communication-connected to the first terminal 100 according to the present invention under the control of the controller 270. And, the communication unit 210 receives screen information displayed in the first terminal 100, audio information and key input information from the first terminal 100.

Like the former communication unit 110 of the first terminal 100 shown in FIG. 1, the above-configured communication unit 210 of the second terminal 100 can further include a mobile communication module enabling communication between the mobile terminal 100 and a stationary terminal 200, a wireless internet module and a short-range communication module.

Meanwhile, the input unit 220 generates a key signal for an operation control of the second terminal 200 or a key signal for an operation control of the first terminal 100. Occasionally, the input unit 220 can include a keypad, a dome switch, a touch pad (e.g., static pressure/capacitance), a jog wheel, a jog switch, a mouse, etc.

The memory 230 is able to store a program for an operation of the second terminal 200. And, various data are stored in the memory 230.

And, the memory 230 is provided with an operation system (OS) program for controlling operations of the elements of the second terminal 200. Moreover, the memory 230 is provided with a plurality of applications for running content information executed in the second terminal 200. For example, the applications can include a word processor, an image viewer, a video player, an audio player, an internet connector and the like. The above-described OS program and applications are drivable and executable under the control of the controller 270.

Moreover, the above-described OS program and applications can be stored as software in the memory 230 or can be provided as 'module' types.

The memory 230 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device.

The speaker 240 outputs data containing audio stored in the memory and various audios generated from the second terminal 200. And, the microphone 250 receives an input of an external audio signal and then processes the input into an electric speech data.

The display unit 260 displays information processed by the second terminal 200. This display unit 260 may be implemented using known display technologies including, for example, a liquid crystal display (LCD), a thin film transistor-liquid crystal display (TFT-LCD), an organic light-emitting diode display (OLED), a flexible display and a three-dimensional display. And, the second terminal 200 may include one or more of such displays. Moreover, the display unit 260 is coupled to a touch sensor to have a touchscreen type.

The controller 270 controls overall operations of the second terminal 200. According to the present invention, the controller 270 displays screen information received from the first terminal 100 and transmits a key signal inputted via the input unit 220 to the first terminal 100 via the communication unit 210.

The speech text converting unit 271 converts a speech signal inputted from the microphone 250 to a text signal or converts a call speech signal received from the communication unit 210 to a text signal.

Moreover, the speech text converting unit 271 converts a text signal inputted from the touchscreen type display unit 260 or the input unit 220 to a speech signal or converts a content of a message received from the communication unit 210 to a speech signal.

The above-configured speech text converting unit 181 can include a TTS (text to speech) module.

Besides, the second terminal 200 according to the present invention includes an RFID reader 272 configured to read out the data stored in the former RFID tag 182 provided to the first terminal 100 shown in FIG. 1.

If the first terminal 100 is located in the neighborhood of the second terminal 200, the RFID reader 272 reads or interprets the device information stored in the RFID tag 182 provided to the first terminal 100 and then outputs the read device information to the controller 270.

Once the device information of the first terminal 100 is read via the RFID reader 272, the controller 270 checks whether the read device information of the first terminal 100 exists on an access authentication device information list stored in the memory 230. If the read device information on the first terminal 100 exists on the access authentication device information list, the controller 270 connects a communication with the first terminal 100 via the communication unit 210.

In the above description, the configurations of the second terminal 200 according to the present invention are explained.

In the following description, embodiments relevant to a process for transmitting and receiving data (e.g., screen information, audio information and key input information) between the above configured first and second terminals 100 and 200 are explained with reference to the accompanying drawings. Optionally, the following embodiments are available individually or by being combined together.

Figure 3:
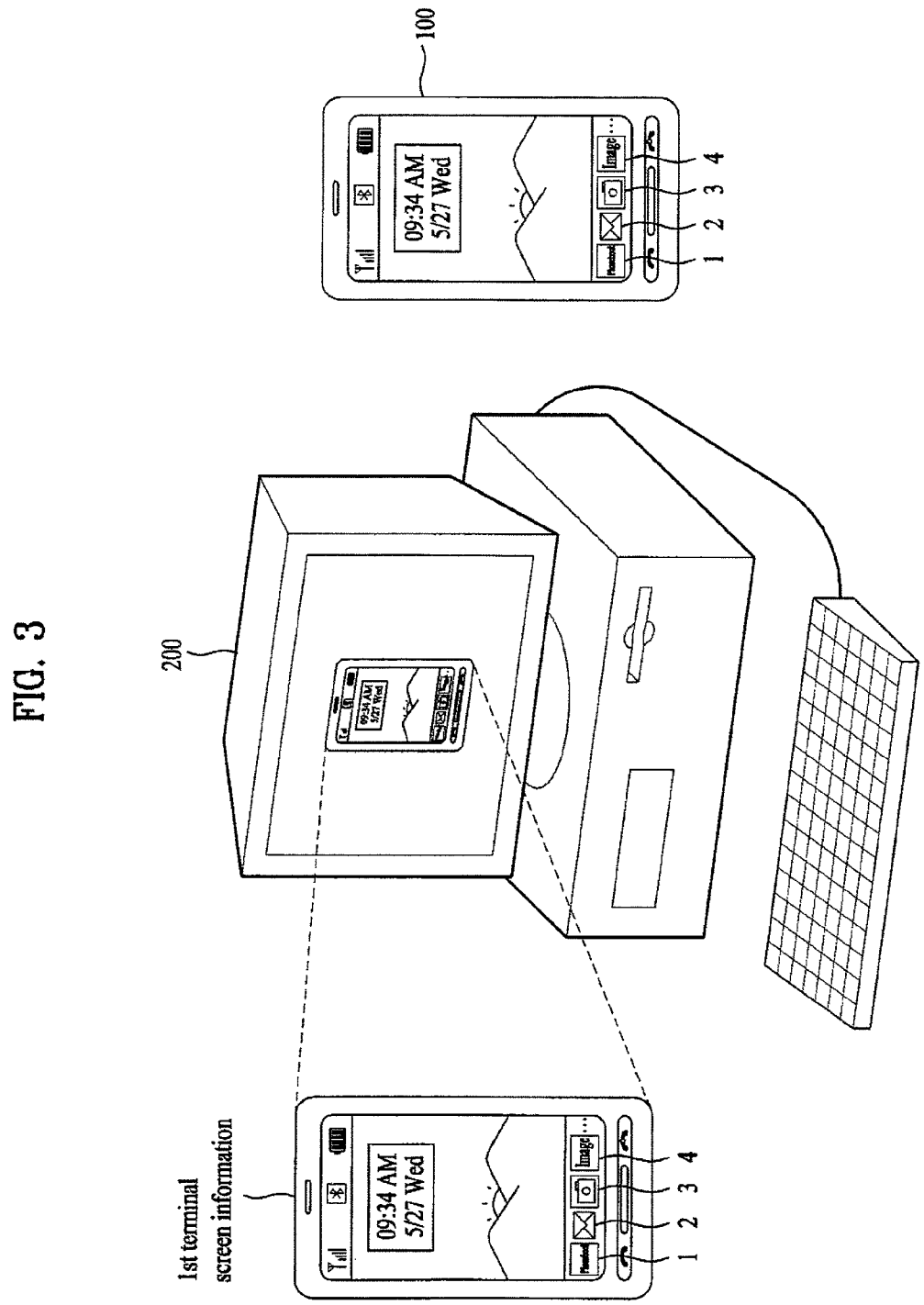
FIG. 3 is a diagram for explaining a remote control system including a first terminal of a mobile terminal type and a second terminal of a PC type according to the present invention.

FIG. 3 is a diagram for explaining a remote control system including a first terminal 100 and a second terminal 200 according to the present invention.

Referring to FIG. 3, all data (screen information, audio information and key input information) of the first terminal 100 can be transmitted to the second terminal 200. In this case, the second terminal 200 is able to control an operation of the first terminal 100 by wireless communication.

In particular, once the first terminal 100 is wireless-connected to the second terminal 200, the first terminal 100 transmits screen information displayed on the display unit 151 to the second terminal 200 so that the screen information of the first terminal 100 is reproduced on at least a portion of a screen of the second terminal 200.

In this case, the wireless communication can include at least one of short-range wireless communications including Bluetooth, infrared data association (IrDA), ultra-wideband (UWB), ZigBee, Wi-Fi (wireless fidelity), RFB (remote frame buffer), other wired or wireless connection or wired or wireless communication link and the like.

Meanwhile, the second terminal 200 displays the screen information received from the first terminal 100 on a prescribed portion of its screen and is then able to control all menu functions of the first terminal 100 by wireless (or wired) communication via the input unit 220 such as a keypad, a mouse and the like.

In this case, a displayed size of the screen information of the first terminal 100, which is displayed on the second terminal 200, can be set equal to that of an image actually displayed on the first terminal 100, or set to be different to that of the image actually displayed on the first terminal 100.

Once the screen information is received from the first terminal 100, the second terminal 200 displays a manipulation unit for enabling a user to manipulate all functions of the first terminal 100 together with the screen information. In this case, the manipulation unit can have the same configuration of a shape of a menu key, a call key, a direction key, a keypad or the like, which is provided to a main body of the first terminal 100. For example, the manipulation unit displayed on the second terminal 200 may be a depiction of the first terminal 100, or at least depiction of a screen portion containing the screen information of the first terminal 100.

For instance, referring to FIG. 3, the first terminal 100 is a mobile terminal provided with a touchscreen type manipulation unit. Within the manipulation unit of the first terminal 100, the screen information of the first terminal 100 and menu execution icons of a phonebook 1, a message 2, a camera 3 and an image 4 are included, for example.

If so, the second terminal 200 displays the menu execution icons of the phonebook 1, the message 2, the camera 3 and the image 4 within the manipulation unit exactly like those of the first terminal 100.

In the following description, a process for the second terminal 200 to control an operation of the first terminal 100 via the manipulation unit by wireless communication is explained with reference to FIGS. 4 to 7.

Figure 4:
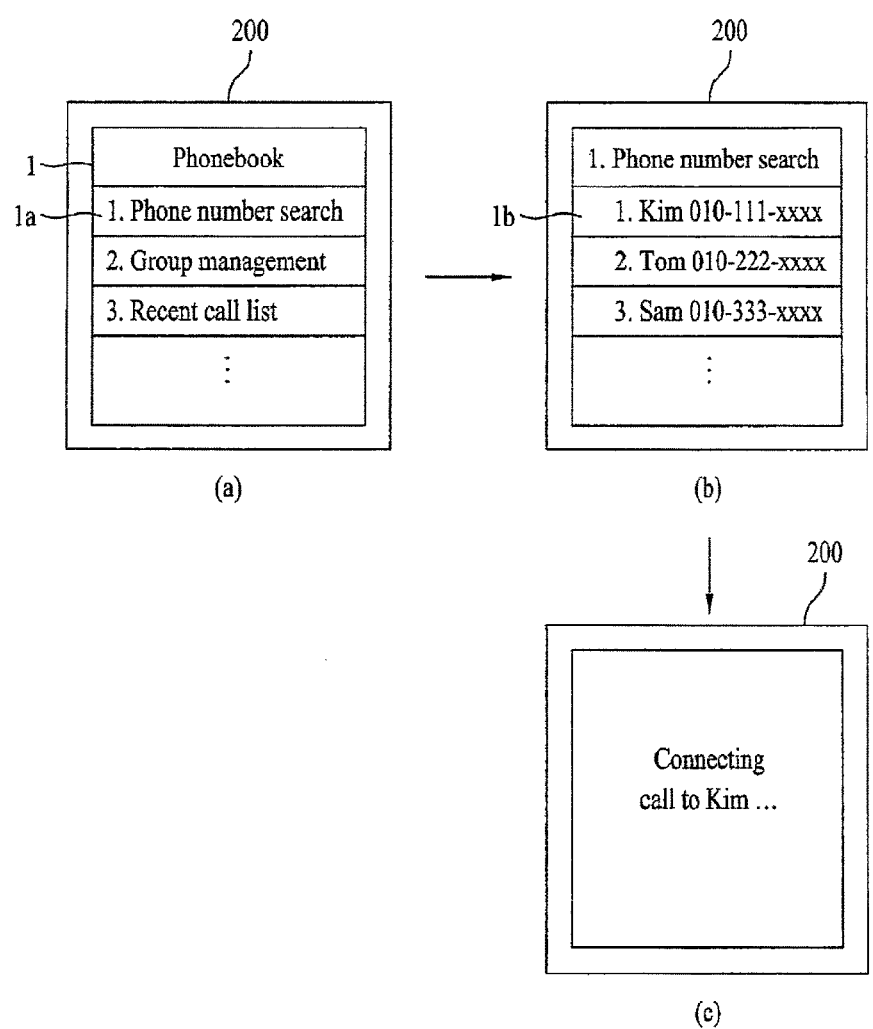
FIG. 4 is a diagram of screen configurations for explaining a process for a second terminal to control a phonebook menu function of a first terminal by a wireless communication.

FIG. 4 is a diagram of screen configurations for explaining a process for a second terminal to control a phonebook menu function of a first terminal by a wireless communication.

Referring to FIG. 4, if the phonebook menu execution icon 1 is selected from the screen shown in FIG. 3 via the input unit 220, the controller 270 of the second terminal 200 obtains a location of the selected phonebook menu execution icon 1 and then transmits a signal for notifying the obtained location information to the first terminal 100.

For instance, if a screen resolution of the first terminal 100, which is displayed on the screen of the second terminal 100, is 600×400 pixels and a location of the phonebook menu execution icon 1 on the 600×400 screen is 'horizontal 531-534 and vertical 96-100', the controller 270 transmits a signal for notifying the horizontal 531-534 and vertical 96-100 corresponding to the location of the phonebook menu execution icon 1 to the first terminal 100.

The controller 180 of the first terminal 100 recognizes the location information contained in the signal received from the second terminal 200, executes a phonebook menu existing at the recognized location on the screen shown in FIG. 3, and displays submenus belonging to the phonebook menu.

Meanwhile, the controller 270 of the second terminal 200 receives the screen information shown in (a) of FIG. 4 from the first terminal 100 and then displays the received screen information. If a menu of '1. Search phonebook' (1a) is selected from the submenus displayed within the screen information shown in (a) of FIG. 4 via the input unit 220, the controller 270 of the second terminal 200 transmits a signal for notifying the location information of the selected menu of '1. Search phonebook' (1a) to the first terminal 100.

The controller 180 of the first terminal 100 recognizes the location information contained in the signal received from the second terminal 200, executes the menu of '1. Search phonebook' (1a) existing at the recognized location on the screen shown in (a) of FIG. 4, and then displays a contact information list registered within the phonebook, as shown in (b) of FIG. 4. And, the controller 180 of the first terminal 100 transmits the screen information shown in (b) of FIG. 4 to the second terminal 200.

Subsequently, the controller 270 of the second terminal 200 receives the screen information shown in (b) of FIG. 4 from the first terminal 100 and then displays the received screen information.

If '1. kim' (1b) is selected from the contact information list displayed within the screen information shown in (b) of FIG. 4 via the input unit 220 and a call connection key of the '1. kim' (1b) is then selected, the controller 270 of the second terminal 200 sequentially transmits location information of the selected '1. kim' (1b) and location information of the call connection key to the first terminal 100.

Once the location information of the selected '1. kim' 1b and location information of the call connection key are sequentially received from the second terminal 200, the controller 180 of the first terminal 100 attempts a call connect to the '1. kim' 1b by controlling the communication unit 110, as shown in (c) of FIG. 4 and then transmits the screen information shown in (c) of FIG. 4 to the second terminal 200.

Figure 5:
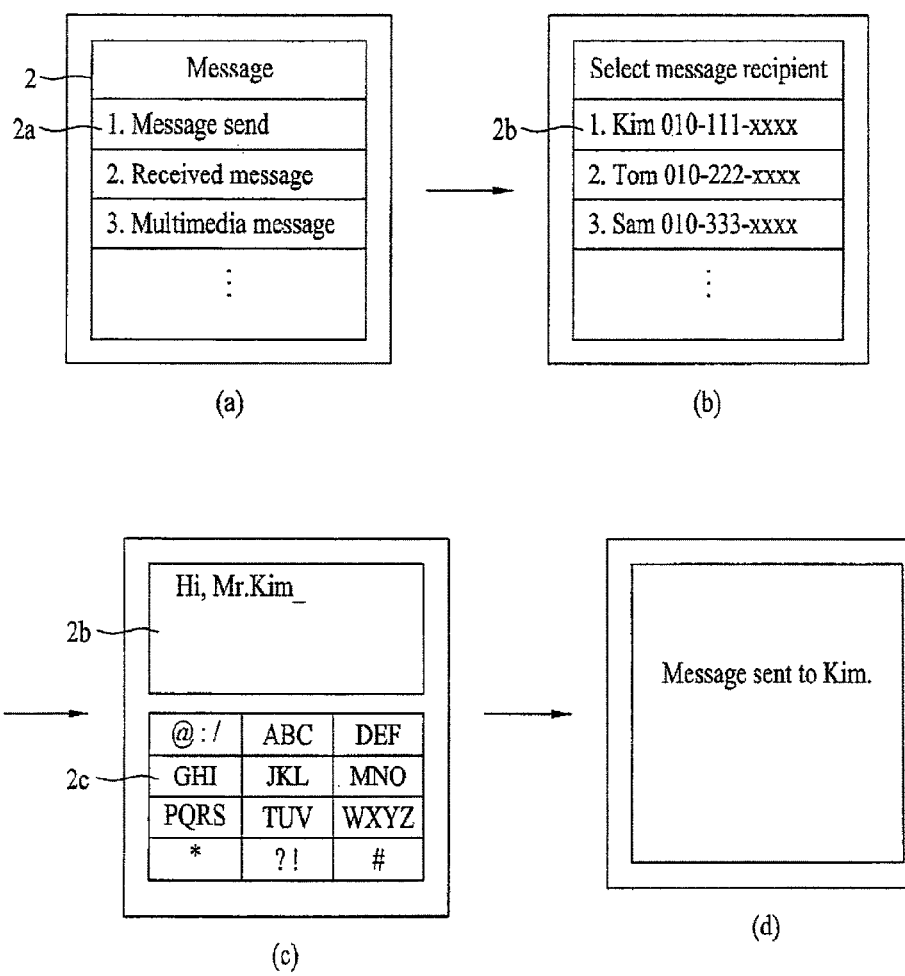
FIG. 5 is a diagram of screen configurations for explaining a process for a second terminal to control a message menu function of a first terminal by a wireless communication.

FIG. 5 is a diagram of screen configurations for explaining a process for a second terminal to control a message menu function of a first terminal by a wireless communication.

Referring to FIG. 5, if a user of the second terminal 200 selects a message menu execution icon 2 within the manipulation unit by manipulating the input unit 220 such as a mouse, a keypad and the like, the controller 270 transmits location information of the selected menu execution icon 2 to the first terminal 100.

The controller 180 of the first terminal 100 executes a message menu existing at the location received from the first terminal 100, as shown in (a) of FIG. 5, and then displays submenus belonging to the message menu. Moreover, the controller 180 of the first terminal transmits the screen information shown in (a) of FIG. 5 to the second terminal 200.

Subsequently, the controller 270 of the second terminal 200 receives the screen information shown in (a) of FIG. 5 from the first terminal 100 and then displays the received screen information. If a menu of '1. Transmit message' 2a is selected from the submenus displayed within the screen information shown in (a) of FIG. 5 via the input unit 220, the controller 270 of the second terminal 200 transmits a displayed location of the menu of '1. Transmit message' (or 'message send') 2a to the first terminal 100.

The controller 180 of the first terminal 100, as shown in (b) of FIG. 5, executes the menu of '1. Transmit message' 2a at the received location and then displays a contact information list registered with the phonebook. Moreover, the controller

180 of the first terminal 100 transmits the screen information shown in (b) of FIG. 5 to the second terminal 200.

Subsequently, the controller 270 of the second terminal 200 receives the screen information shown in (b) of FIG. 5 and then displays the received screen information. If '1. kim' 2b is selected from the contact information list displayed within the screen information shown in (b) of FIG. 5 via the input unit 220, the controller 270 of the second terminal 200 transmits location information of the contact information '1. kim' 2b to the first terminal 100.

If the location information of the contact information '1. kim' 2b is received from the second terminal 200, the controller 180 of the first terminal 100, as shown (c) of FIG. 5, displays a message writing window and transmits the screen information shown in (c) of FIG. 5 to the second terminal 200. In this case, the message writing window can include a keypad 2c for inputting a content of a message and a message content window 2d on which the content of the message inputted via the keypad 2c is displayed.

The controller 270 of the second terminal 200 receives the screen information shown in (c) of FIG. 5 from the first terminal 200 and then displays the received screen information.

If a plurality of characters is selected from the keypad 2c via the input unit 220, the controller 270 of the second terminal 200 sequentially transmits location information of the selected characters to the first terminal 100.

Subsequently, the controller 180 of the first terminal 100 displays characters existing at the respective locations, which are being sequentially received, on the message content window 2d and transmits screen information having the characters reflected on the message content window to the second terminal 200.

The second terminal 200 receives the screen information having the inputted characters reflected on the message content window 2d from the first terminal 100 and then displays the received screen information. If a key for sending the message written in the message content window 2d to the '1. kim' 2b is selected from the input unit 220, the second terminal 200 transmits location information of the selected key to the first terminal 100.

Subsequently, if the location information of the selected key is received from the second terminal 200, the controller 180 of the first terminal 100 sends the message written in the message content window 2d to the '1. kim' 2b by controlling the communication unit 110 and also sends the screen information shown in (d) of FIG. 5 to the second terminal 200.

Figure 6:
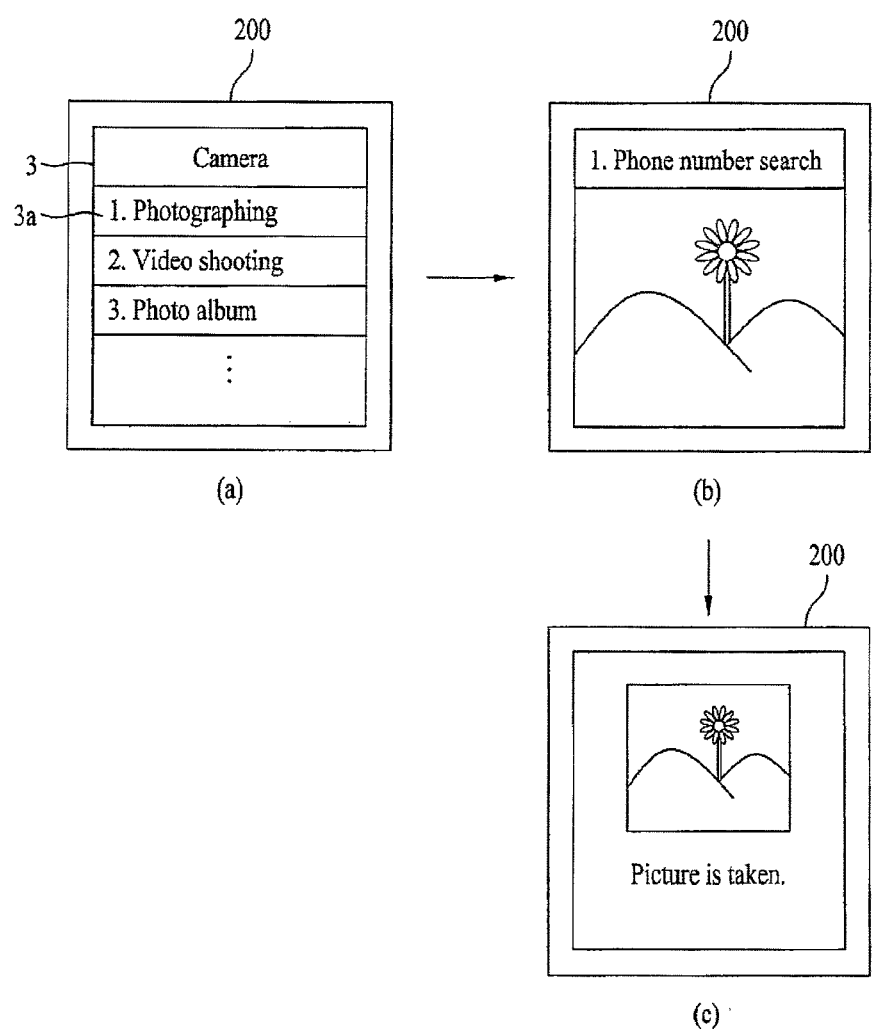
FIG. 6 is a diagram of screen configurations for explaining a process for a second terminal to control a camera menu function of a first terminal by a wireless communication.

FIG. 6 is a diagram of screen configurations for explaining a process for a second terminal to control a camera menu function of a first terminal by a wireless communication.

Referring to FIG. 6, if a user of the second terminal 200 selects a camera menu execution icon within the manipulation unit by manipulating the input unit 220 such as a mouse, a keypad and the like, the controller 270 of the second terminal 200 transmits a signal for commanding a camera menu execution selected by the user to the first terminal 100.

In this case, the command signal is the signal containing the location of the camera menu execution icon 3, as shown in FIG. 4 and FIG. 5, and commands an action of the first terminal 100 using the location information.

The controller 180 of the first terminal 100 executes the camera menu according to the received command signal, as shown in (a) of FIG. 6, and then displays submenus belonging to the camera menu. Moreover, the controller 180 of the first terminal 100 transmits screen information shown in (a) of FIG. 6 to the second terminal 200.

The controller 270 of the second terminal 200 receives the screen information shown in (a) of FIG. 6 from the first terminal 100 and then displays the received screen information. If a key signal for capturing a preview picture incident from the camera 121 is inputted via the input unit 220, the controller 270 of the second terminal 200 transmits a signal for commanding to capture a picture to the first terminal 100.

Subsequently, the controller 180 of the first terminal 100 captures a current preview picture incident from the camera 121 according to the received command signal, as shown in (c) of FIG. 6, and transmits screen information shown in (c) of FIG. 6 to the second terminal 200.

Figure 7:
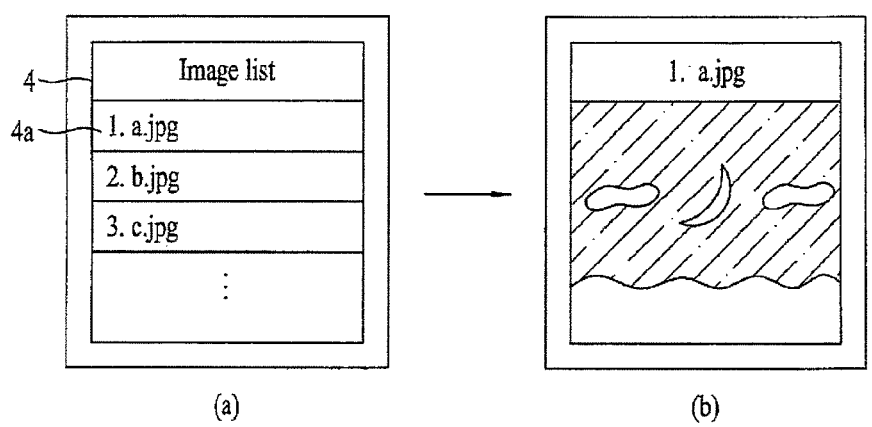
FIG. 7 is a diagram of screen configurations for explaining a process for a second terminal to control an image menu function of a first terminal by a wireless communication.

FIG. 7 is a diagram of screen configurations for explaining a process for a second terminal to control an image menu function of a first terminal by a wireless communication.

Referring to FIG. 7, if a user of the second terminal 200 selects an image menu execution icon within the manipulation unit by manipulating the input unit 220 such as a mouse, a keypad and the like, the controller 270 of the second terminal 200 transmits a signal for commanding an image menu execution selected by the user to the first terminal 100.

The controller 180 of the first terminal 100 executes the image menu according to the received command signal, as shown in (a) of FIG. 7, and then displays a list of images stored within the image menu. Moreover, the controller 180 of the first terminal 100 transmits screen information shown in (a) of FIG. 7 to the second terminal 200.

The controller 270 of the second terminal 200 receives the screen information shown in (a) of FIG. 7 from the first terminal 100 and then displays the received screen information. If '1. ajpg' 4a to be displayed is selected via the input unit 220, the controller 270 of the second terminal 200 transmits a signal for commanding a display of '1. ajpg' 4a to the first terminal 100.

Subsequently, the controller 180 of the first terminal 100 drives an image display application according to the received command signal and then displays the '1. ajpg' on the screen via the driven application, as shown in (b) of FIG. 7. Moreover, the controller 180 of the first terminal 100 transmits the screen information shown in (b) of FIG. 7 to the second terminal 200.

In the above description, a process for the second terminal 200 to control an operation of the first terminal 100 is explained in detail with reference to FIGS. 4 to 7.

Although the above description with reference to FIGS. 4 to 7 relates to the operation control process for the phonebook menu 1, the message menu 2, the camera menu 3 and the image menu 4 of the first terminal 100, it non-limits various implementations of the present invention. For instance, the second terminal 200 is able to control operations of any and all menu functions, or other icons or buttons of the first terminal 100.

Figure 8:
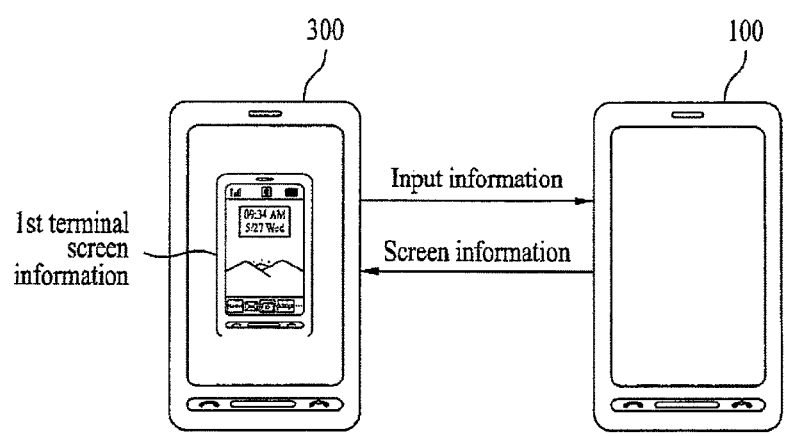
FIG. 8 is a diagram for explaining an operation control system including a first terminal of a mobile terminal type and a third terminal of a mobile terminal type according to the present invention.
Figure 9:
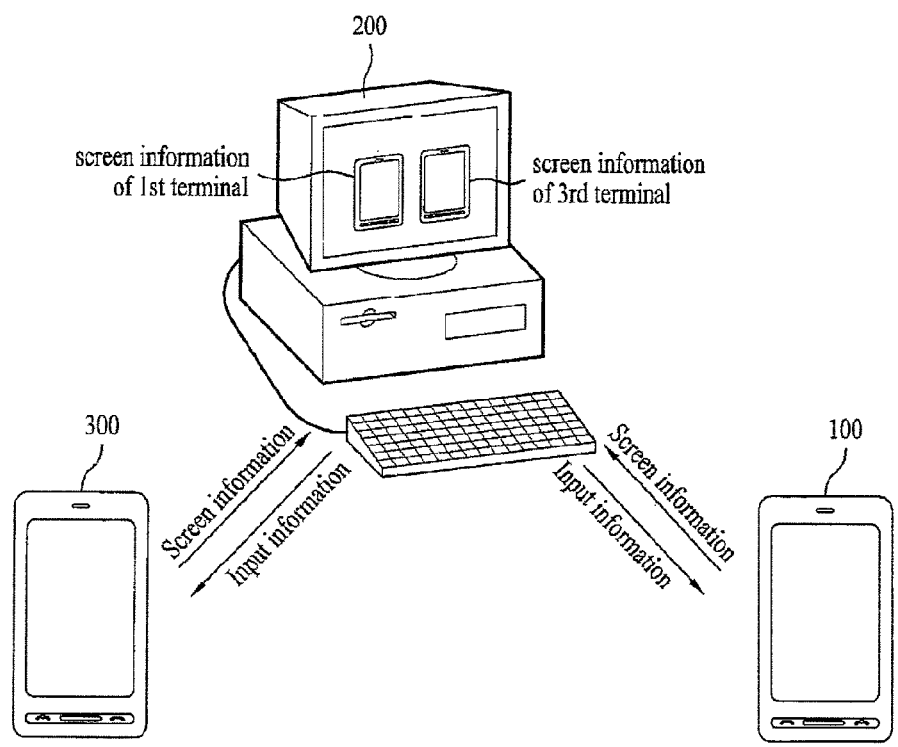
FIG. 9 is a diagram for explaining an operation control system including a second terminal of a PC type and a third terminal of a mobile terminal type according to the present invention.

An operation control system according to the present invention can include the first terminal 100 of a mobile terminal type and the second terminal 200 of a PC type, as shown in FIGS. 3 to 7, include the first terminal 100 of a mobile terminal type and a third terminal 300 of a mobile terminal type, as shown in FIG. 8, or include the second terminal 200 of a PC type and first and third terminals 100 and 300 of a plurality of mobile terminal types, as shown in FIG. 9.

In the following description, a communication access process between the first terminal 100 and the second terminal 200 in an operation control system according to the present invention is explained in detail with reference to FIG. 10 and FIG. 11.

Figure 10:
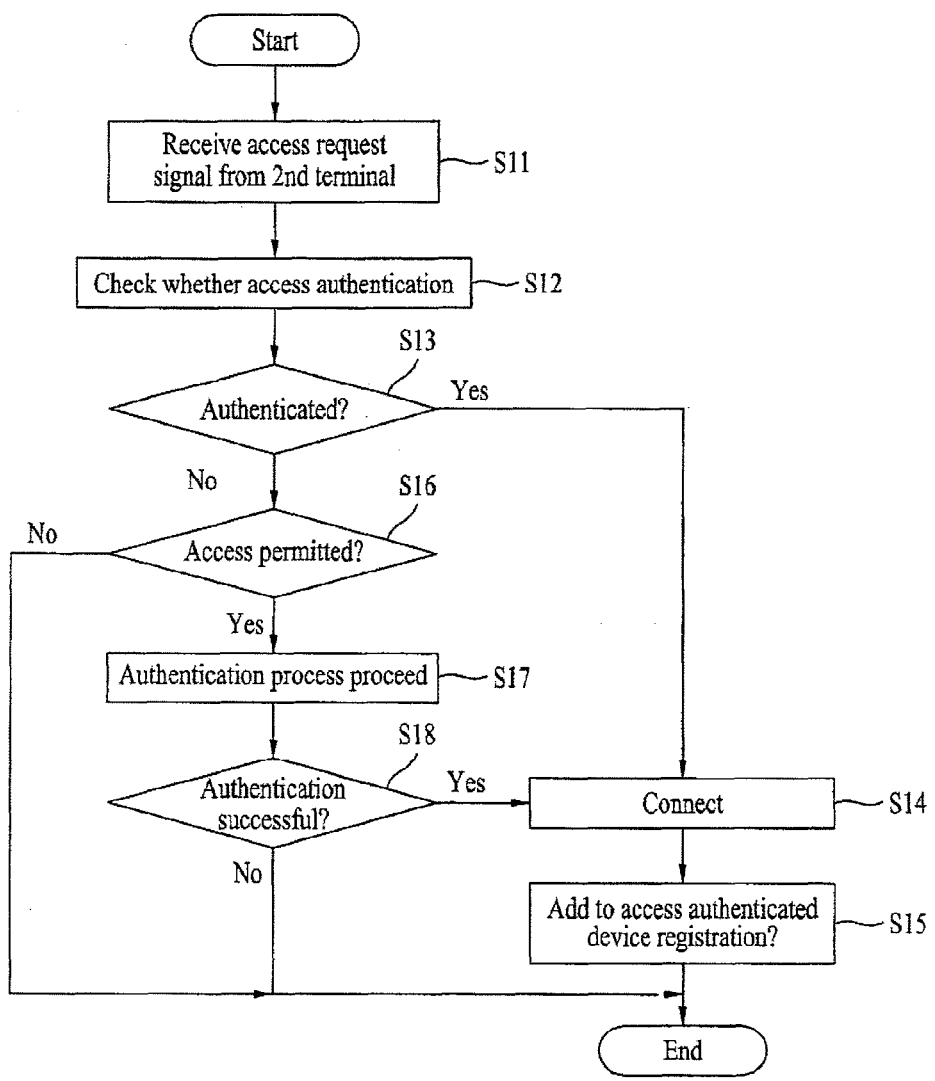
FIG. 10 is a flowchart of a process for a second terminal to access a communication with a first terminal in an operation control system according to the present invention.

FIG. 10 is a flowchart of a process for a second terminal to access a communication with a first terminal in an operation control system according to the present invention.

Referring to FIG. 10, If the controller 180 of the first terminal 100 receives a communication access request signal from the second terminal 200 via the communication unit 110 [S11], it checks whether the second terminal 200 is an accessible device by being authenticated in advance [S12].

In particular, the controller 180 checks whether device information on the second terminal 200 exists on an access authentication device information list stored in the memory 160. If the device information on the second terminal 200 exists on the access authentication device information list [S13], the controller 180 accesses a communication with the second terminal by sending a signal for permitting a communication access to the second terminal 200 via the communication unit 110 [S14].

Once the communication is connected to the second terminal 200, the controller 180 sends screen information currently displayed on the display unit 151 to the second terminal 200.

Meanwhile, the controller 180 compares the device information received from the second terminal 200 to the device information corresponding to the second terminal 200 on the access authentication device information list. If the former device information and the latter device information differ from each other, the controller 180 updates the device information received from the second terminal 200 on the access authentication device list [S15].

Yet, as a result of the checking step S12, if the device information of the second terminal 200 fails to exist on the access authentication device information list, the controller 180 displays a selection window for selecting a presence or non-presence of an access permission of the second terminal 200 on the screen of the display unit 151.

If 'access not permitted' is selected from the selection window, the controller 180 blocks an access of the second terminal 200. If 'access permitted' is selected from the selection window [S16], the controller 180 provides a user with an authentication process for the access of the second terminal 200 [S17]. If an authentication for the second terminal 200 is permitted by a user [S18], the controller 180 performs actions of the steps S14 and S15.

Figure 11:
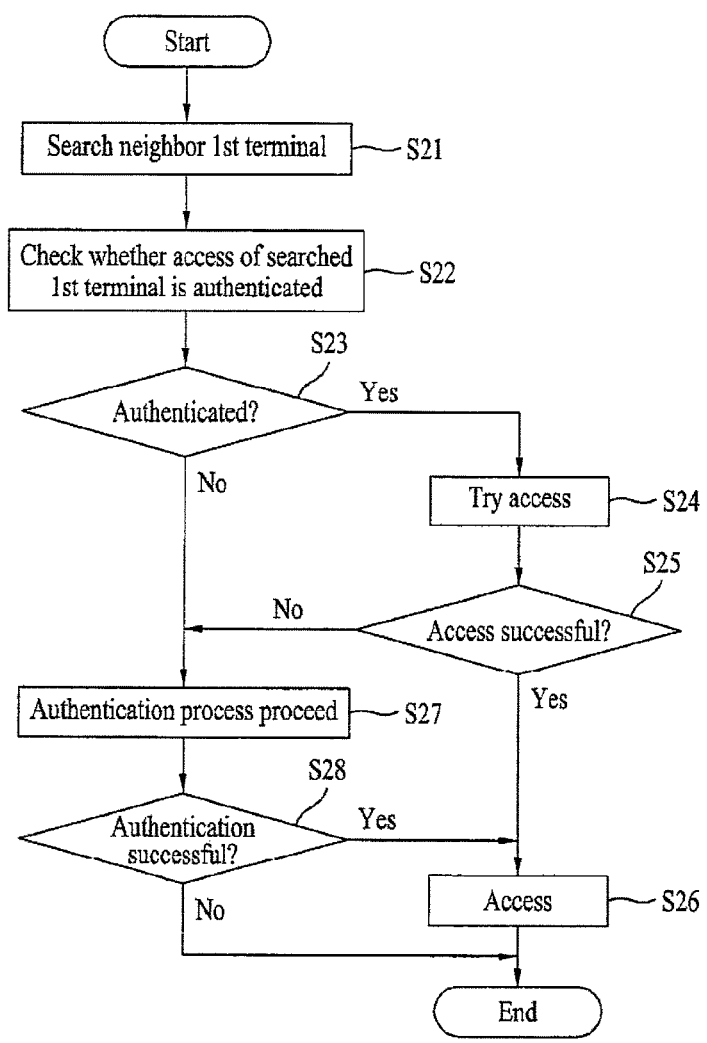
FIG. 11 is a flowchart of a process for a first terminal to access a communication with a second terminal in an operation control system according to the present invention.

FIG. 11 is a flowchart of a process for a first terminal to access a communication with a second terminal in an operation control system according to the present invention.

Referring to FIG. 11, if a command for accessing a communication with the first terminal for a remote control of the first terminal is inputted by a user via the input unit 220, the controller 270 of the second terminal 200 searches in the neighborhood for the first terminal 100 by controlling the communication unit 210 [S21].

In this case, the controller 270 is able to search in the neighborhood for the first terminal 100 using one of various search methods (e.g., device inquiry of Bluetooth, service discovery, etc.). Alternatively, the controller 270 is able to search for the first terminal 100 using TCP/IP based SSDP.

As a result of the searching step S21, if the first terminal 100 is found, the controller 270 checks whether the first terminal 100 is an access authenticated device [S22].

If the first terminal 100 is an accessible device [S23], the controller 270 transmits a signal for requesting a communication access to the first terminal 100 via the communication unit 210 [S24]. If a signal for permitting the access is received from the first terminal 100 via the communication unit [S25], the controller 270 connects the communication with the first terminal 100 [S26].

Yet, if the first terminal 100 is the device failing to be authenticated in the step S22, the controller 270 provides a user with a process for authenticating the access to the first terminal 100 [S27]. If the user permits the authentication for the first terminal 100 [S28], the controller 270 connects the communication with the first terminal 100.

In the above description, the communication connecting process between the first terminal 100 and the second terminal 200 is explained in detail In the following description, a process for compressing and decompressing screen information in a first terminal according to the present invention is explained in detail with reference to FIGS. 12 to 18.

First of all, an apparatus for compressing screen information of a first terminal of a mobile terminal type and an apparatus for decompressing the screen information in an operation control system according to the present invention are explained with reference to FIG. 12 as follows.

First Embodiment

Figure 12:
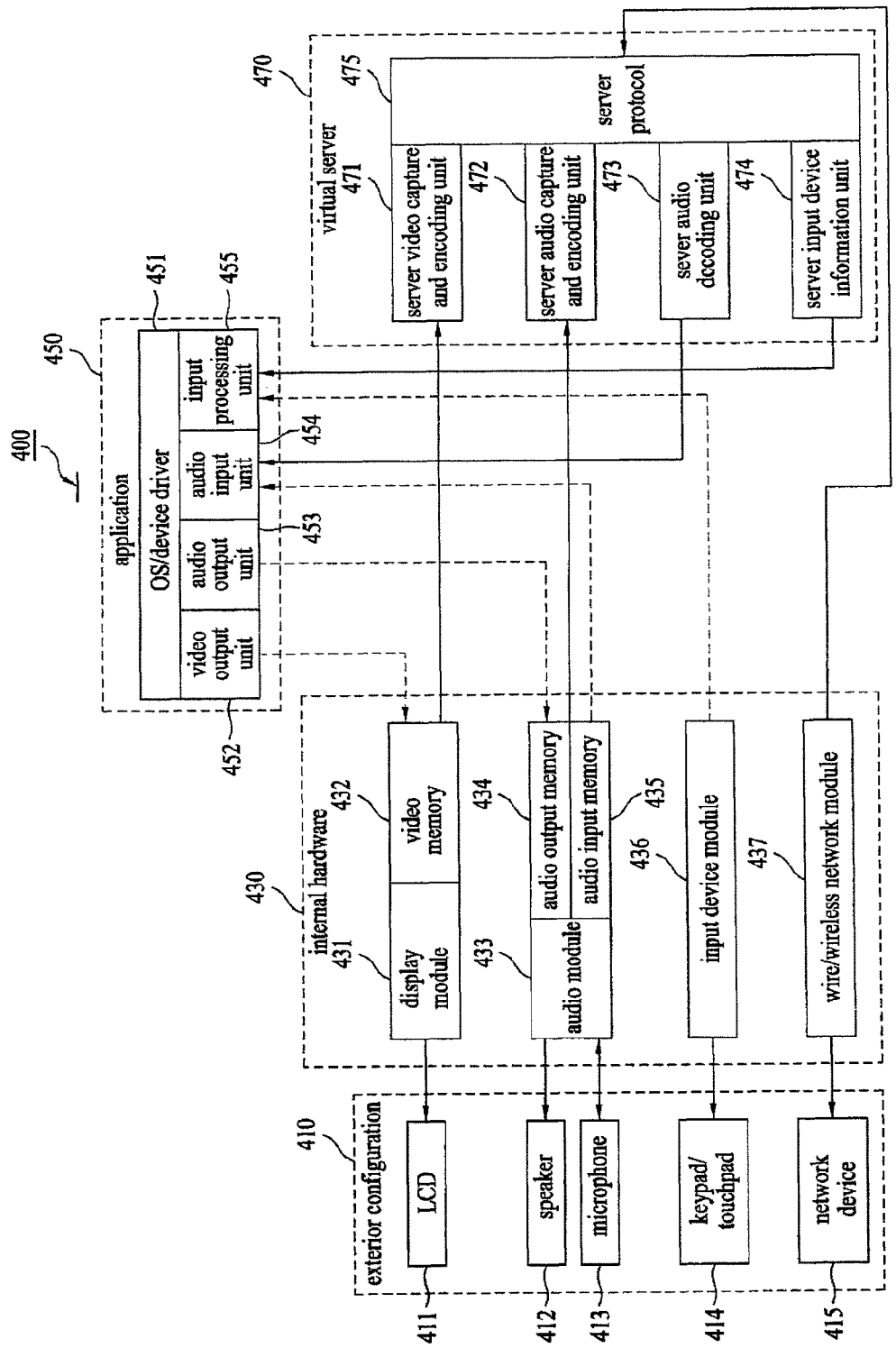
FIG. 12 is a block diagram of a first terminal for screen information compression in an operation control system according to a first embodiment of the present invention.

FIG. 12 is a block diagram of a first terminal for screen information compression in an operation control system according to a first embodiment of the present invention.

In the following description, the configuration of a first terminal 400 may have the same elements of the first terminal 100 shown in FIG. 1 or may not.

Yet, each of the first terminal 400 shown in FIG. 12 and the former first terminal 100 shown in FIG. 1 basically includes the same device of the mobile terminal type and can perform the same operations.

Namely, in the following description of the first embodiment, a process for compressing screen information using the first terminal 400 shown in FIG. 12 is explained.

Referring to FIG. 12, a first terminal 400 for implementing an operation control system includes an exterior configuration 410, an internal hardware 430, an application 450, a virtual server 470, a controller (this is the same of the controller 180 shown in FIG. 1, hereinafter indicated by a reference number 180), and the like.

The exterior configuration 410 of the first terminal 400 includes an LCD 411, a speaker 412, a microphone 413, a keypad/touchpad 414, a network device 415 and the like.

The internal hardware 430 includes a display module 431, a video memory 432, an audio module 433, an audio output memory 434, an audio input memory 435, an input device module 436, a wire/wireless network module 437, and the like. In this case, the video memory 432 stores and outputs video information on a screen of the first terminal 400. The wire/wireless network module 437 is connected to an external network device 415 and then transmits compressed and encoded video information to a second terminal 500.

The application 450 is implemented using software and includes an OS/device driver 451, a video output unit 452, an audio output unit 453, an audio input unit 454, an input processing unit 455 and the like.

The virtual server 470 is implemented using software and includes a server video capture and encoding unit 471, a server audio capture and encoding unit 472, a sever audio decoding unit 473, a server input device information unit 474, a server protocol 475 and the like.

The server video capture and encoding unit 471 of the virtual server 470 receives an input of video information on a screen of the first terminal 400 from the video memory 432 and then extracts low frequency information and middle frequency information from the inputted video information.

The server video capture and encoding unit 471 determines a variation extent of current screen information by comparing low frequency and middle frequency information of current video information to low frequency and middle frequency information of previous video information, respectively. The server video capture and encoding unit 471 determines the current video information as 'total variation', 'partial variation' or 'no variation' according to the variation extent.

If the current video information is determined as 'total variation', the server video capture and encoding unit 471 respectively quantizes the low frequency information and the middle frequency information of the current video information.

If the current video information is determined as 'partial variation', the server video capture and encoding unit 471 respectively quantizes the low frequency information and the middle frequency information of the current video information and then generates information indicating a difference from the former low frequency information of the previous video information and information indicating a difference from the former middle frequency information of the previous video information.

If the current video information is determined as 'no variation', the server video capture and encoding unit 471 extracts high frequency information from the current video information and then quantizes the extracted high frequency information. The server video capture and encoding unit 471 then performs entropy encoding on the compressed video information.

If the current video information is determined as 'no variation', the server video capture and encoding unit 471 quantizes the middle frequency information of the current video information and then generates difference information indicating a difference between the quantized middle frequency information and the former middle frequency information in 'total variation' or 'partial variation'. In this case, the quantization of the middle frequency information in 'no variation' has resolution higher than that of the middle frequency information in 'total variation' or 'partial variation'.

In doing so, in case of determining the variation extent of the current video information, the server video capture and encoding unit 471 calculates the number of pixels, of which variation between corresponding pixels is equal to or greater than a threshold, or a ratio of this number.

If the server video capture and encoding unit 471 determines the current screen information as 'no variation', it is able to further perform a step of sampling a predetermined number of pixels in current video information.

In doing so, the pixels sampled by the server video capture and encoding unit 471 are compared to the pixels sampled in the previous video information. In this case, if a difference between the corresponding pixels has the pixel number equal to or greater than a prescribed threshold or the number ratio is equal to or greater than a prescribed ratio, the current video information is re-determined as 'partial variation'. And, a process corresponding to 'partial variation' is performed.

The controller 180 compresses, encodes and outputs the video information of the first terminal 400 by controlling the video output unit 452 of the application and the server video capture and encoding unit 471 of the virtual server 450. In this case, an identifier corresponding to 'total variation', 'partial variation' or 'no variation' is attached to the outputted compressed video information. For instance, this identifier can be set to 0, 1 or 2.

In the configuration of the first terminal 400 to implement the operation control system, the exterior configuration 410 is connected to each of correspondent elements of the internal hardware 430. Each of the elements of the internal hardware 430 is controlled by the application 450. And, the virtual server 470 is connected to the application 450 and the hardware 430 to transceive data or commands.

Figure 13:
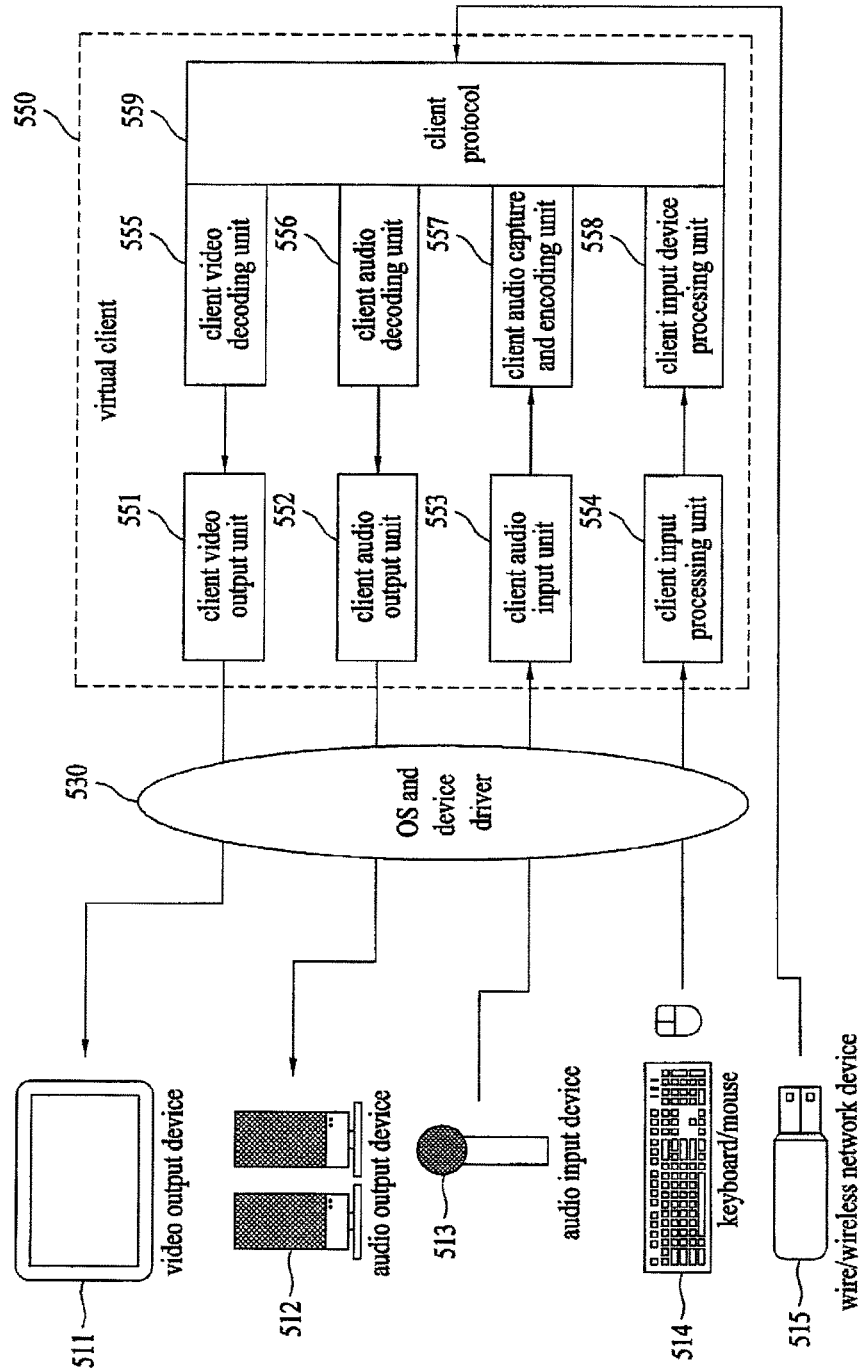
FIG. 13 is a block diagram of a PC type second terminal for decompression of compressed screen information in an operation control system according to a first embodiment of the present invention.

FIG. 13 is a block diagram of a PC type second terminal for decompression of compressed screen information in an operation control system according to a first embodiment of the present invention.

Referring to FIG. 13, a virtual client 550 includes elements that display video information received from the first terminal 400 via a wire/wireless network device 515. In this case, the elements include a client protocol 559, a client video decoding unit 555, a client audio decoding unit 556, a client audio capture and encoding unit 557, a client input device information unit 558 and the like, which are connected to an OS and hardware of a second terminal 500 via a client video output unit 551, a client audio output unit 552, a client audio input unit 553, a client input processing unit 554 and the like, respectively.

The virtual client 550 is connected to a video output device 511, an audio output device 512, an audio input device 513, a keyboard/mouse 514 and the like of the second terminal 500.

The client video decoding unit 555 shown in FIG. 13 decodes and decompresses the video information compressed and encoded by the server video capture and encoding unit 471 shown in FIG. 12. The decompression of the compressed video information follows a process reverse to the former process for compressing the video information.

The client video decoding unit 555 performs entropy decoding on the received compressed video information and then determines whether the video information is unique video information, differential video information or image quality recovery video information using an identifier contained in the compressed video information.

In case of determining the received video information as the unique video information using the identifier, the client video decoding unit 555 dequantizes low frequency information and middle frequency information of the unique video information and then synthesizes the dequantized low frequency information and the dequantized middle frequency information together. This synthesized video does not contain high frequency information and can be interpolated to output smooth reconstructed video information.

In case of determining the received video information as the differential video information using the identifier, the client video decoding unit 555 generates quantized low and middle frequency information from adding different information of the low and middle frequency information and the previous video information together and then dequantizes the low and middle frequency information. The dequantized low and middle frequency information are then synthesized together. In case of the differential video information, high frequency information is not contained in the synthesized video. Therefore, interpolation is preferably performed.

In case of determining the received video information as the image quality recovery video information using the identifier, the client video decoding unit 555 dequantizes high frequency information and then synthesizes the dequantized high frequency information with the reconstructed low and middle frequency information. Since the synthesized video in the process for reconstructing the image quality recovered vide information entirely contains the low frequency information, the middle frequency information and the high frequency information, it is unnecessary to perform the interpolation.

The video information decompressed by the client video decoding unit 555 is forwarded to the video output unit 251 and is then displayed on the video output device 511 of the second terminal 500.

The client video decoding unit 555 reconstructs high-resolution intermediate information from high-resolution middle frequency information generated from the compression process.

In this case, the reconstruction of the high-resolution middle frequency information can be expressed as $Q4(M)=Q4(Q2^{-1}(Q2(M)))+X(M)$. In this case, $Q2^{-1}(Q2(M))$ refers to the result from processing the unique video information or the differential video information that is used. The reconstructed high-resolution intermediate information is synthesized with the reconstructed high frequency information and the like.

The operation control system according to the present invention, as shown in FIG. 12 and FIG. 13, is implemented by the combination of hardware and software. In particular, the operation control system is realized by the virtual server 470 loaded in the first terminal 400 and the virtual client 550 loaded in the second terminal 500.

The virtual server 470 and the virtual client 550 are connected to each other by the network device 415 of the first terminal 400 and the wire/wireless network device 515 of the second terminal 500 by wire/wireless connection. According to this connection, the virtual server 470 compresses the video information on the screen of the first terminal 400 and then transmits the compressed video information to the virtual client 550 of the second terminal 500. Subsequently, the virtual client 550 delivers the video information received from the first terminal 400 to the video output device 511 by real time so that the delivered video information can be displayed on the video output device 511.

Figure 14:
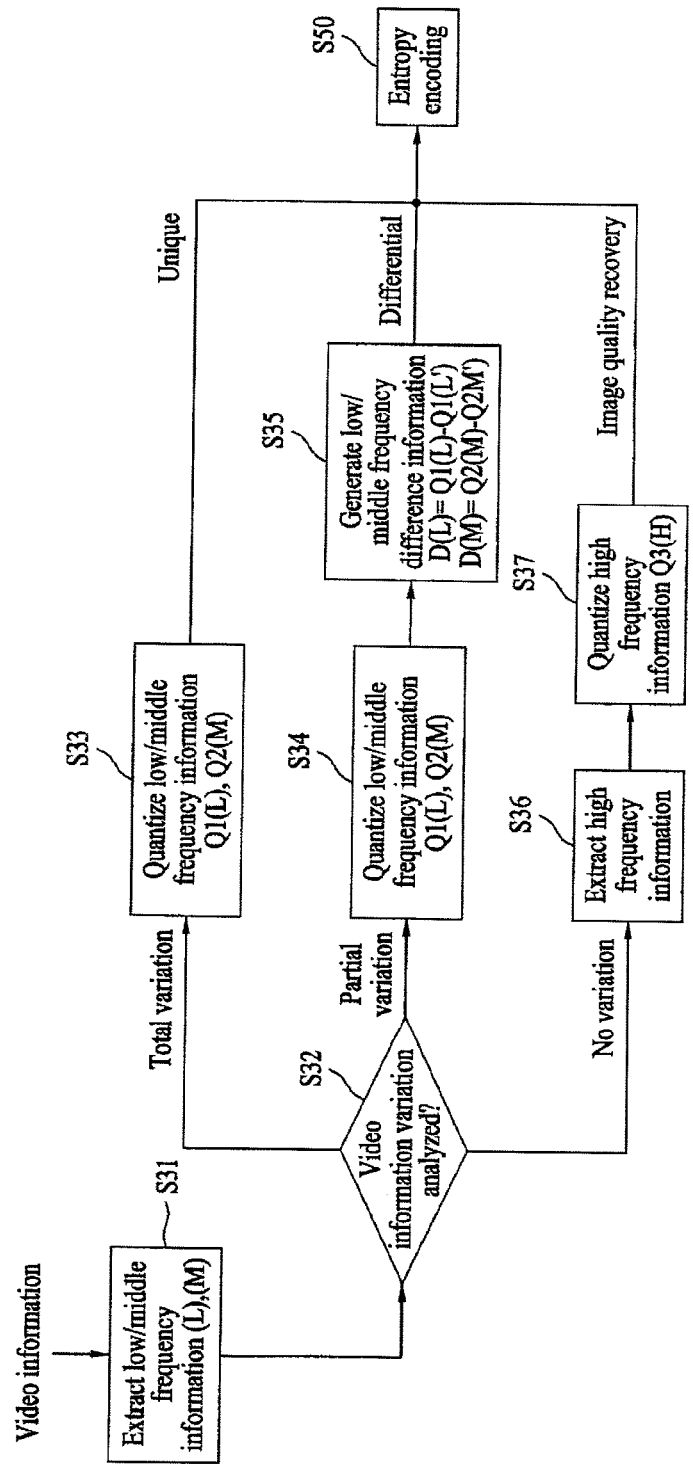
FIG. 14 is a flowchart of a process for compressing a video on a screen of a first terminal according to one embodiment of the present invention.

FIG. 14 shows one embodiment for video compression of the first terminal 400, which is performed by the server video capture and encoding unit 471 of the virtual server 470.

Referring to FIG. 14, a video compression of the first terminal 100 according to one embodiment of the present invention includes a step of extracting low frequency information and middle frequency information, a video information variation analyzing step of determining a variation extent of current video information by comparing the current video information to previous video information based on the extracted low and middle frequency information, a step of generating unique video information, differential video information or image quality recovery video information by differentiating a presence of non-presence of information on a difference from a quantization target according to the variation extent of the current video information, and a step of encoding each of the generated video information. The video compression of the first terminal 400 according to one embodiment is explained in detail with reference to FIG. 14 as follows.

First of all, a step S31 is the step of extracting low frequency information and middle frequency information from video information. A video of the first terminal is inputted as consecutive video information (e.g., frames).

For this extraction, the inputted video information is resolved into low frequency (L) information and intermediate frequency (M) information. When the video information is resolved into the low frequency information and the middle frequency information, wavelet transform is used. Preferably, for low operation amount, Harr wavelet is used. In this step, high frequency (H) information does not need to be extracted from the corresponding video information. This is because a user of the first terminal may not attempt to read letters if such a video variation as animation/scroll and the like is severe.

In the step S31, since the low frequency information and the middle frequency information has relatively low spatial resolution, the unique video information is reduced. Since the low frequency information and the middle frequency information are extracted from the video information, a compression ratio is high. The step S31 performs an integer addition/subtraction operation only or performs an integer addition/subtraction operation and a logical operation only.

A step S32 is the step of analyzing a variation extent of current video information compared to previous video information. In this step, low frequency information and middle frequency information of previous video information are compared to low frequency information and middle frequency information of current video information, respectively.

First of all, low frequency information is compared. A threshold for evaluating a variation extent between a pixel corresponding to low frequency information of previous video information and a pixel corresponding to low frequency information of current video information is preferentially determined. This threshold refers to an extent for recognizing that there is a variation. And, the threshold can be various selectable as 10%, 20%, 30%, 50%, etc. The number of pixels having the variation equal to or greater than the threshold between pixels is then calculated.

Subsequently, middle frequency information is compared. It is analyzes whether a variation extent between a pixel corresponding to middle frequency information of previous video information and a pixel corresponding to middle frequency information of current video information deviates from the threshold. And, the number of pixels deviating from the threshold is calculated.

In this case, a variation threshold of low frequency information is applicable to the threshold. And, a threshold can be differently set by considering a characteristic of the middle frequency information.

The number of pixels deviating from the threshold range for the low frequency information and the number of pixels deviating from the threshold range for the middle frequency information are added together.

In this case, according to how much a ratio is occupied in the total pixel number by the added number of pixels, the current video information can be determined as 'total variation', 'partial variation' or 'no variation'.

For instance, if the ratio of the number of pixels recognizable as having variations is equal to or greater than 50%, it is determined that the current video information has a considerable video variation by being compared to the previous video information. And, the variation extent of the current video information is determined as 'total variation'. If the ratio of the number of pixels recognizable as having variations is 5%~50%, it is determined that the current video information has a partial video variation. And, the variation extent of the current video information is determined as 'partial variation'.

If the ratio of the number of pixels recognizable as having variations is smaller than 5%, it is determined that the current video information has no video variation by being compared to the previous video information. And, the variation extent of the current video information is determined as 'no variation'.

In this case, although the determination references of the number ratio are set to 50% and 5%, it is able to variously set the number ratio determination references to 70% and 10% or 50% and 0%, or the like. Instead of using the number ratio, it is able to use the numbers of 10, 20, 30 and the like as the determination references.

A step S33 is the step of generating unique video information by respectively quantizing low frequency information and middle frequency information if the current video information is determined as 'total variation'. In this case, the unique video information refers to the video information that contains original video information intact. Specifically, the unique video information is the video information resulting from eliminating high frequency information from original video information.

In this case, since low frequency information contains most important information, quantization for the low frequency information has highest resolution. Quantization for the intermediate information has resolution lower than that of the low frequency information.

Steps S34 and S35 are the step of if the current video information is determined as 'partial variation', quantizing the low frequency information and the middle frequency information of the current video information (Q1(L), Q2(M)), respectively and the step of generating differential video information by comparing the quantized low frequency information and the quantized middle frequency information of the current video information to quantization results of low frequency information and middle frequency information of the previous video information, respectively.

In this case, the differential video information refers to the video information generated from difference information between the current video information and the previous video information in the low frequency information and the middle frequency information.

As can be observed from the step S35, the difference information in the low frequency information and the difference information in the middle frequency information can be expressed as D(L)=Q1(L)−Q1(L') and D(M)=Q2(M)+Q2(M'), respectively. In this case, the D(L) indicates the difference information on the low frequency information and the D(M) indicates the difference information on the middle frequency information. The Q1(L) indicates a result from quantizing the low frequency information of the current video information. The Q1(M) indicates a result from quantizing the middle frequency information of the current video information. The Q1(L') indicates a result from quantizing the low frequency information of the previous video information. And, the Q1(M') indicates a result from quantizing the middle frequency information of the previous video information.

In the step S35, quantization resolution of the low and middle frequency information is maintained equal to that of the low and middle frequency information in case of being determined as 'total variation'.

By finding the difference information in the steps S34 and S35, a varying part is left as a meaningful value only. As a result, a considerable amount of data (non-varying part) is compressed in an encoding process.

Steps S36 and S37 are the step of extracting high frequency information from the current video information if the current video information is determined as 'no variation' and the step of generating image quality recovery video information by quantizing (Q3(H)) the extracted high frequency information.

The image quality recovery video information contains additional information for the image quality recovery only because the low frequency information and the middle frequency information were delivered in the previous step. By the image quality recovery video information, an image quality can be enhanced well enough to identify a small letter.

Thus, the method of transmitting high frequency information is taken only if there is no video variation. This is because a user of the first terminal is not inconvenient to read letters when a video variation stops. In particular, this is the result in considering a user's habit in using the first terminal.

In this case, although the high frequency information has high spatial resolution, its value is almost 0. Hence, considerable compression occurs in the course of entropy encoding. Moreover, since the high frequency information is a region insensitive to the eyes, a quantization process for lowest resolution is performed thereon.

The unique video information, the differential video information and the image quality recovery video information generated from the steps S33 to S37 are entropy-encoded in a step S50. And, such an identifier as 0, 1, 2 and the like is given to each of the video information.

The identifiers are transmitted to the virtual client of the second terminal by being respectively contained in the unique video information, the differential video information and the image quality recovery video information. If the compressed unique video information, differential video information and image quality recovery video information are decompressed by the virtual client 50 of the second terminal, a type of the transmitted video information can be identified by the corresponding identifier.

Figure 15:
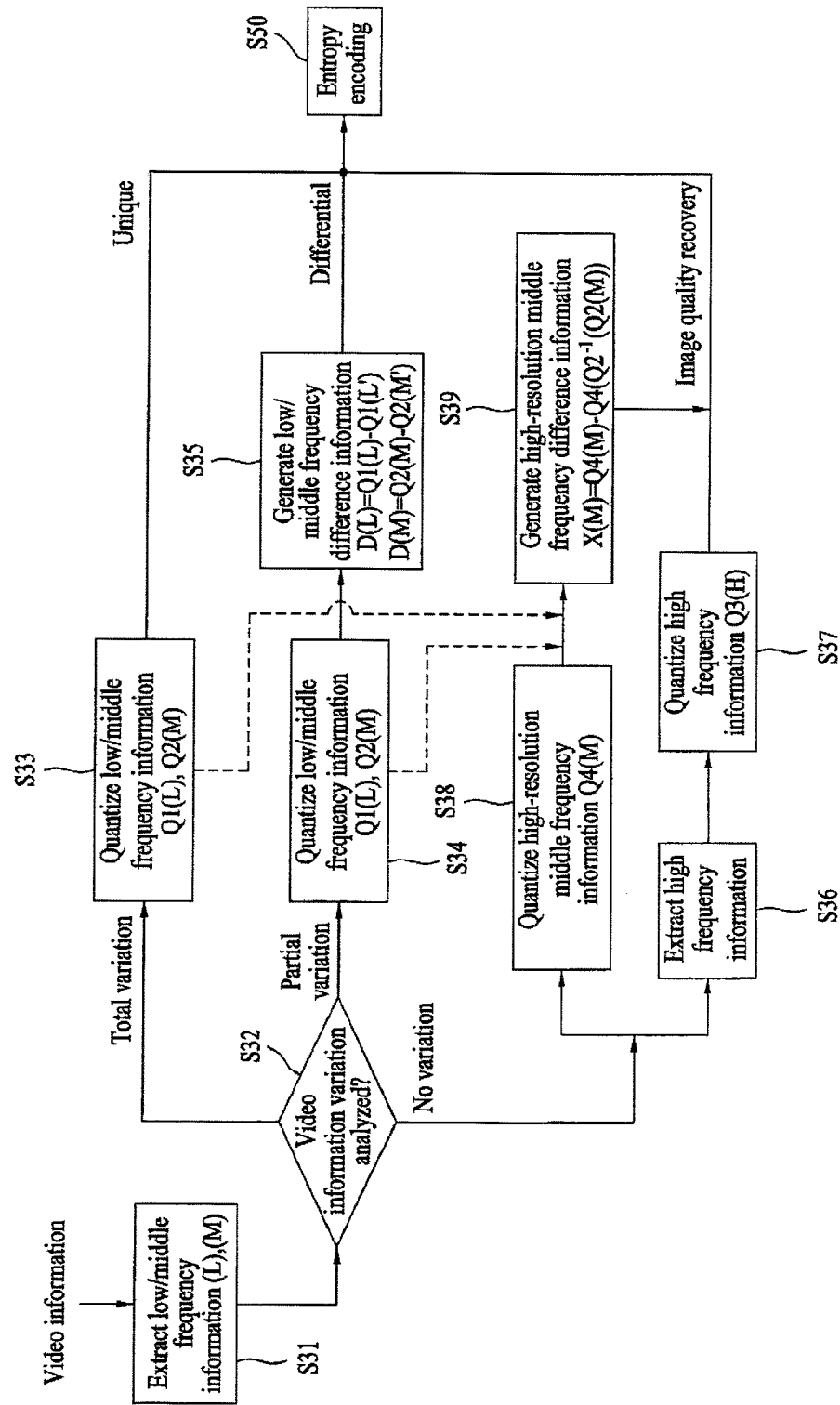
FIG. 15 is a flowchart of a process for compressing a video on a screen of a first terminal according to another embodiment of the present invention.

FIG. 15 shows another embodiment of a first terminal video compression.

Referring to FIG. 15, in the first terminal video compression according to another embodiment performed by the server video capture and encoding unit 471 of the virtual server 470, the steps S38 and S39 in case of determining the current video information as 'no variation' in FIG. 14 are further included.

The step S38 is the step of quantizing (Q4(M))) middle frequency information with quantization resolution higher than that of the middle frequency information of 'total variation' or 'partial variation'. In particular, the step S38 further enhances an image quality of the middle frequency information.

The quantization result of the step S38 is sent to the encoding step after the difference information and the quantization result of the middle frequency information of the 'total variation' or the 'partial variation' have been generated.

As can be observed from the formula of 'X(M)=Q4(M)−Q4(Q2$^{-1}$(Q2(M)))' in the step S39, the high-resolution middle frequency difference information is generated in a manner of dequantizing the result of quantizing the middle frequency information with high resolution and the result of quantization of the middle frequency information of the 'total variation' or the 'partial variation' and a difference of a result from quantizing it with high resolution.

The step S39 is the process for further compressing the quantized result in the step S38.

Figure 16:
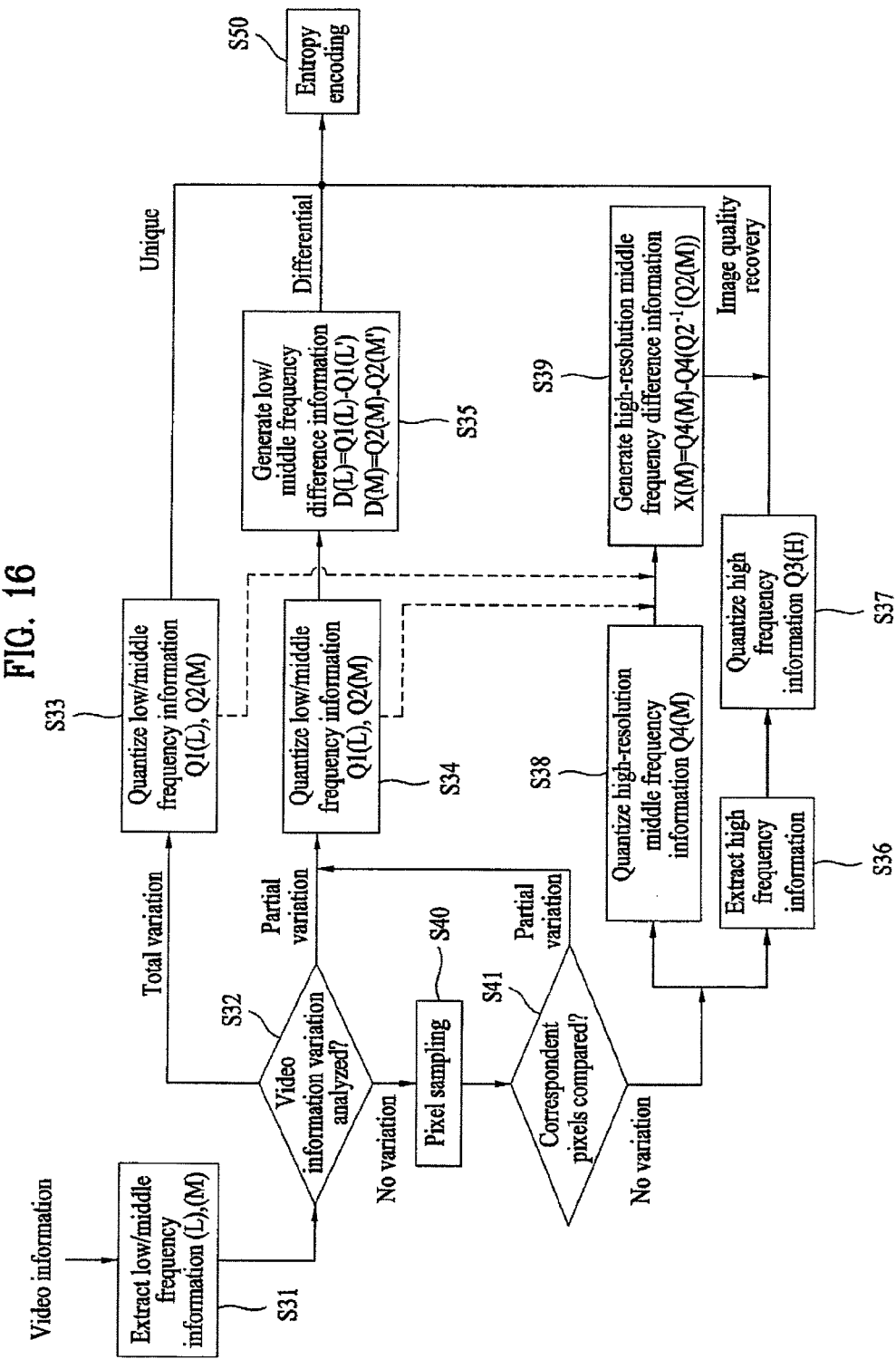
FIG. 16 is a flowchart of a process for compressing a video on a screen of a first terminal according to a further embodiment of the present invention.

FIG. 16 shows a first terminal video compression according to a further embodiment of the present invention.

Referring to FIG. 16, in the first terminal video compression according to a further embodiment performed by the server video capture and encoding unit 471 of the virtual server 470, the steps S40 and S41 in case of determining the current video information as 'no variation' in FIG. 14 and FIG. 15 are further included.

In FIG. 16, if current video information is determined as 'no variation', it is determined again whether the current video information may be determined as 'partial information'.

In the step S40, a prescribed number of pixels corresponding to each other among pixels of current and previous video information are sampled. In this case, the number of sampled pixels is determined in consideration of operation capability of the first terminal. For instance, 9, 12, 15, 16 or 20 pixels can be variously determined for each video information.

In the step S41, pixels sampled in the current video information are compared to pixels sampled in the previous video information. In this case, the number of pixels exceeding a threshold between the pixels sampled in the current video information and the pixels sampled in the previous video information is equal to or greater than a prescribed number or a prescribed ratio, the current video information is re-determined as 'partial variation'.

In this case, the prescribed number of the comparison reference can be set to 1. And, the prescribed ratio can be variously set to 3%, 5%, 10% or the like. If it is determined as 'partial variation' in this step, the step S34 is performed. If it is still determined as 'no variation', the step S36 or S38 is performed.

In the following description, a process for decompressing a compressed video received from the first terminal by the virtual client of the second terminal is explained with reference to FIG. 17 and FIG. 18.

Figure 17:
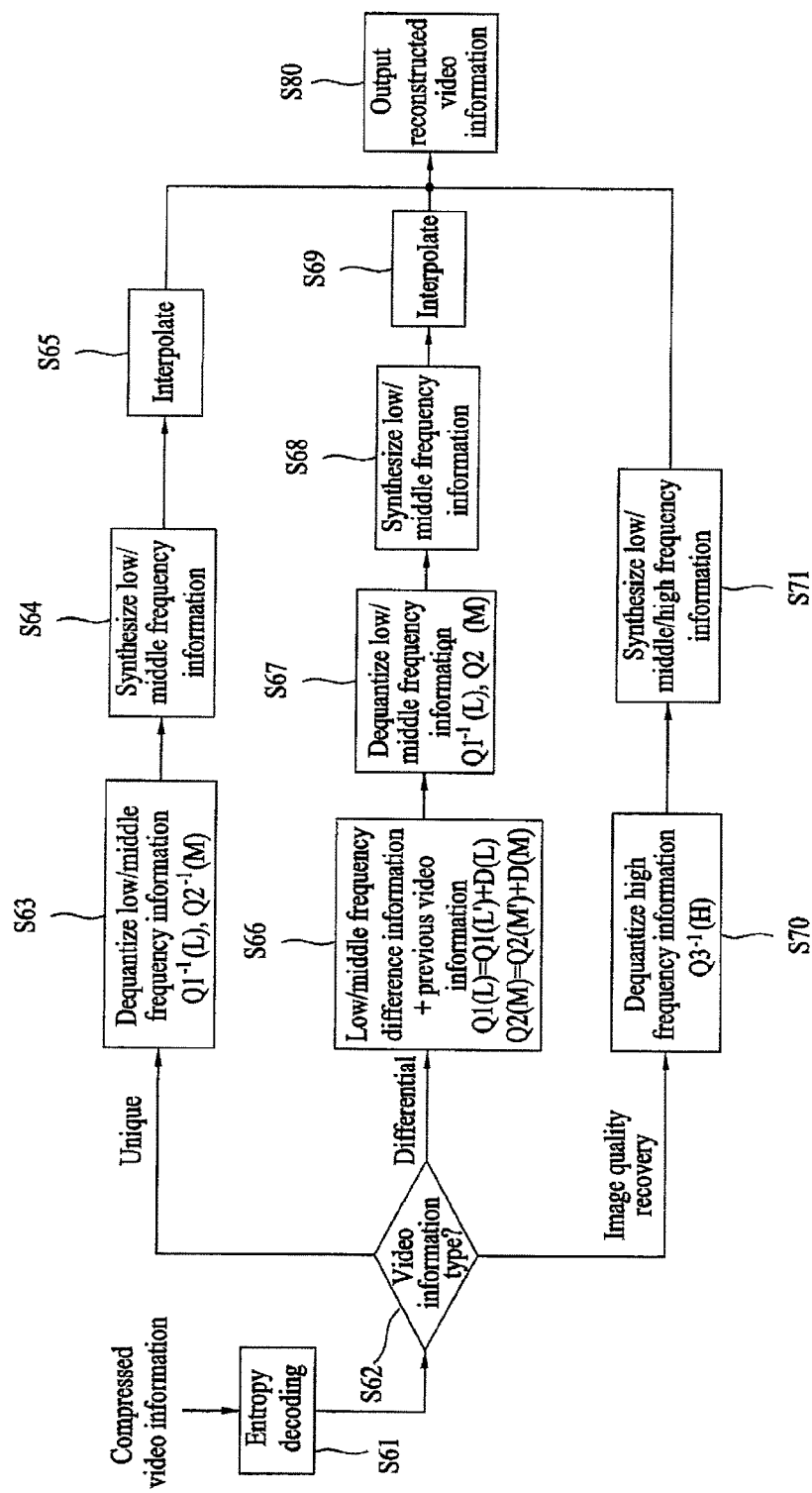
FIG. 17 is a flowchart of a process for decompressing a compressed video shown in FIG. 14 according to a first embodiment of the present invention.
Figure 18:
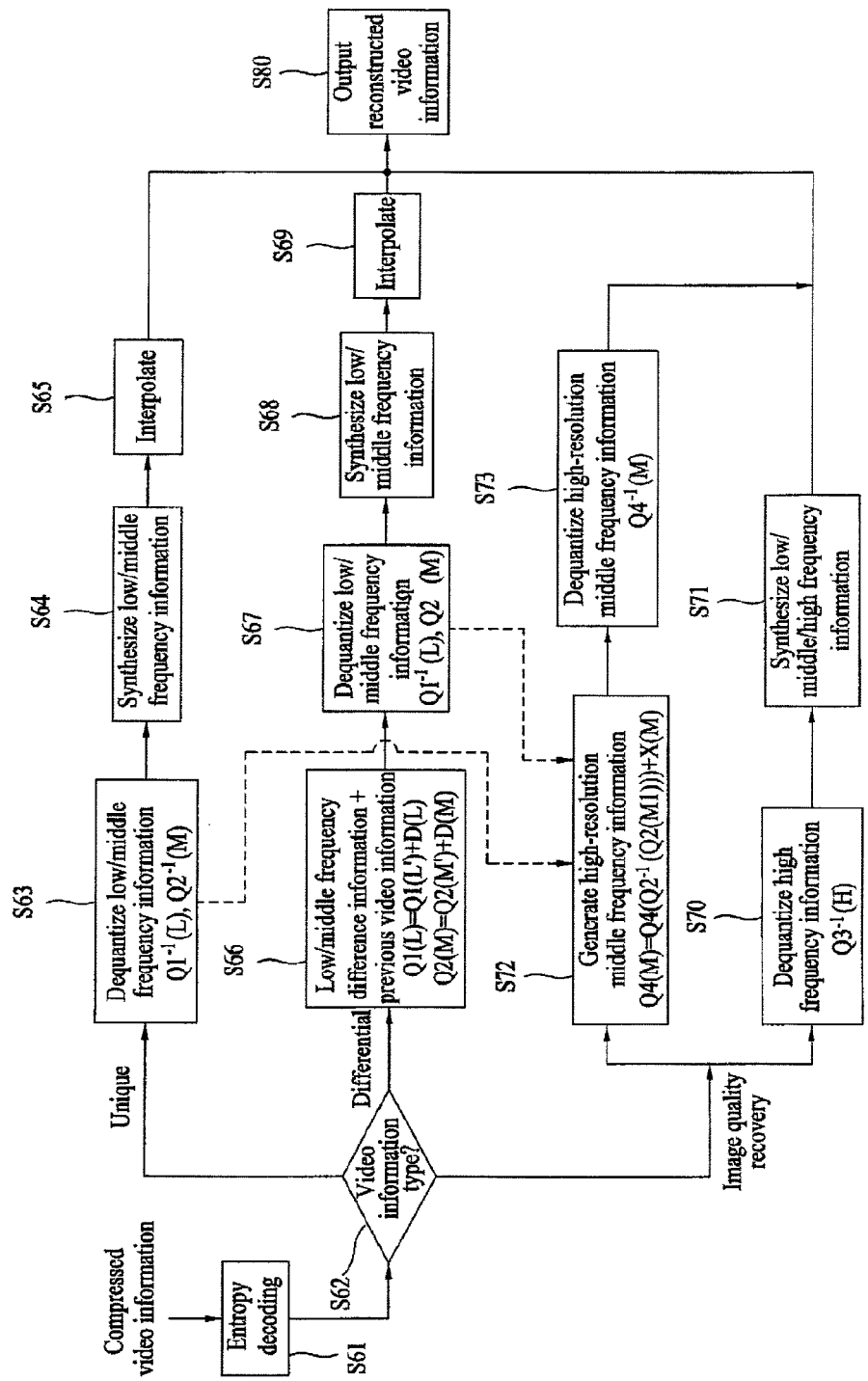
FIG. 18 is a flowchart of a process for decompressing a compressed video shown in FIG. 15 according to a first embodiment of the present invention.

Embodiments shown in FIG. 17 and FIG. 18 correspond to a process reverse to that shown in FIG. 14 and FIG. 15. Without detailed explanation, the decompression process shown in FIG. 14 and FIG. 15 is apparent to those skilled in the art, who understand the compression process.

FIG. 17 shows one embodiment for decompressing the compressed video shown in FIG. 14. In particular, the embodiment shown in FIG. 17 is performed by the client video decoding unit 555 of the virtual client 550 of the second terminal.

Referring to FIG. 17, compressed data is entropy-decoded in a step S61. Subsequently, in a step S62, whether video information received from the first terminal is unique video information, differential video information or image quality recovery video information is determined using an identifier included in each of the video information.

First of all, a case in which the received video information is determined as the unique video information in the step S62, quantized low and middle frequency information of the unique video information are dequantized in a step S63.

Subsequently, in a step S64, the dequantized low frequency information and the dequantized middle frequency information are synthesized together. Since the synthesized video does not contain high frequency information, interpolation can be performed like a step S65. As a result of this interpolation, it is able to output smoother reconstructed video information.

If the received video information is determined as the differential video information in the step S62, quantized low frequency information and quantized middle frequency information are generated from adding differences of the low and middle frequency information to the previous video information in a step S66.

In a step S67, the low frequency information and the middle frequency information are dequantized. Subsequently, in a step S68, the dequantized low frequency information and the dequantized middle frequency information are synthesized together. Since high frequency information is not contained in the synthesized video in case of the differential video information, it is able to perform interpolation like a step S69.

If the received video information is determined as the image quality recovery video information in the step S62, quantized high frequency information is dequantized in a step S70. Subsequently, in a step S71, the dequantized high frequency information and the already-reconstructed low and middle frequency information are synthesized together. Thus, as the process for reconstructing the image quality recovery video information includes the low, middle and high frequency information, it is unnecessary to perform the interpolation.

Finally, the reconstructed video information processed in each of the above-described cases is sent to the video output unit 551 in a step S80.

FIG. 18 shows another embodiment for decompressing the compressed video shown in FIG. 15.

In FIG. 18, a process for reconstructing high resolution middle frequency information from the high resolution middle frequency difference information generated from the compressing process shown in FIG. 15 is further included.

Referring to FIG. 18, a quantization result of the high-resolution middle frequency is reconstructed by the formula of '$Q4(M)=Q4(Q2^{-1}(Q2(M)))+X(M)$' in the step S72.

In this case, $Q2^{-1}(Q2(M))$ uses a processing result of the unique video information or the differential video information. Subsequently, the high resolution middle frequency quantization result is dequantized in a step S73 to reconstruct the high resolution middle frequency information.

Thus, the video compression and decompression process of the first and second terminals according to the first embodiment of the present invention is explained in detail.

In the following description, a data transmitting and receiving operation process and a communication connecting operation process between a first terminal and a second terminal in an operation control system according to embodiments of the present invention are explained in details.

Second Embodiment

According to a second embodiment of the present invention, when screen information of a first terminal is displayed on a second terminal, content information contained in the screen information of the first terminal can be easily recognized in the second terminal. And, the content information of the first terminal can be freely used and edited in the second terminal.

In the following description of the first to third embodiments of the present invention, assume that the first terminal of a mobile terminal type and the second terminal of a PC type are used.

Of course, the above assumption is made to clarify the description of the first to third embodiments of the present invention. Alternatively, each of the first and second terminals according to the first to third embodiments of the present invention can have a mobile terminal type. Alternatively, each of the first and second terminals according to the first to third embodiments of the present invention can include a stationary terminal.

Therefore, the first and second terminals according to the first to third embodiments of the present invention can include terminals capable of communication by including a screen display device and an input device.

A first embodiment of the present invention is explained in detail with reference to FIG. 19 as follows.

Figure 19:
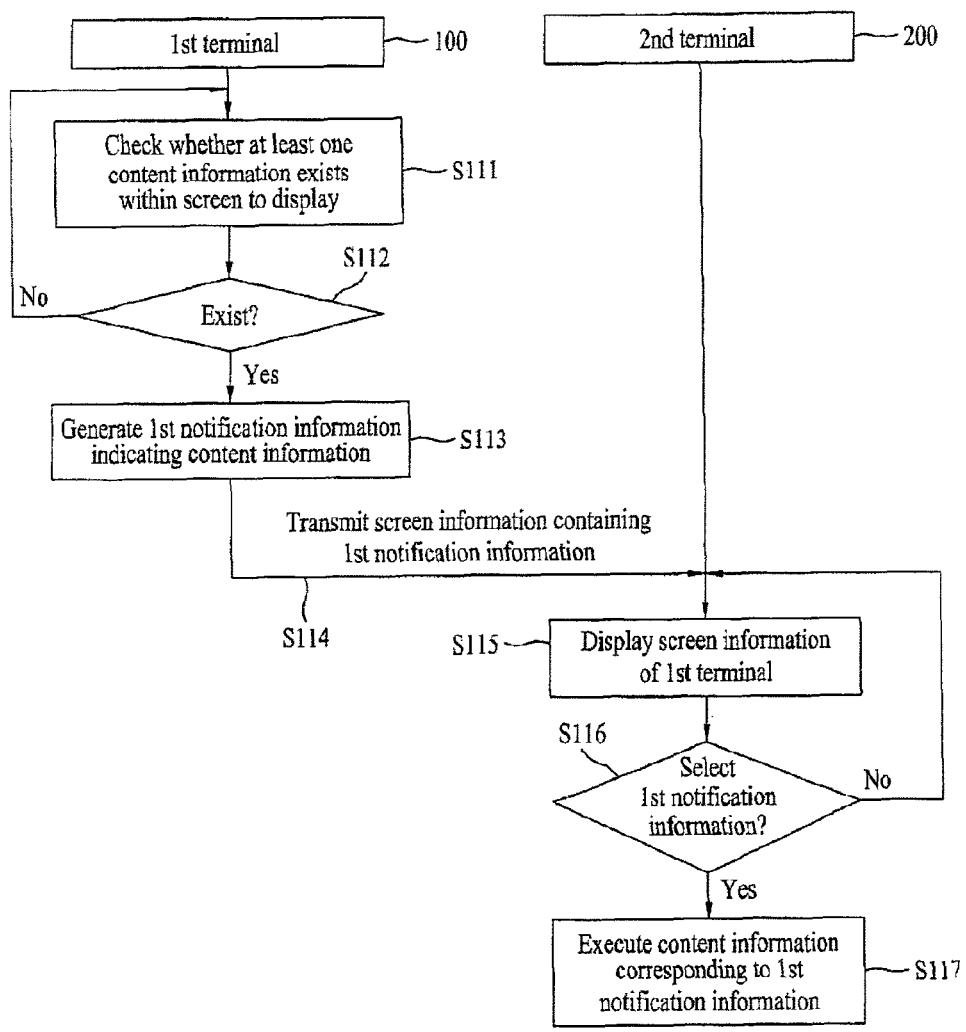
FIG. 19 is a signal processing diagram for a data transceiving process between a first terminal and a second terminal in an operation control system according to a second embodiment of the present invention.

FIG. 19 is a signal processing diagram for a data transceiving process between a first terminal 100 and a second terminal 200 in an operation control system according to a first embodiment of the present invention.

Referring to FIG. 19, the controller 180 of the first terminal 100 checks whether at least one content information exists within screen information to be initially displayed on the display unit 151 [S111].

In this case, the at least one content information can include a text, an image, a received message, contact information within a phonebook, an audio file, a photo file, a video file, a game file, schedule information, a document file, an electronic dictionary file, a calculator file, webpage address information and the like.

In particular, the content information includes all data existing within a menu function of the first terminal 100. And, the contact information can include a mobile phone number, name, home phone number and email address of a correspondent party, etc.

In this case, if the at least one content information exists within the screen information to be displayed [S112], the controller 180 generates first notification information announcing the content information via the screen information [S113]. And, the controller 180 transmits the generated first notification information to the second terminal 200 via the communication unit 110 by having the generated first notification information included in the screen information to display [S114].

In this case, the first notification information may be generated in form of a text indicating the content information, a 2- or 3-dimensional image, an icon, an animation, a watermark, a barcode or the like.

In this case, the controller 180 transmits the screen information containing the first notification information to the second terminal 200 by compressing the screen information by the processes shown in FIGS. 14 to 16.

In particular, the controller 180 is able to compress the screen information containing the first notification information therein using a video or still picture compression scheme. For example, the screen information can be compressed using such a video compression scheme as JPEG, PNP, MPEG, H.264, etc.

Moreover, in case of transmitting audio information outputted from the audio output module 152 to the stationary terminal 200, the controller 180 is able to compress the audio information using an audio compression scheme. For example, the audio information can be compressed using such an audio compression scheme as MP3, MP4, SBC, ADPCM, Ogg Vorbis, etc.

In case of transmitting screen information containing first notification information compressed by the above process to the second terminal 200, the controller 180 is able to transmit the screen information using a VDP standard protocol (video) and A2DP standard protocol (audio) of Bluetooth.

A first notification information generating process and a first notification information transmitting process in the controller 180 are explained in detail with reference to FIG. 20 and FIG. 21 as follows.

Figure 20:
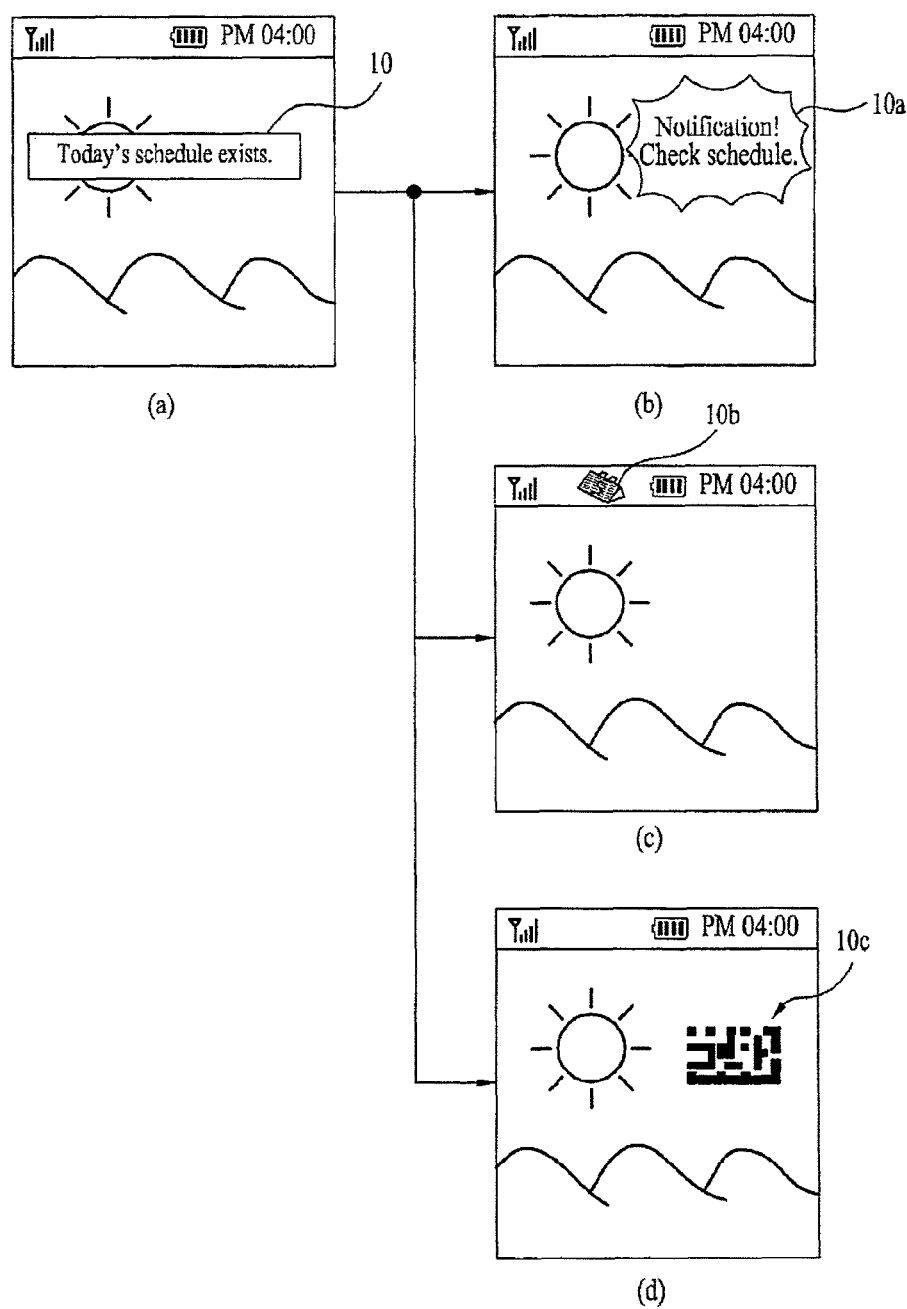
FIG. 20 and FIG. 21 are diagrams for screen configurations to explain a process for a first terminal to generate first notification information according to a second embodiment of the present invention.
Figure 21:
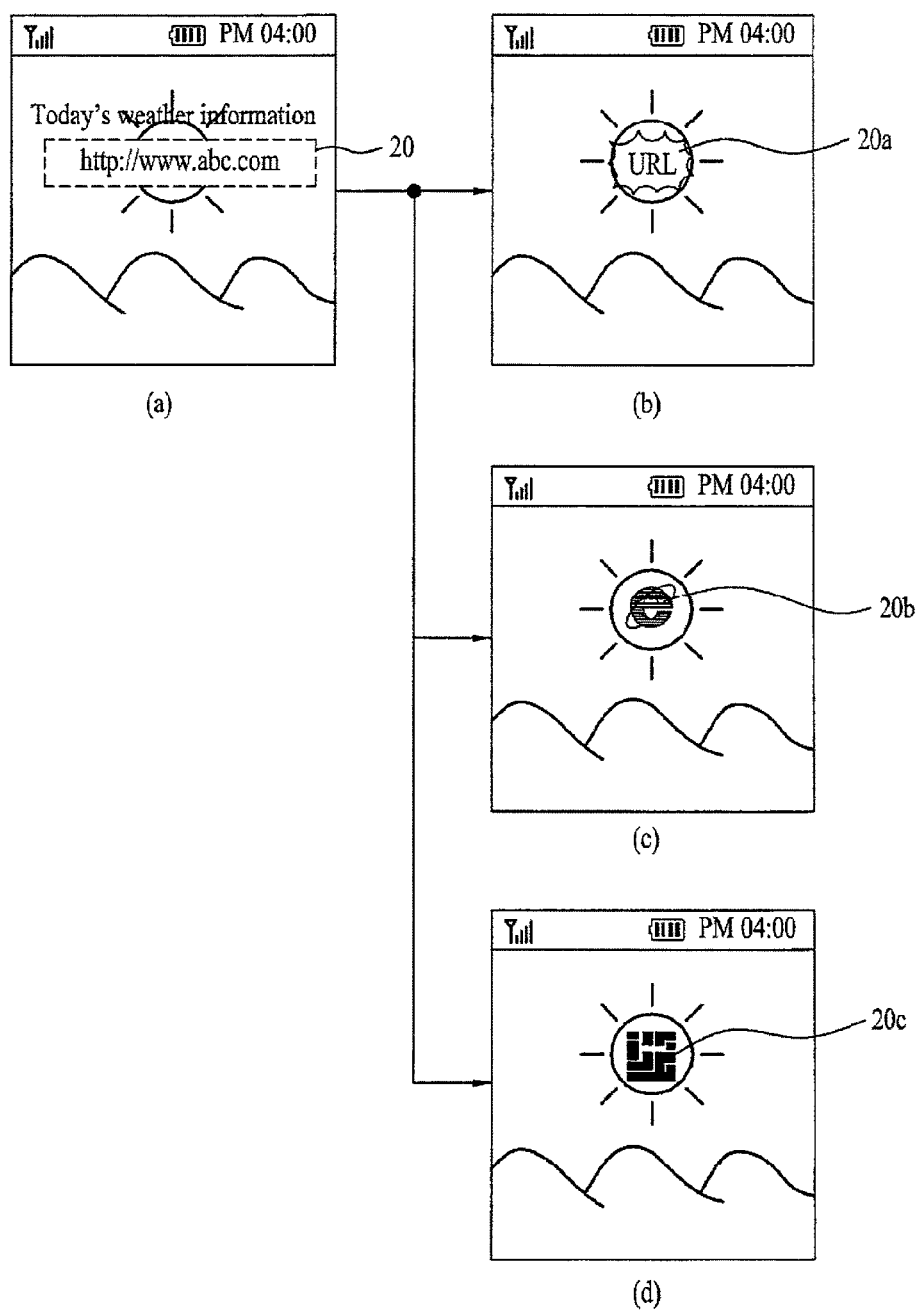

FIG. 20 and FIG. 21 are diagrams for screen configurations to explain a process for a first terminal to generate first notification information according to a second embodiment of the present invention.

Referring to (a) of FIG. 20, if schedule content information exists within a screen to display, the controller 180 of the mobile terminal 100 generates text type first notification information 10a notifying the schedule content information 10, as shown in (b) of FIG. 13. the controller 180 is then able to transmit the text type first notification information 10a to the second terminal 200 by having the text type first notification information included in the screen information to display.

In (b) of FIG. 20, shown is the screen information containing the text type first notification information 10a received by the second terminal 200 from the first terminal 100 that is displayed.

In this case, the controller 180 of the first terminal is able to transmit the first notification information 10a in a manner of synthesizing or overlapping the first notification information 10a around a region on which the schedule information 10 is displayed.

Alternatively, instead of displaying the schedule information 10, the controller 180 of the first terminal 100 is able to transmit the first notification information 10a in a manner to synthesize or overlap the first notification information 10a with a region where the schedule information 10 is located only.

Alternatively, the controller 180 of the first terminal 100 is able to transmit the first notification information 10a in a manner to synthesize or overlap the first notification information 10a within an indicator region of the screen information.

Alternatively, the controller 180 of the first terminal 100, as shown in (c) of FIG. 20, generates an icon type first notification information 10b notifying the schedule information 10 and is then able to transmit the generated icon type first notification information 10b to the second terminal 200 by having the icon type first notification information 10b included in the screen information to display.

In this case, in (c) of FIG. 20, shown is the screen information, in which the icon type first notification information 10b received from the first terminal 100 by the second terminal 200 is included, that is displayed.

The controller 180 of the first terminal 100 generates first notification information 10c notifying the schedule information 10 as a barcode type, as shown in (d) of FIG. 20, and is then able to transmit the generated barcode type first notification information 10c to the second terminal 200 by having it included in the screen information.

Referring to (a) of FIG. 21, if webpage address content information 20 exists within a screen to display, the controller 180 of the first terminal 100 generates text type first notification information 20a notifying the webpage address content information 20, as shown in (b) of FIG. 21, and is then able to transmit the text type second notification information 20a to the second terminal 200 by having it included in the screen information to display.

In (b) of FIG. 21, shown is the screen information containing the text type first notification information 20a received by the second terminal 200 from the first terminal 100 that is displayed.

In this case, the controller 180 of the first terminal is able to transmit the first notification information 20a in a manner to synthesize or overlap the first notification information 20a around a region on which the webpage address content information 20 is displayed.

Alternatively, instead of displaying the webpage address content information 20, the controller 180 of the first terminal 100 is able to transmit the first notification information 20a in a manner to synthesize or overlap the first notification information 20a with a region where the webpage address content information 20 is located only.

Alternatively, the controller 180 of the first terminal 100 is able to transmit the first notification information 20a in a manner to synthesize or overlap the first notification information 20a within an indicator region of the screen to display.

Alternatively, the controller 180 of the first terminal 100, as shown in (c) of FIG. 21, generates icon type first notification information 20b notifying the webpage address content information 20 and is then able to transmit the generated icon type first notification information 20b to the second terminal 200 by having the icon type first notification information 20b included in the screen information to display.

The controller 180 of the first terminal 100 generates first notification information 20c notifying the webpage address content information 20 as a barcode type, as shown in (d) of FIG. 21, and is then able to transmit the generated barcode type first notification information 20c to the second terminal 200 by having it included in the screen information to display.

Meanwhile, referring back to FIG. 19, if the screen information containing the first notification information is received from the first terminal 100 via the communication unit 210, the controller 270 of the second terminal 200 displays the received screen information on the display unit 260 [S115].

In particular, the controller 270 of the second terminal 200 decodes the screen information containing the first notification information by the above described process shown in FIG. 17 or FIG. 18, and is then able to display the decoded screen information on the display unit 260.

Namely, the controller 270 of the second terminal 200 is able to decompress the compression of the received screen information using a video or still picture decoding scheme.

The compression of the screen information can be decompressed using such a video decoding scheme as JPEG, PNP, MPEG, H.264 and the like. The decompressed screen information can be displayed on the display unit 260.

In case of receiving audio information from the first terminal 100, the controller 270 of the second terminal 200 is able to decompress the compression of the received audio information using an audio decoding scheme.

The compression of the audio information is decompressed using such an audio decompression scheme as MP3, MP4, SBC, ADPCM, Ogg Vorbis and the like. The decompressed audio information is outputted to the speaker 240 and the decompressed screen information is displayed on the display unit 260.

In this case, if the first notification information is selected from the screen information via the input unit 220 or the touchscreen type display unit 260 [S116], the controller 270 of the second terminal 200 executes a function of the content information corresponding to the first notification information [S117].

In the following description, a process for the controller 270 of the second terminal 200 to execute a function of content information corresponding to first notification information is explained in detail.

First of all, if the first notification information is selected from the screen, the controller 270 of the second terminal 200 generates a signal for requesting an execution of a content corresponding to the first notification information and then transmits the generated request signal to the communication unit 11 of the first terminal 100 via the communication unit 210.

In the content execution request signal, information indicating a display location of the first notification information selected on the screen information can be included. In particular, the controller 270 obtains the display location of the selected notification information on the screen information and is then able to transmit the request signal including the obtained display location information of the first notification information to the first terminal 100.

In case of receiving the request signal via the communication unit 110, the controller 180 of the first terminal 100 executes content information corresponding to the first notification information by driving an application and then transmits execution screen information of the content information to the second terminal 200 via the communication unit 110.

In particular, the controller 180 obtains the location information of the first notification information included in the received request signal. If the first notification information exists at the obtained location on a current screen, the controller 180 executes the content information corresponding to the first notification information and is then able to transmit the execution screen information of the content information to the second terminal 200.

In case of receiving the execution screen information of the content information from the first terminal 100, the controller 270 of the second terminal 200 displays the received execution screen information on the screen of the display unit 260.

For instance, if the barcode type first notification information 10c shown in (d) of FIG. 20 is selected in the second terminal 200, the first terminal 100 searches the memory 160 for a schedule corresponding to the first notification information 10c, executes it on the screen of the display unit 151, and then transmits the schedule screen to the second terminal 200.

Moreover, if the icon type first notification information 20b shown in (c) of FIG. 21 is selected in the second terminal 200, the first terminal 100 accesses a webpage corresponding to the first notification information 20b and then transmits the accessed webpage screen to the second terminal 200.

Meanwhile, in case of receiving the request signal via the communication unit 110, the controller 180 of the first terminal 100 does not execute the content information corresponding to the first notification information on the screen of the display unit 151 but is able to directly transmit a content file corresponding to the first notification information to the second terminal 200.

Moreover, while screen information containing the first notification information is displayed on the display unit 151, if the first notification information is selected by a user, the controller 180 of the first terminal 100 is able to transmit a content file corresponding to the first notification information to the second terminal 200 without a request made by the second terminal 200.

Third Embodiment

In the second embodiment of the present invention, while a user of the second terminal 200 is using screen information containing first notification information, if such an event as a call, a message reception and the like occurs in a first terminal 100, a screen containing the first notification information may be switched to a screen of the event occurring in the first terminal 100 irrespective of intention of the user of the second terminal 200.

To overcome such an inconvenience of the second embodiment, according to a third embodiment of the present invention, while a user of a second terminal 200 is using the screen information, if an event occurs in a first terminal 100, the occurrence of the event of the first terminal 100 is indicated on a screen of the second terminal 200 using second notification information notifying the even occurrence. After the user of the second terminal 200 has completed the use of the screen information, an event relevant screen can be displayed.

An operation process according to a third embodiment of the present invention is explained in detail with reference to FIG. 22 as follows.

Figure 22:
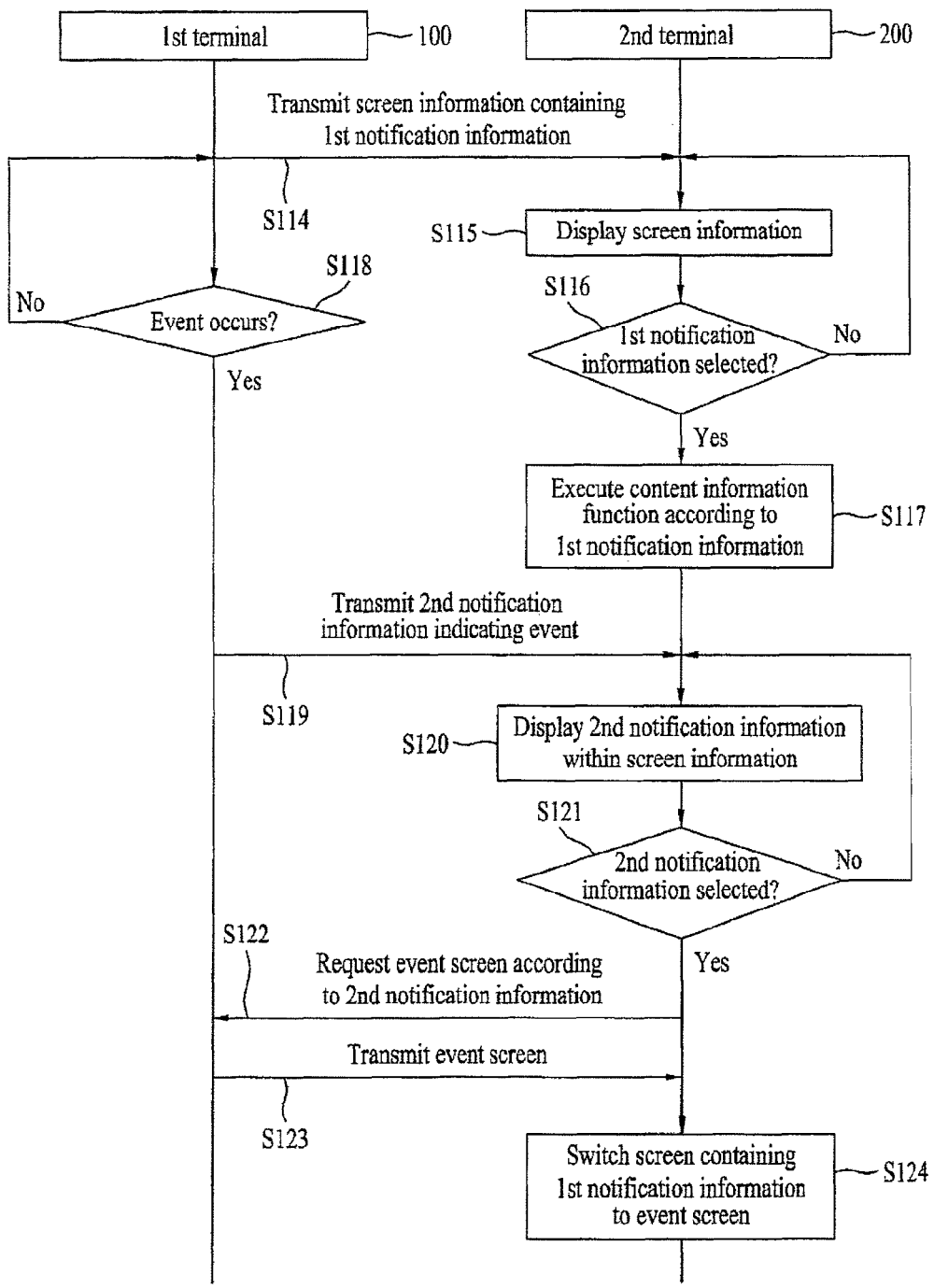
FIG. 22 is a signal processing diagram for a data transceiving process between a first terminal and a second terminal according to a third embodiment of the present invention.

FIG. 22 is a signal processing diagram for a data transceiving process between a first terminal and a second terminal according to a third embodiment of the present invention.

Referring to FIG. 22, an operation process including steps S114 to S117 is identical to that shown in FIG. 19.

If a specific event occurs in the first terminal 100 [S118], the controller 180 of the first terminal 100 generates second notification information indicating the occurring event via the communication unit 110, displays the generated second notification information on a current screen, and then transmits the generated second notification information to the second terminal 200, instead of transmitting screen information corresponding to the occurring event to the second terminal 200 [S119]. In this case, the event can include one of a call, a message reception, an alarm output and the like.

Moreover, the second notification information can be generated as one of a text, an image, an icon, an animation, a watermark and a barcode to indicate the occurring event.

Meanwhile, the controller 270 of the second terminal 200 displays the second notification information received from the first terminal 100 on the screen having the first notification information contained therein [S120].

In this case, the controller 270 of the second terminal 200 can display the second notification information by having the second notification information synthesized within or overlapped with the screen having the first notification information contained therein.

Moreover, the controller 270 of the second terminal 200 is able to display the second notification information within an indicator region of the screen containing the first notification information therein.

In this case, if a user of the second terminal 200 selects the second notification information by manipulating the input unit 220 [S121], the controller 270 generates a signal for requesting an event relevant screen corresponding to the selected second notification information and then transmits the generated event relevant screen request signal to the first terminal 100 via the communication unit 210 [S122].

In this case, location information of the second notification information located on the screen is included in the event relevant screen request signal.

In particular, the controller 270 obtains the location of the selected second notification information at the screen and then transmits a request signal containing the obtained location information of the second notification information to the first terminal 100.

Subsequently, if the event relevant screen request signal is received from the second terminal 200, the controller 180 of the first terminal 100 switches a current screen of the display module 151 to the occurring event relevant screen and then transmits the event relevant screen information to the second terminal 200 [S123].

In particular, the controller 180 obtains location information of the second notification information included in the received request signal. If the second notification information exists at the obtained location on the current screen, the controller 180 switches the current screen to an event screen corresponding to the second notification information and then transmits the switched event screen information to the second terminal 200.

In case of receiving the event relevant screen information from the first terminal 100, the controller 270 of the second terminal 200 switches the screen containing the first notification information to the received event relevant screen [S124].

Moreover, if the event ends, the controller 180 of the first terminal 100 transmits the screen information prior to the event occurrence to the second terminal 200 via the communication unit 110. Subsequently, the second terminal 200 is able to return to the screen prior to the event occurrence from the event relevant screen.

Operations of the steps S118 to S124 are explained in detail with reference to FIG. 23 and FIG. 24 as follows.

Figure 23:
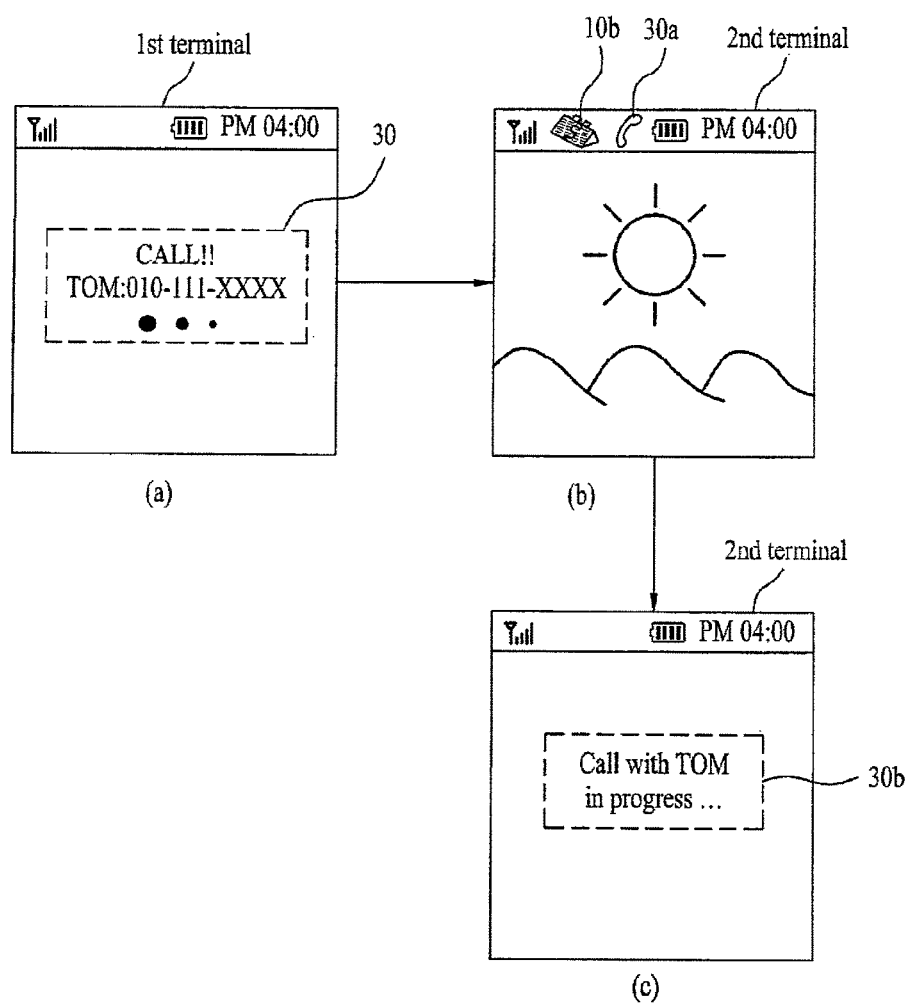
FIG. 23 and FIG. 24 are diagrams of screen configurations for explaining a process for generating and displaying second notification information for a first terminal to announce an event occurrence according to a third embodiment of the present invention.
Figure 24:
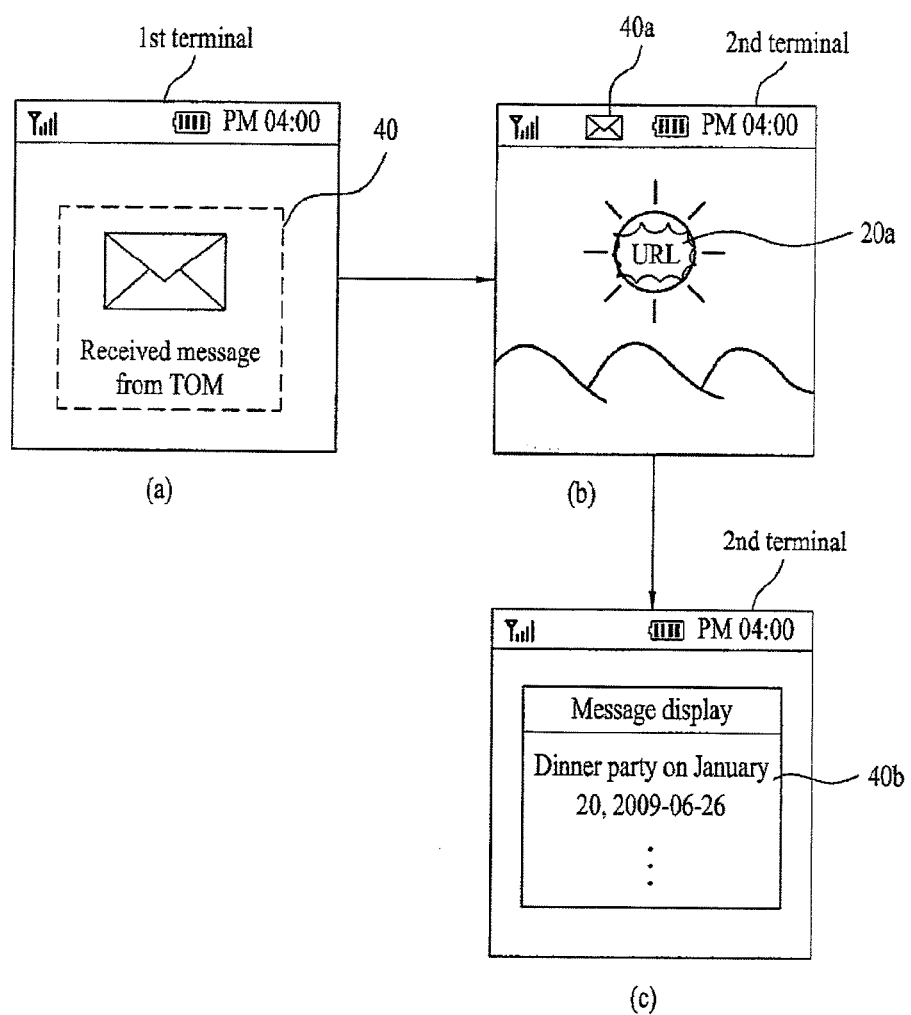

FIG. 23 and FIG. 24 are diagrams of screen configurations for explaining a process for generating and displaying second notification information for a first terminal to announce an event occurrence according to a third embodiment of the present invention.

First of all, (a) of FIG. 23 shows that an event occurring in the step S118 is a call event 30.

If the call event 30 occurs, the controller 180 of the first terminal 100 generates second notification information of an icon type 30*a* to indicate the call event 30 and then transmits the generated second notification information of the icon type 30*a*, as shown in (b) of FIG. 23, to the second terminal 200.

While displaying the screen containing the first notification information 10*a*, the second terminal 200 displays the received notification information 30*a* on the screen if the second notification information 30*a* indicating the call event 30 is received from the first terminal 100.

In this case, if the second notification information 30*a* is selected via the input unit 220, the controller 270 of the second terminal 200 generates a signal for requesting a screen relevant to the call event 30 corresponding to the second notification information 30*a* and then transmits the generated request signal to the first terminal 100 via the communication unit 210.

If the request signal is received from the second terminal 200, the controller 180 of the first terminal 100 switches a current screen of the display unit 151 to the screen relevant to the call event 30 and then transmits screen information relevant to the call event 30 to the second terminal 200.

In case of receiving the screen information relevant to the call event 30 via the communication unit 210, the controller 270 of the second terminal 200 switches the screen containing the first notification information 10*b* displayed on the display unit 260, as shown in (b) of FIG. 23, to the call event relevant screen 30*b*, as shown in (c) of FIG. 23.

And, (a) of FIG. 24 shows that the event occurring in the step S118 is a message reception event 40.

If the message reception event 40 occurs, the controller 180 of the first terminal 100 generates second notification information of an icon type 40*a* to indicate the message reception event 40 and is then able to transmit the generated second notification information of the icon type 40*a*, as shown in (b) of FIG. 24, to the second terminal 200.

While displaying the screen containing the first notification information 20*a*, if the second notification information 40*a* indicating the message reception event 40 is received from the first terminal 100, the second terminal 200 displays the received notification information 40*a* on the screen containing the first notification information 20*a*.

In this case, if the second notification information 40*a* is selected via the input unit 220, the controller 270 of the second terminal 200 generates a signal for requesting a screen relevant to the message reception event 40 corresponding to the second notification information 40*a* and then transmits the generated message reception event relevant request signal to the first terminal 100 via the communication unit 210.

If the message reception event relevant screen request signal is received from the second terminal 200, the controller 180 of the first terminal 100 switches a current screen of the display unit 151 to the screen relevant to the message reception event 40 and then transmits screen information relevant to the message reception event 40 to the second terminal 200.

In case of receiving the screen information relevant to the message reception event 40 via the communication unit 210, the controller 270 of the second terminal 200 switches the screen containing the first notification information 20*a* displayed on the display unit 260, as shown in (b) of FIG. 24, to the message reception event relevant screen 40*b*, as shown in (c) of FIG. 24.

Fourth Embodiment

In case that a plurality of homogeneous or heterogeneous content information exist within a screen of a first terminal 100, the object of a fourth embodiment of the present invention is to provide a function for enabling a second terminal 200 to operate each of the content information.

Figure 25:
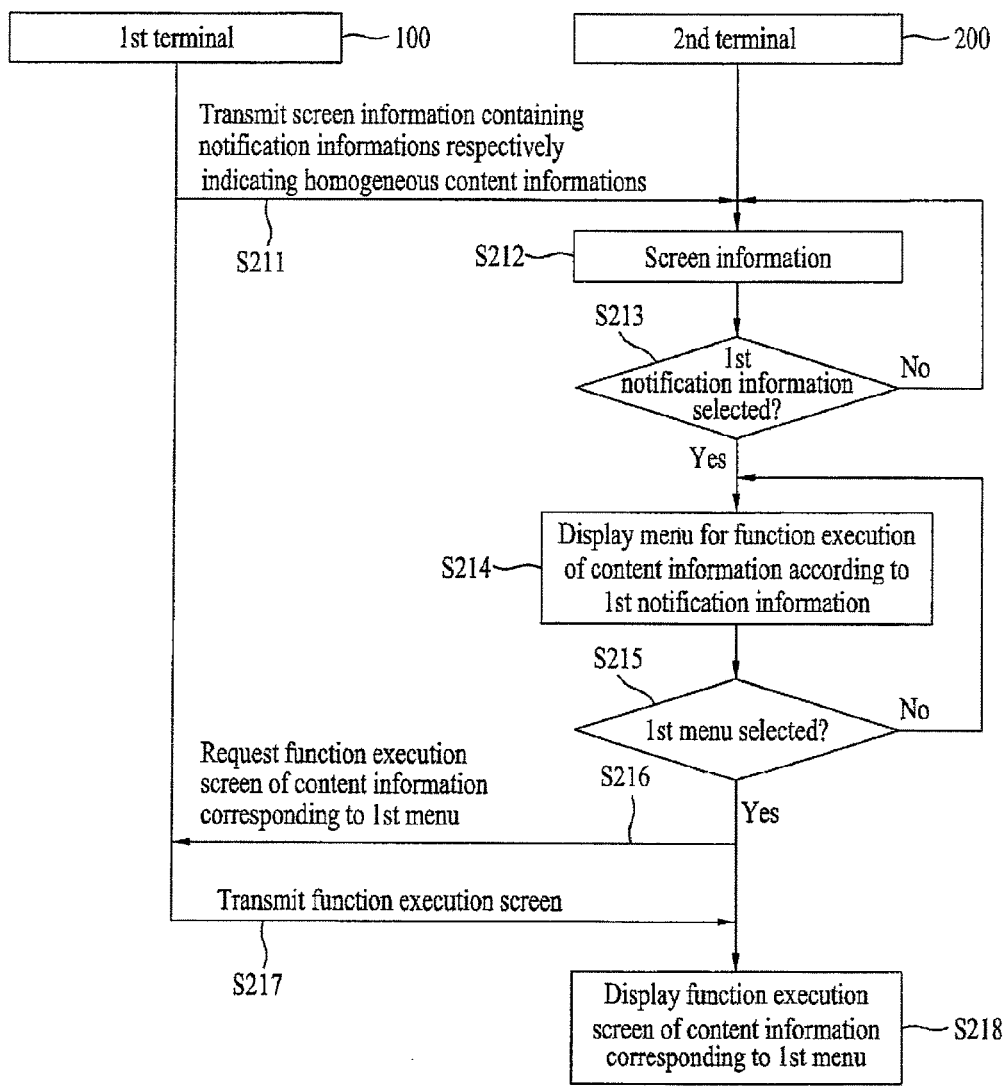
FIG. 25 is a signal processing diagram for a process for a second terminal to access homogeneous content information of a first terminal according to a fourth embodiment of the present invention.

FIG. 25 is a signal processing diagram for a process for a second terminal to access homogeneous content information of a first terminal according to a fourth embodiment of the present invention.

Figure 26:
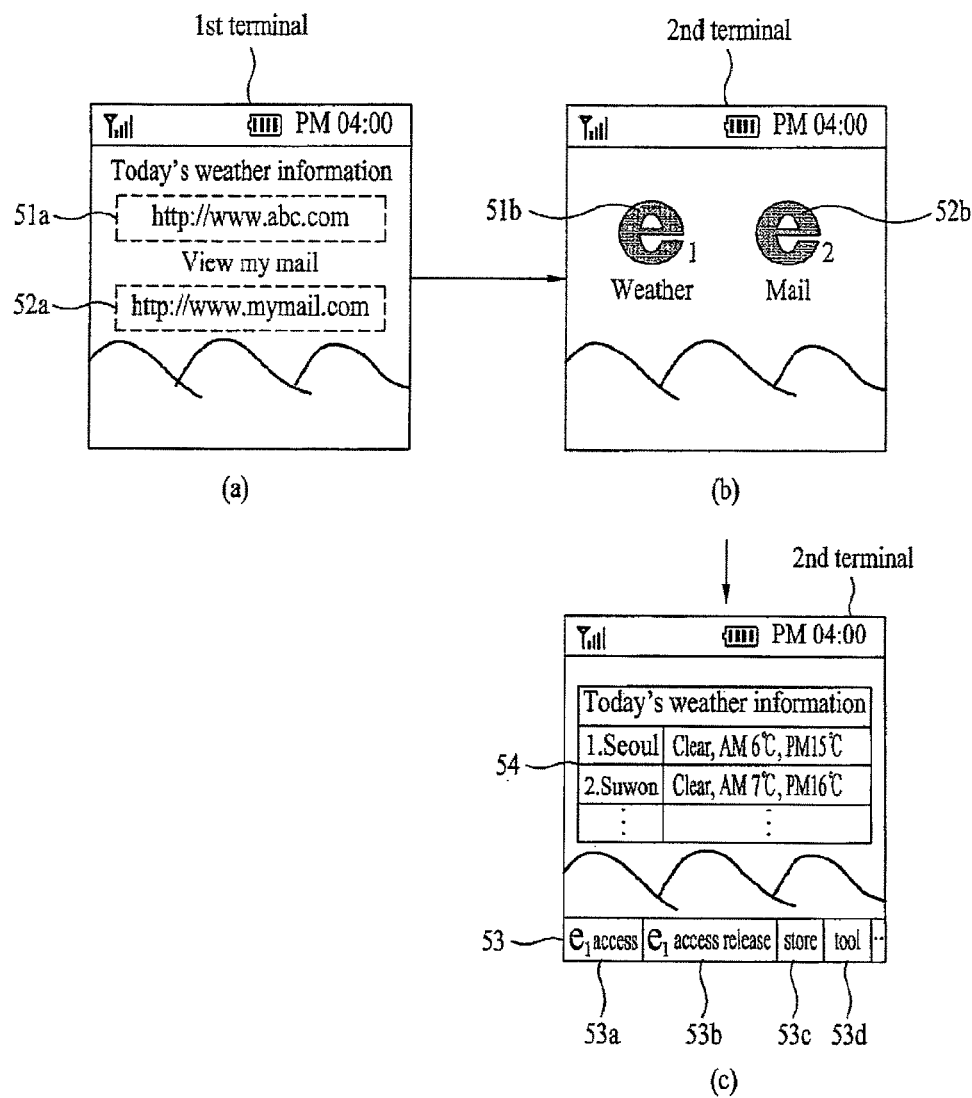
FIG. 26 is a diagram of a screen configuration of a process for a second terminal to access homogeneous content information of a first terminal according to a fourth embodiment of the present invention.

And, FIG. 26 is a diagram of a screen configuration of a process for a second terminal to access homogeneous content information of a first terminal according to a fourth embodiment of the present invention.

Referring to FIG. 25 and FIG. 26, if a first content information 51a and a second content information 52a, which are homogenous, exist within a screen to display, the controller 180 of the first terminal 100 generates a first notification information 51b indicating the homogenous first content information 51a and a second notification information 52b indicating the homogenous second content information 52a and then transmits the generated first and second notification information 51b and 52b to the second terminal 200 by having the generated first and second notification information 51b and 52b included in the screen information to display [S211] [(a) of FIG. 26].

In (a) of FIG. 26, shown is that the homogenous first and second content information 51a and 52a are internet accessible webpage addresses. And, the first and second notification information 51b and 52b indicating the webpage addresses are shown as icons, respectively.

Yet, the present invention non-limits the types of the first and second content information 51a and 52a and the shapes (or representation) of the first and second notification information 51b and 52b.

The controller 270 of the second terminal 200 displays the screen information containing the first and second notification information 51b and 52b received from the first terminal 100 via the communication unit 210 on the display unit 260 [S212] [(b) of FIG. 26].

If a user of the second terminal 200 selects the first notification information 51b from the first notification information 51b and the second notification information 52b [S213], the controller 270 of the second terminal 200 displays menus 53a, 53b, 53c and 53d for executing functions of the first content information 51a corresponding to the selected first notification information 51b, as shown in (c) of FIG. 26, on the display unit 260 [S214].

If the first menu 53a ('e₁ access') is selected from the menus 53a, 53b, 53c and 53d shown in (c) of FIG. 26 [S215], the controller 270 of the second terminal 200 generates a signal for a function execution screen request of the first content information 51a corresponding to the first menu 53a ('e₁ access') and then transmits the generated request signal to the first terminal 100 via the communication unit 210 [S216].

Subsequently, the controller 180 of the first terminal 100 controls the communication unit 110 to access the first content information 51a, i.e., a webpage address corresponding to 'http://www.abc.com' and then transmits the screen information 54 of the accessed webpage to the second terminal 200 [S217]. If so, the controller 270 of the second terminal 200 displays the webpage screen information 54 received from the first terminal 100 on the display unit 260 [S218].

While the webpage screen information 54 in the step S218 is being displayed, if the second menu 53b ('e₁ access dis-connect') is selected from the menus 53a, 53b, 53c and 53d shown in (c) of FIG. 26, the controller 270 of the second terminal 200 stops displaying the webpage screen information 54 and is then able to switch to a current screen to a screen according to (b) of FIG. 26.

While the webpage screen information 54 in the step S218 is being displayed, if the third menu 53c ('store') is selected from the menus 53a, 53b, 53c and 53d shown in (c) of FIG. 26, the controller 270 of the second terminal 200 is able to control the webpage screen information 54 to be stored as an image in the memory 240.

Figure 27:
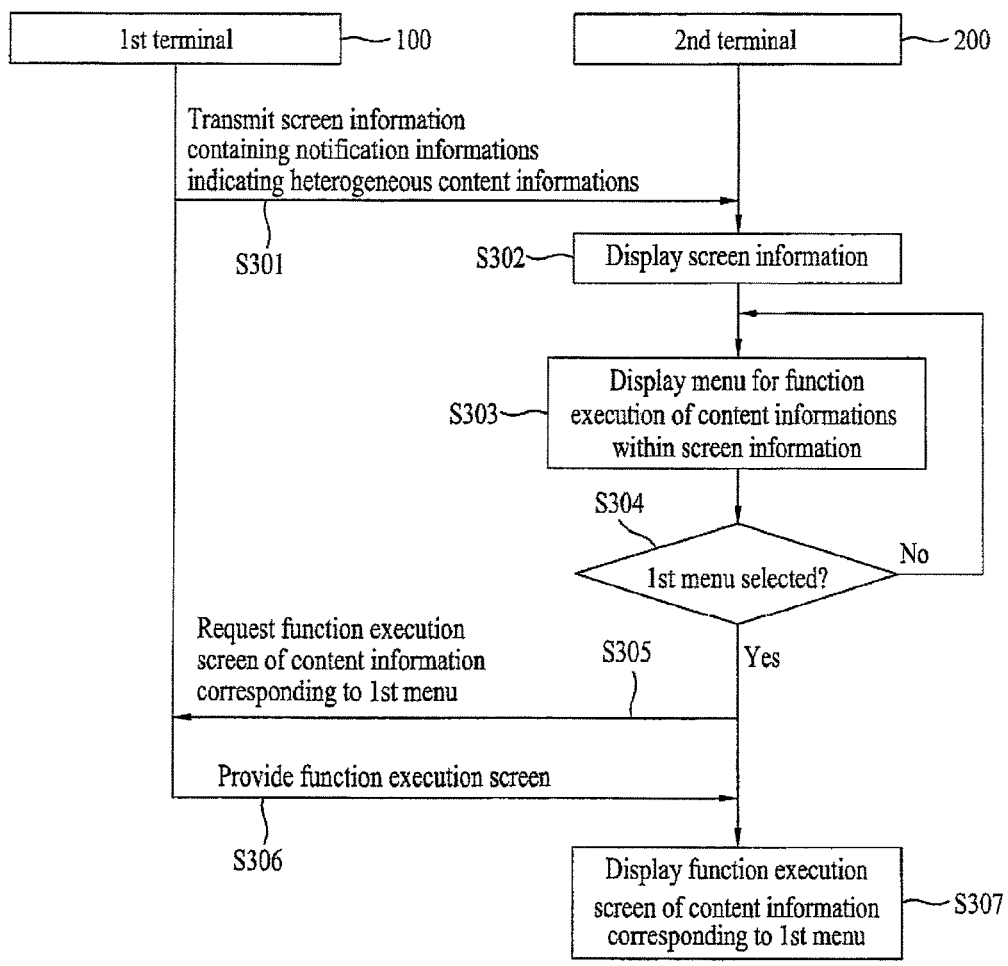
FIG. 27 is a signal processing diagram for a process for a second terminal to access heterogeneous content information of a first terminal according to a fourth embodiment of the present invention.

FIG. 27 is a signal processing diagram for a process for a second terminal to access heterogeneous content information of a first terminal according to a fourth embodiment of the present invention.

Figure 28:
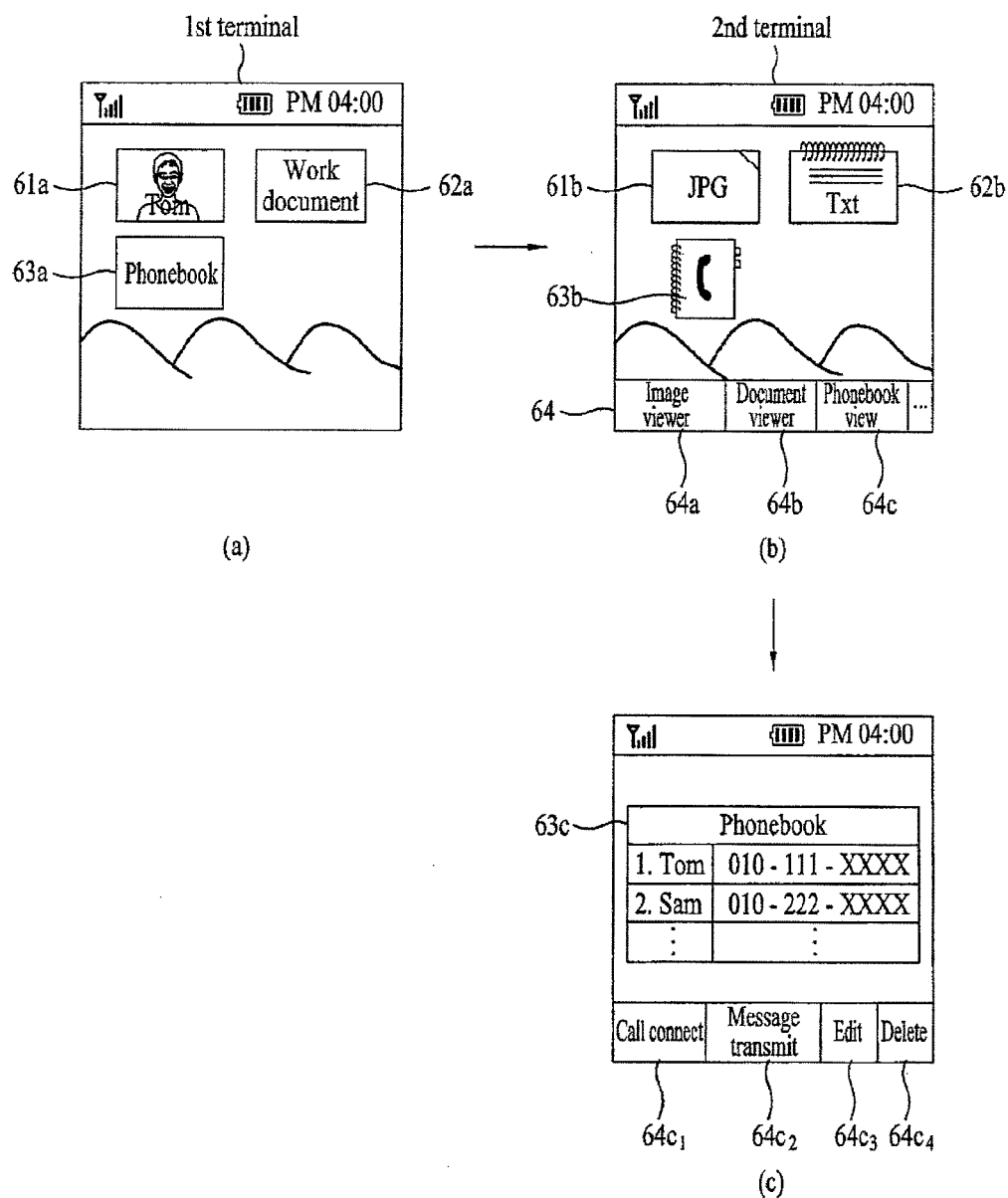
FIG. 28 is a diagram of a screen configuration of a process for a second terminal to access heterogeneous content information of a first terminal according to a fourth embodiment of the present invention.

FIG. 28 is a diagram of a screen configuration of a process for a second terminal to access heterogeneous content information of a first terminal according to a fourth embodiment of the present invention.

Referring to FIG. 27 and FIG. 28, if first to third content information 61a, 62a and 63a, which are heterogeneous (i.e., different in kind), exist within a screen to display, the controller 180 of the first terminal 100 generates first to third notification information 61b, 62b and 63b notifying the heterogeneous first to third content information 61a, 62a and 63a and then transmits them to the second terminal 200 by having the generated first to third notification information 61b, 62b and 63b included in the screen information to display [S301] [(a) of FIG. 28].

In (a) of FIG. 28, shown is that the heterogeneous first content information 61a is an image file, the second content information 62a is a document file, and the third content information 62c is a phonebook. Moreover, the first to third notification information 61b, 62b and 63b respectively indicating the first to third content information 61a, 62a and 63a have icon shapes, respectively.

Yet, the present invention non-limits the types of the first to third content information 61a, 62a and 63a and the shapes (or representation) of the first to third notification information 61b, 62b and 63b.

The controller 270 of the second terminal 200 displays the screen information containing the first to third notification information 61b, 62b and 63b received from the first terminal 100 via the communication unit 210 on the display unit 260 [S302] [(b) of FIG. 28].

In this case, the controller 270 of the second terminal 200 displays menus 64 for executing functions of the first to third content information 61a, 62a and 63a corresponding to the first to third notification information 61b, 62b and 63b, as shown in (b) of FIG. 28, on the display unit 260 [S303].

If a user of the second terminal 200 selects the third menu 64c ('view phonebook') from the menus 64 [S304], the controller 270 of the second terminal 200 generates a signal for requesting a function execution screen of the third menu 64c ('view phonebook') and then transmits the generated request signal to the first terminal 100 via the communication unit 210 [S305].

Subsequently, the controller 180 of the first terminal 100 executes the third content information 63a, i.e., 'phonebook' and then transmits the screen information 63c of the executed phonebook 63a to the second terminal 200 [S306].

If so, the controller 270 of the second terminal 200 displays the phonebook screen information 63c received from the first terminal 100 on the display unit 260 [S307].

In this case, if the phonebook screen information 63c in the step S307 is displayed, the controller 270 of the second terminal 200 is able to display submenus $64c_1$, $64c_2$, $64c_3$ and $64c_4$ for the function execution of the 'phonebook', as shown in (c) of FIG. 28, on one region of the phonebook screen information $63c$.

After the user of the second terminal 200 has selected contact information ('1. TOM') from the phonebook screen information $63c$, if the user of the second terminal 200 selects the first submenu $64c_1$ ('call connect') from the submenus $64c_1$, $64c_2$, $64c_3$ and $64c_4$, the controller 270 of the second terminal 200 generates a signal for indicating that the contact information ('1. TOM') and the first submenu $64c_1$ ('call connect') are selected and then transmits the generated signal to the first terminal 100 via the communication unit 210.

If so, the controller 180 of the first terminal 100 connects a call to a phone number of the selected contact information ('1. TOM') by controlling the communication unit 110 according to the signal received from the second terminal and then transmits the call connected status screen to the second terminal 200.

Moreover, after the user of the second terminal 200 has selected contact information ('1. TOM') from the phonebook screen information $63c$, if the user of the second terminal 200 selects the second submenu $64c_2$ ('message send') from the submenus $64c_1$, $64c_2$, $64c_3$ and $64c_4$, the controller 270 of the second terminal 200 generates a signal for indicating that the contact information ('1. TOM') and the second submenu $64c_2$ ('message send') are selected and then transmits the generated signal to the first terminal 100 via the communication unit 210.

If so, the controller 180 of the first terminal 100 transmits an input window for a message to be sent to the phone number of the selected contact information ('1. TOM') to the second terminal 200 by controlling the communication unit 110 according to the signal received from the second terminal 200.

The second terminal 200 displays the message input window received from the first terminal 100 and then transmits a message content written through the message input window to the first terminal 100.

Subsequently, the controller 180 of first terminal 100 transmits the message content received from the second terminal 200 to the selected contact information ('1. TOM').

Moreover, the second terminal 200 selects the third submenu $64c_3$ or the fourth submenu $64c_4$ from the submenus $64c_1$, $64c_2$, $64c_3$ and $64c_4$, and is then able to edit or delete phone numbers and the like within the corresponding phonebook.

Fifth Embodiment

The object of a fifth embodiment of the present invention is to provide a function of automatically connecting a communication without a separate user's manipulation when the communication is connected between a first terminal and a second terminal.

In particular, a fifth embodiment of the present invention relates to a process for automatically connecting a communication in-between using short-range communication or RFID.

In the following description of a fifth embodiment of the present invention, assume that a first terminal is a mobile terminal type, assume that a second terminal is a PC type, and assume that the second terminal automatically searches for the first terminal to connect a (or establish) communication.

A process for automatically connecting a communication using short-range communication according to the present invention is explained with reference to FIG. 29 and FIG. 30 as follows.

Figure 29:
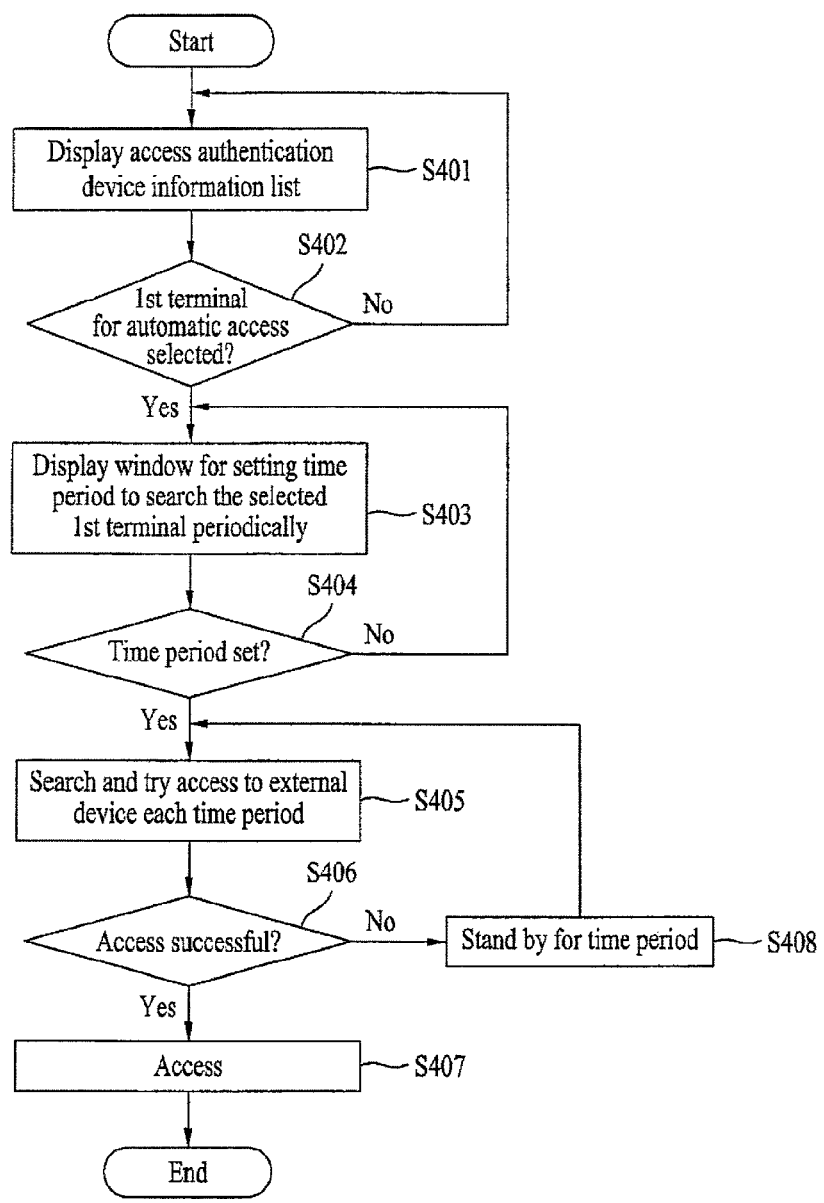
FIG. 29 is a flowchart of a process for a second terminal to automatically connect a (or establish) communication with a first terminal using a short-range communication according to a fifth embodiment of the present invention.

FIG. 29 is a flowchart of a process for a second terminal to automatically connect a (or establish) communication with a first terminal using a short-range communication according to a fifth embodiment of the present invention.

Figure 30:
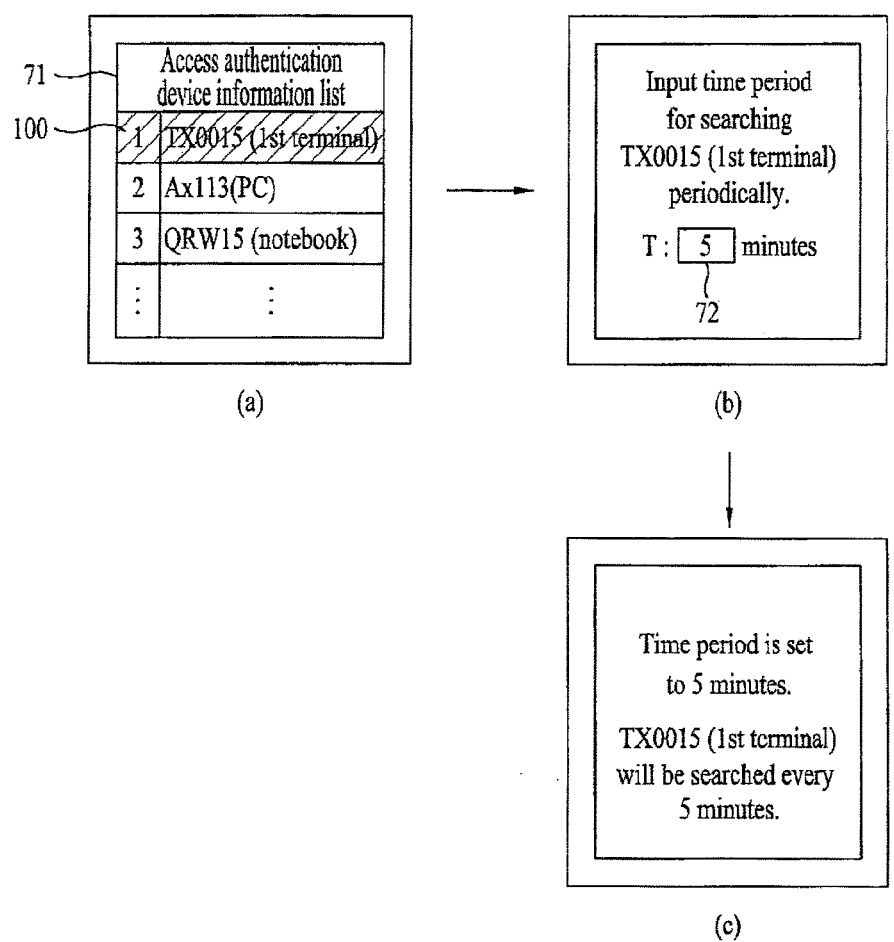
FIG. 30 is a diagram of a screen configuration of a process for a second terminal to set a time period for searching a first terminal periodically according to a fifth embodiment of the present invention.

And, FIG. 30 is a diagram of a screen configuration of a process for a second terminal to set a time period of searching for a first terminal periodically according to a fifth embodiment of the present invention.

Referring to FIG. 29 and FIG. 30, if a user selects a function for automatically searching for the first terminal 100 around the second terminal 200 and connecting a communication, the controller 270 of the second terminal 200 displays an access authentication device information list 71 previously provided to the memory 230 on the display unit 260 [S401] [(a) of FIG. 30].

In this case, the access authentication device information list 71 refers to a device information list of external devices having been connected to the second terminal 200 for communications through authentication processes.

If the first terminal (TX0015) 100 to automatically access is selected from the access authentication device information list 71 [S402] [(a) of FIG. 30], the controller 270 of the second terminal 200 displays a window 72 for setting a time period for searching for the selected first terminal (TX0015) on the display unit [S403] [(b) of FIG. 30].

If a user sets up the time period (5 minutes) through the time period setting window 72 [S404] [(b) of FIG. 30], the controller 270 of the second terminal 200 attempts the search and access of the first terminal (TX0015) 100 by the set time period (5 minutes) by controlling the communication unit 210 [S405] [(c) of FIG. 30].

If the access to the first terminal (TX0015) 100 is successful [S406], the controller 270 of the second terminal 200 connects the communication with the first terminal (TX0015) 100. The controller 270 of the second terminal 200 receives the screen information of the aforesaid first to fourth embodiments from the first terminal (TX0015) 100 and then displays the received screen information [S407].

On the contrary, if the access to the first terminal (TX0015) 100 fails, the controller 270 of the second terminal 200 stands by during the set time period and then tries the access again [S408].

Figure 31:
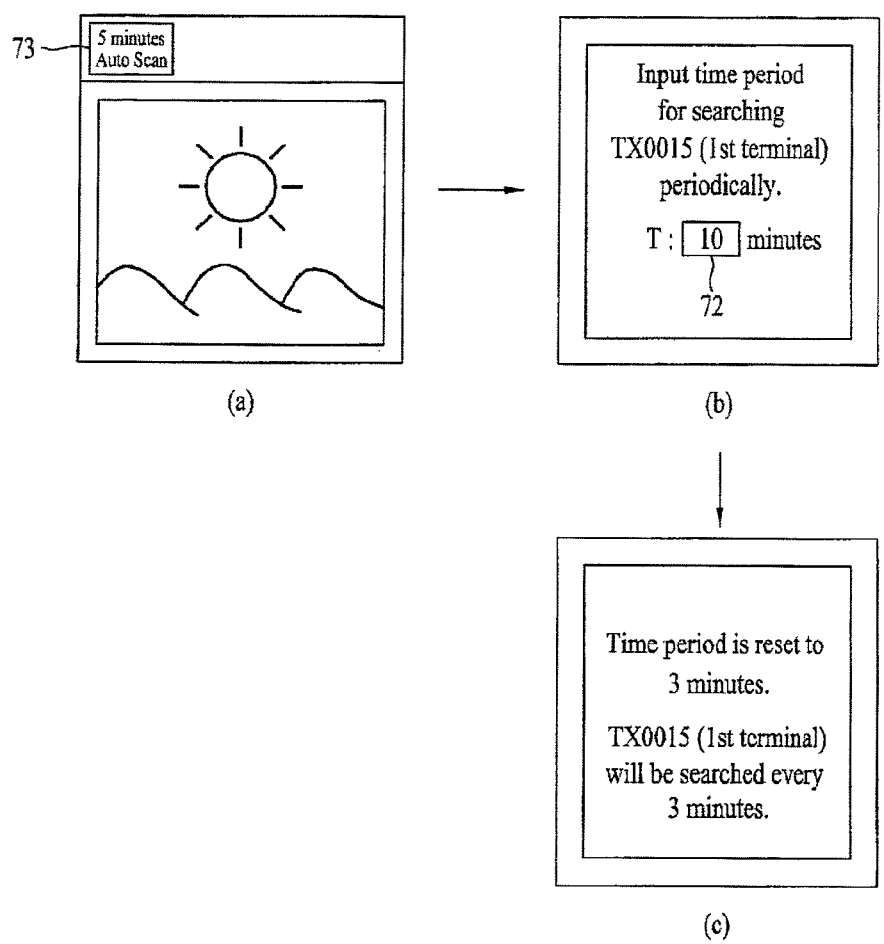
FIG. 31 is a diagram of a screen configuration of a process for a second terminal to reset a time period for searching a first terminal periodically according to a fifth embodiment of the present invention.

FIG. 31 is a diagram of a screen configuration of a process for a second terminal to reset a time period for searching for a first terminal periodically according to a fifth embodiment of the present invention.

Referring to FIG. 31, if the communication with the first terminal (TX0015) 100 is connected by the process shown in FIG. 29 and FIG. 30, the second terminal 200 receives the screen information according to the first to third embodiments from the first terminal (TX0015) 100 and then displays the received screen information. Moreover, the second terminal 200 displays notification information 73 indicating the time period set up in FIG. 29 and FIG. 30 on the screen information [(a) of FIG. 31].

If a user selects the notification information 73, the controller 270 of the second terminal 200 recognizes that it is to change the time period set in FIG. 29 and FIG. 30 and then re-displays the time period setting window 72 shown in (b) of FIG. 30 [(b) of FIG. 31].

If the user changes the time period (10 minutes) via the time period setting window 72, the controller 270 of the second terminal 200 tries the search and access of the first terminal (TX0015) 100 by the changed time period (10 minutes) by controlling the communication unit 210 [(c) of FIG. 31].

Figure 32:
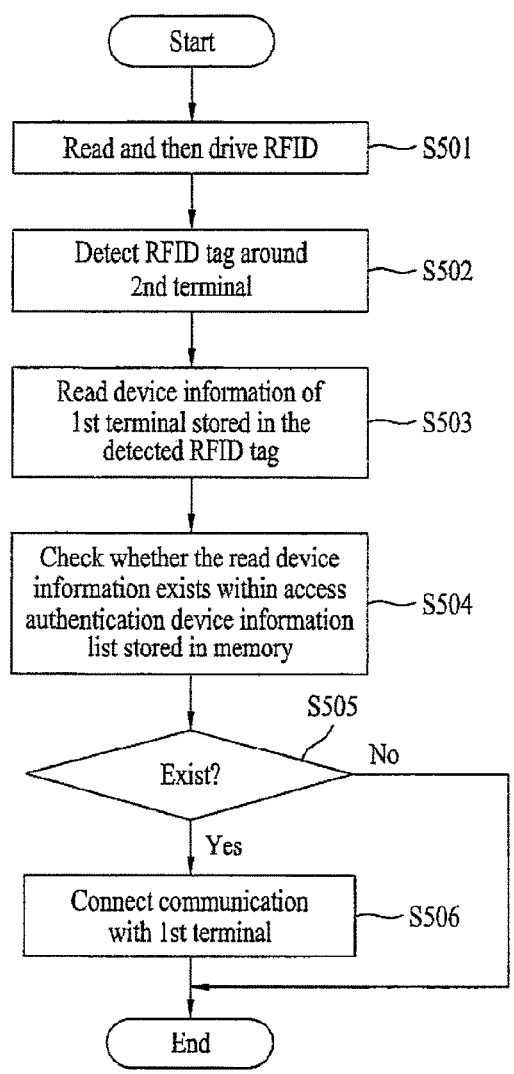
FIG. 32 is a flowchart of a process for a second terminal to automatically connect a (or establish) communication with a first terminal using an RFID according to a fifth embodiment of the present invention.

FIG. 32 is a flowchart of a process for a second terminal to automatically connect a (or establish) communication with a first terminal using an RFID according to a fifth embodiment of the present invention.

Figure 33:
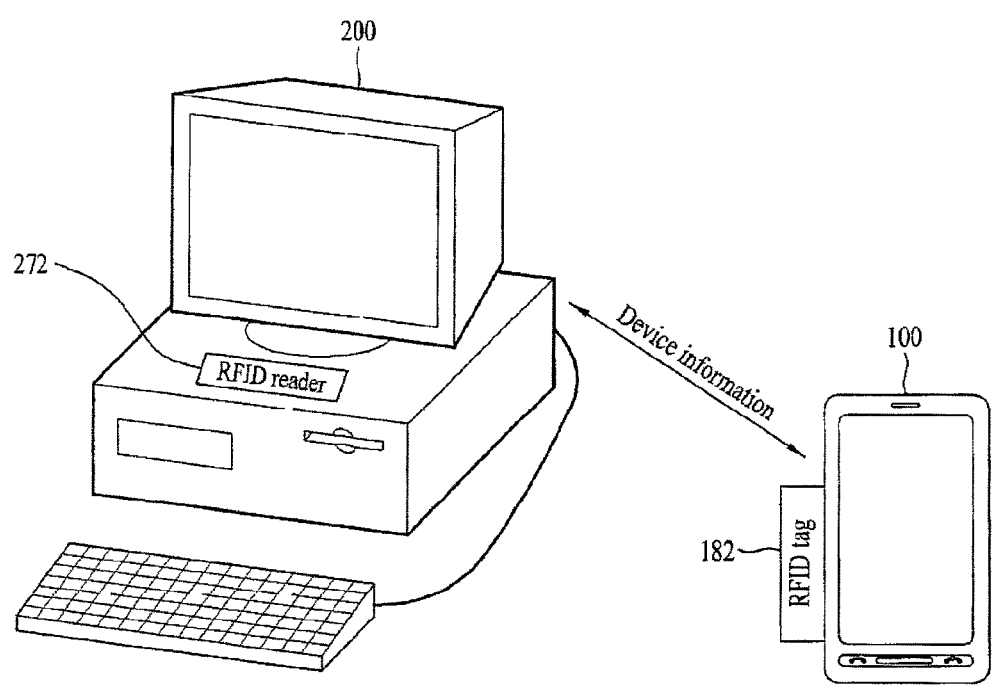
FIG. 33 is a diagram of a screen configuration of a process for a second terminal to automatically connect a (or establish) communication with a first terminal using an RFID according to a fifth embodiment of the present invention.

And, FIG. 33 is a diagram of a screen configuration of a process for a second terminal to automatically connect a (or establish) communication with a first terminal using an RFID according to a fifth embodiment of the present invention.

Referring to FIG. 32 and FIG. 33, the controller 270 of the second terminal 200 drives the RFID reader 271 for the communication connection with the first terminal [S501] and then detects whether the first terminal 100 having the RFID tag 182 attached thereto is located around the second terminal 200 through the RFID reader 271 [S502].

If the first terminal 100 having the RFID tag 182 attached thereto exists around the second terminal 200, the controller 270 of the second terminal 200 reads device information of the first terminal 100 stored in the RFID tag 182 through the RFID reader 271 [S503].

The controller 270 checks whether the device information of the first terminal 100 read through the RFID reader 271 exists within the access authentication device information list stored in the memory 230 [S504]. If the corresponding information exists in the list [S505], the controller 270 of the second terminal 200 connects the communication with the first terminal 100 using the read device information of the first terminal 100 [S506].

Sixth Embodiment

The object of a sixth embodiment of the present invention is to provide a function of extending a use time of a terminal by preventing unnecessary power consumption. In particular, while a communication is connected between a first terminal and a second terminal, if an operational status of a screen, audio, key input or the like fails to vary for a preset period of time, the communication between the first terminal and the second terminal is disconnected.

In the following description of a sixth embodiment of the present invention, assume that a first terminal is a mobile terminal type, assume that a second terminal is a PC type, and assume that the second terminal automatically searches for the first terminal to connect a (or establish) communication.

A process for a second terminal to perform a disconnecting/re-connecting operation of a communication with on a first terminal is explained with reference to FIGS. 34 to 38 as follows.

Figure 34:
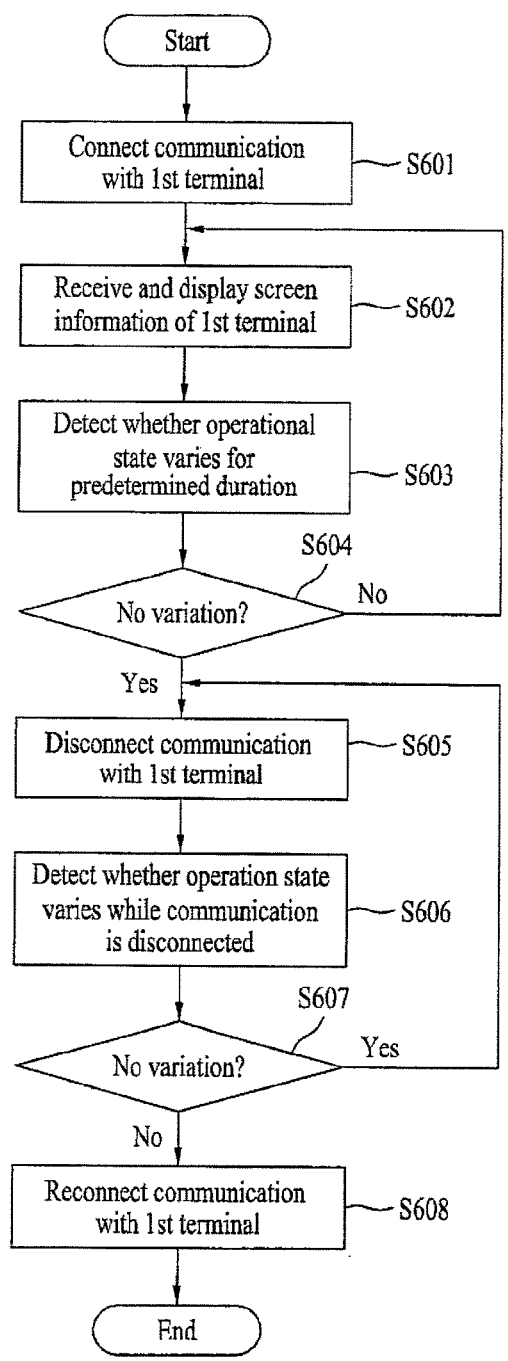
FIG. 34 is a flowchart of a process for a second terminal to perform disconnection and reconnection operations of communications with a first terminal according to a sixth embodiment of the present invention.

FIG. 34 is a flowchart of a process for a second terminal to perform disconnection and reconnection operations of communications with a first terminal according to a sixth embodiment of the present invention.

Figure 35:
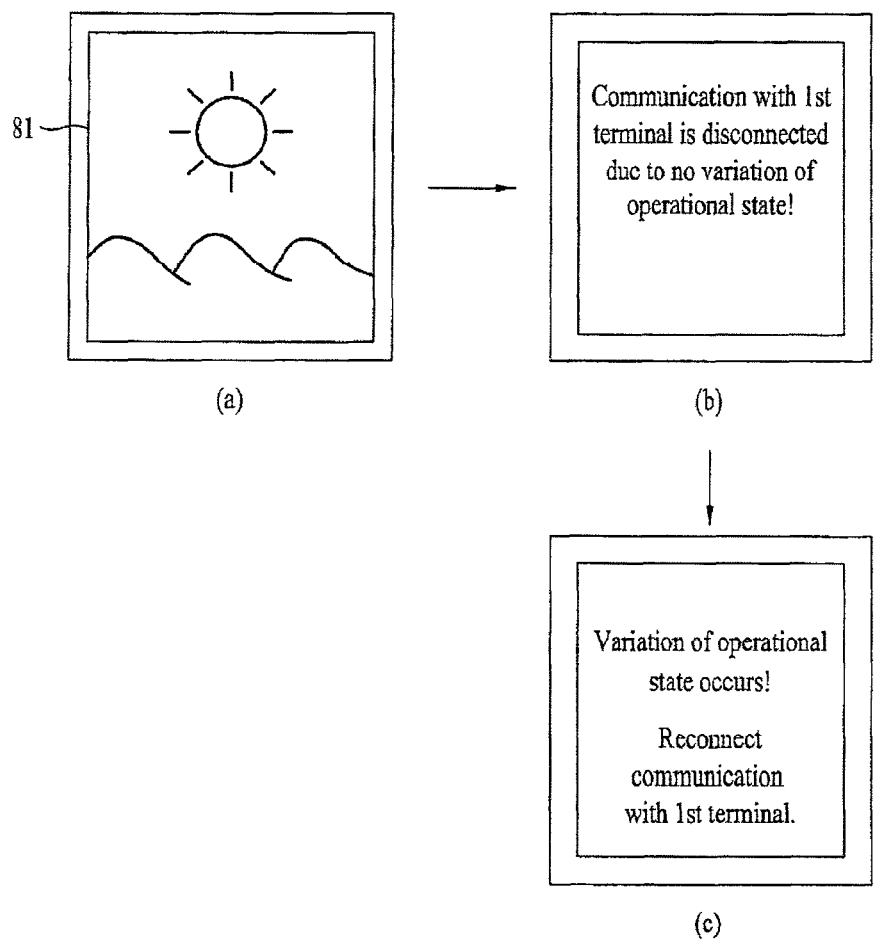
FIG. 35 is a diagram of a screen configuration of a process for a second terminal to perform disconnection and reconnection of communications with a first terminal according to a sixth embodiment of the present invention.

FIG. 35 is a diagram of a screen configuration of a process for a second terminal to perform disconnection and reconnection of communications with a first terminal according to a sixth embodiment of the present invention.

Figure 36:
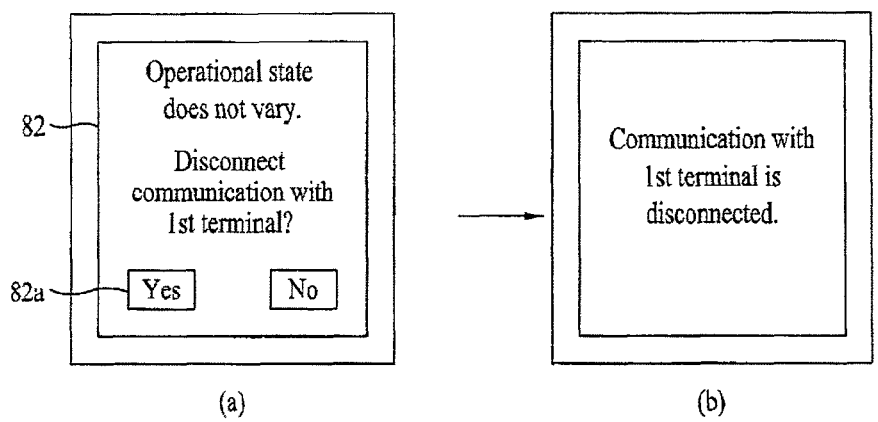
FIG. 36 is a diagram of a screen configuration of a process for a second terminal to perform disconnection of a communication with a first terminal according to a sixth embodiment of the present invention.

FIG. 36 is a diagram of a screen configuration of a process for a second terminal to perform disconnection of a communication with a first terminal according to a sixth embodiment of the present invention.

Figure 37:
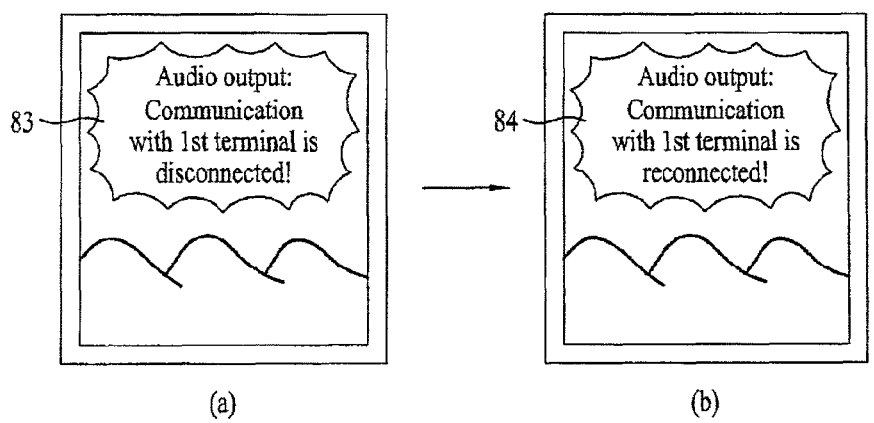
FIG. 37 and FIG. 38 are diagrams of screen configurations for a process for a second terminal to inform a user of disconnected and reconnected statuses of communications with a first terminal according to a sixth embodiment of the present invention.
Figure 38:
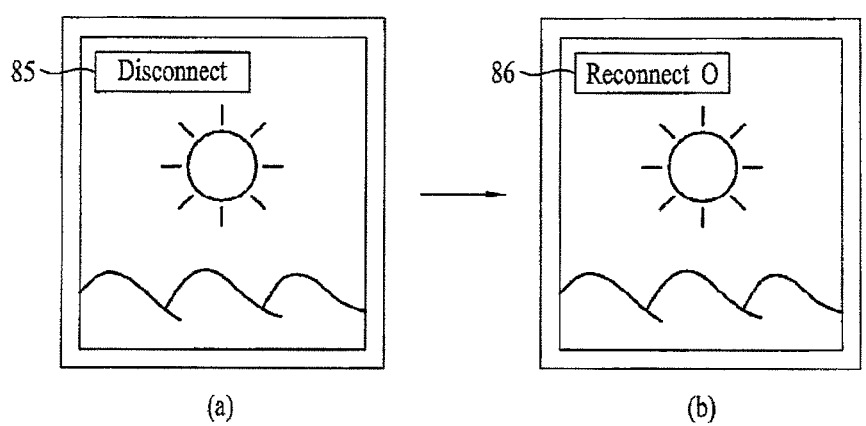

And, FIG. 37 and FIG. 38 are diagrams of screen configurations for a process for a second terminal to inform a user of disconnected and reconnected statuses of communications with a first terminal according to a sixth embodiment of the present invention.

Referring to FIGS. 34 to 38, if a communication is connected to the first terminal 100 according to the aforesaid fourth embodiment [S601], the controller 270 of the second terminal 200 receives data containing screen information 510 from the first terminal via the communication unit 210 and then displays the received screen information 510 on a screen of the display unit 260 [S602] [(a) of FIG. 35].

In this case, the data received from the first terminal 100 can contain audio information and a key signal having been inputted to the first terminal 100 as well as the screen information 510.

Subsequently, the controller 270 of the second terminal 200 detects whether an operational state of the second terminal 200 is changed during a preset duration [S603].

In particular, the controller 270 of the second terminal 200 detects whether the operational state of the second terminal 200 maintains an inactive state.

In this case, the inactive state refers to a state in which the second terminal 200 fails to receive new screen information or new audio information from the first terminal 100 or a state in which the second terminal 200 does not transmit a key signal for remotely controlling an operation of the first terminal 100 to the first terminal 100.

And, the duration for detecting the operational state change is variously settable by a user. In particular, the controller 270 provides a user with a variously settable menu of the preset duration. The user is then able to change the duration through this menu.

Meanwhile, if the operational state of the second terminal 200 is not changed for the preset duration [S604], the controller 270 recognizes that the user does not use the remote control communication with the first terminal 100 according to the present invention and then disconnects the communication with the first terminal 100 by controlling the communication unit 210 [S605] [(b) of FIG. 35].

In particular, if new screen information or new audio information is not received from the first terminal 100 for the preset duration or a key signal for controlling the operation of the first terminal 100 remotely is not transmitted, the controller 270 disconnects the communication with the first terminal 100 by controlling the communication unit 210.

In this case, if the operational state of the second terminal 200 is not changed for the preset duration, as shown in FIG. 36, the controller 270 displays a selection window 82 for selecting a disconnection of a communication with the first terminal 100 on the display unit 260 [(a) of FIG. 36]. If the disconnection of communication with the first terminal 100 is selected from the selection window 82, the controller 270 is able to disconnect the communication with the first terminal [(b) of FIG. 36].

If the communication with the first terminal 100 is disconnected, as shown in (a) of FIG. 37, the controller 270 is able to output audio data 82 for announcing the disconnected communication to the speaker 240.

If the communication with the first terminal 100 is disconnected, as shown in (a) of FIG. 38, the controller 270 is able to display notification information 85 for announcing the disconnected communication on the screen of the display unit 260.

In this case, if a user selects the notification information 85, as shown in (a) of FIG. 38, the controller 270 is able to reconnect the communication with the first terminal 100 by controlling the communication unit 210, as shown in (b) of FIG. 38.

If the communication with the first terminal 100 is disconnected, the user is unable to remotely control the first terminal 100. Hence, in order to save the power of the second terminal 200, the controller 270 reduces screen brightness of the display unit 260 into a level lower than a preset brightness level or is able to turn off the display unit 260.

Meanwhile, while the communication with the first terminal 100 is disconnected, the controller 270 redetects whether the operational state of the second terminal 200 is changed [S606].

While the communication with the first terminal 100 is disconnected, if the operational state of the second terminal 200 is changed [S607], the controller 270 reconnects the communication with the first terminal 100 by making a request for a communication reconnection to the first terminal 100 via the communication unit 210 [S608] [(c) of FIG. 35].

In particular, while the communication with the first terminal 100 is disconnected, if new screen information or new audio information is received from the first terminal 100 or a key signal for controlling the operation of the first terminal 100 remotely is transmitted, the controller 270 reconnects the communication with the first terminal 100 by controlling the communication unit 210.

In this case, referring to (b) of FIG. 37, if the communication with the first terminal 100 is reconnected, the controller is able to output audio data 84 for announcing the reconnected communication to the speaker 240.

If the communication with the first terminal 100 is reconnected, as shown in (b) of FIG. 38, the controller 270 is able to display notification information 86 for announcing the reconnected communication on the screen of the display unit 260.

If the communication with the first terminal 100 is reconnected, the controller 270 drives the display unit 260 or reconstructs the reduced screen brightness of the display unit 260 into an initial brightness level.

Figure 39:
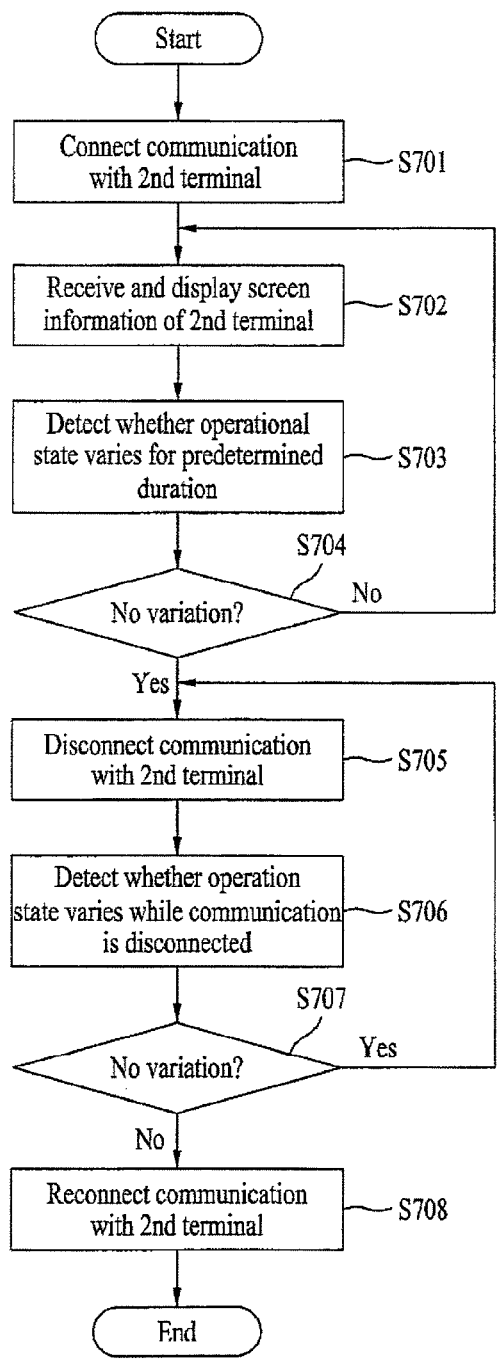
FIG. 39 is a flowchart of a process for a first terminal to perform disconnection and reconnection operations of communications with a second terminal according to a sixth embodiment of the present invention.
Figure 40:
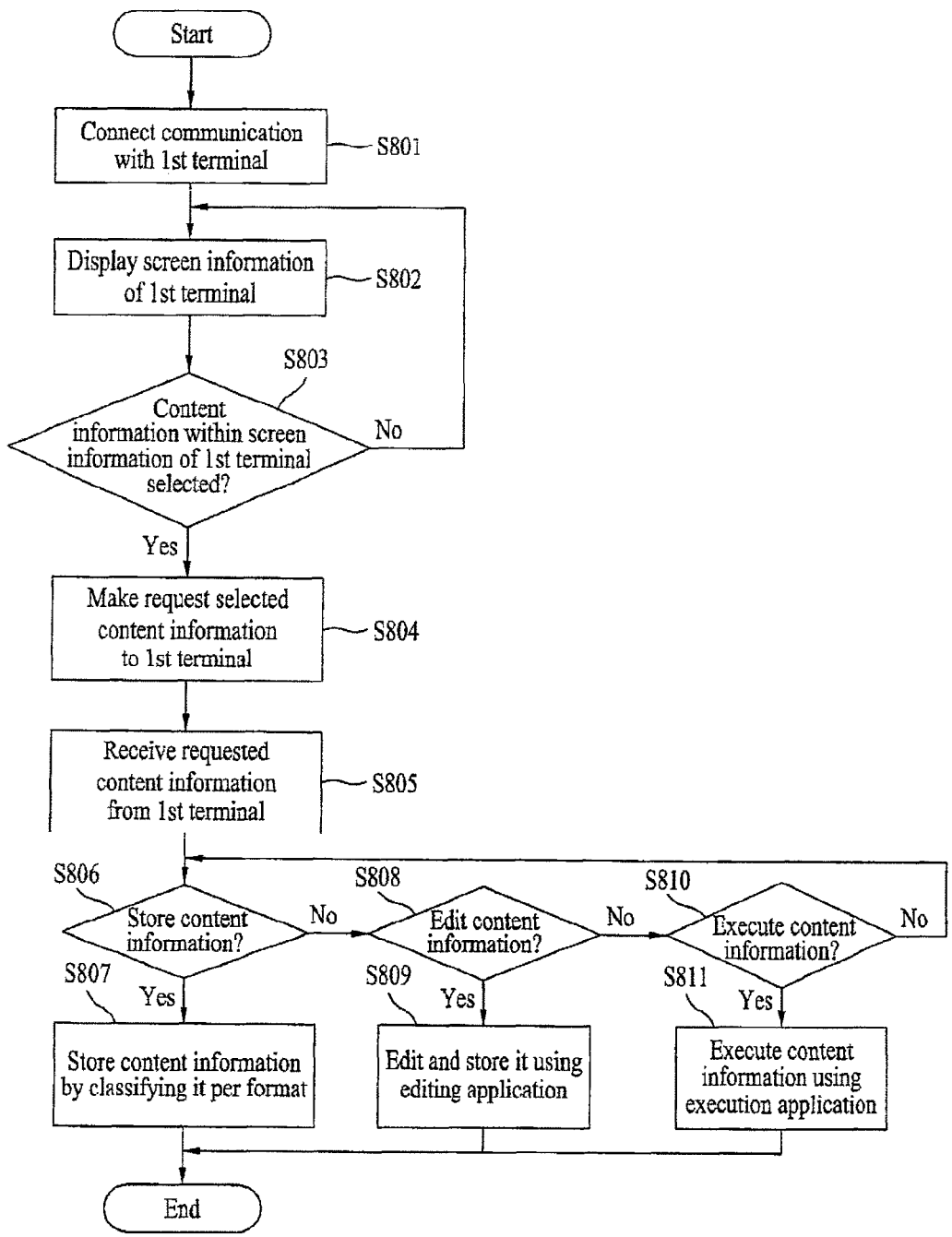
FIG. 40 is a flowchart of a process for a second terminal to receive, store, edit and execute content information from a first terminal according to a seventh embodiment of the present invention.

FIG. 39 is a flowchart of a process for a first terminal to perform disconnection and reconnection operations of communications with a second terminal according to a sixth embodiment of the present invention.

Referring to FIG. 39, if a communication with the second terminal 200 is connected [S701], the controller 180 of the first terminal 100 transmits data containing screen information to the second terminal 200 via the communication unit 110 [S702].

If the communication is connected between the first terminal 100 and the second terminal 200, a display screen of the display unit 100 of the first terminal 100 is identical to that of the display unit 250 of the second terminal 200. And, a user of the first terminal 100 views the display screen of the first terminal 100 via the screen of the display unit 260 of the second terminal 200.

Hence, according to the sixth embodiment of the present invention, in order to prevent the unnecessary consumption of the power of the first terminal 100, if the communication with the second terminal 200 is connected, the controller 180 of the first terminal 100 reduces a screen brightness of the display unit 151 into a level lower than a preset brightness level or is able to turn off the display unit 151.

Moreover, according to the sixth embodiment of the present invention, in order to prevent the unnecessary consumption of the power of the first terminal 100, if the communication with the second terminal 200 is connected, the controller 180 of the first terminal 100 reduces a brightness of a backlight, which applies light to the user input unit 130, into a level lower than a preset brightness level or is able to turn off the backlight.

Meanwhile, the controller 180 detects whether an operational state of the first terminal 100 is changed for (or during) a preset duration [S703].

In particular, the controller 180 of the first terminal 100 detects whether the operational state of the first terminal 100 maintains an inactive state.

In this case, the inactive state refers to a state in which the first terminal 100 fails to transmit new screen information or new audio information to the second terminal 200 or a state in which the first terminal 100 does not receive a key signal for remotely controlling a wireless communication operation of the first terminal 100 from the second terminal 200.

And, the duration for detecting the operational state change is variously settable by a user. In particular, the controller 180 provides a user with a variously settable menu of the preset duration. The user is then able to change the duration through this menu.

Meanwhile, if the operational state of the first terminal 100 is not changed for (or during) the preset duration [S704], the controller 180 recognizes that the user does not use the wireless remote control communication with the second terminal 200 according to the present invention and then disconnects the communication with the second terminal 200 by controlling the communication unit 110 [S705].

In this case, if the operational state of the first terminal 100 is not changed for the preset duration, as shown in FIG. 36, the controller 180 displays a selection window for selecting a disconnection of a communication with the second terminal 200 on the display unit 151. If the disconnection of the communication with the second terminal 200 is selected from the selection window, the controller 180 is able to disconnect the communication with the second terminal.

If the communication with the second terminal 200 is disconnected, as shown in (a) of FIG. 37, the controller 180 is able to output audio data for announcing the disconnected communication to the audio output module 152.

If the communication with the second terminal 200 is disconnected, as shown in (a) of FIG. 38, the controller 180 is able to display notification information for announcing the disconnected communication on the screen of the display unit 151.

In this case, if a user selects the notification information for announcing the disconnected communication with the second terminal 200, as shown in (b) of FIG. 38, the controller 180 is able to reconnect the communication with the second terminal 200 by controlling the communication unit 110.

Meanwhile, while the communication with the second terminal 200 is disconnected, the controller 180 redetects whether the operational state of the first terminal 100 is changed [S706].

In particular, the controller 180 detects whether a key signal for controlling the operation of the first terminal 100 is received form the second terminal 200 or whether to transmit new screen or audio information to the second terminal 200.

While the communication with the second terminal 200 is disconnected, if the operational state of the first terminal 100 is changed [S707], the controller 180 reconnects the communication with the second terminal 200 by controlling the communication unit 110 [S708].

In particular, the controller 180 reconnects the communication using the device information corresponding to the second terminal 200 in the access authentication device information list provided to the memory 160.

Meanwhile, referring to (b) of FIG. 37, if the communication with the second terminal 200 is reconnected, the controller 180 is able to output audio data for announcing the reconnected communication to the audio output module 152.

If the communication with the second terminal 200 is reconnected, as shown in (b) of FIG. 38, the controller 180 is able to display notification information for announcing the reconnected communication on the screen of the display unit 151.

If the communication with the second terminal 200 is reconnected, the controller 180 drives the display unit 151 or the backlight unit or is able to restore the reduced display brightness of the display unit 260 or the brightness of the backlight unit into the initial brightness level.

Seventh Embodiment

While a communication is connected between a first terminal and a second terminal, the object of a seventh embodiment of the present invention is to provide a function of transceiving content information contained in each screen of the first and second terminals between the first terminal and the second terminal and a function of storing, executing and editing the received content information.

In the following description of a seventh embodiment of the present invention, assume that a first terminal is a mobile terminal type and assume that a second terminal is a PC type.

A seventh embodiment of the present invention is explained in detail with reference to FIGS. 40 to 55 as follows.

First of all, referring to FIGS. 40 to 52, if a communication with the first terminal 100 is connected via the communication unit 210 [S801], the controller 270 of the second terminal 200 receives screen information containing at least one content information therein from the first terminal 100 and then displays the received screen information of the first terminal on a screen 600 of the display unit 260 [S802].

In this case, the controller 270 of the second terminal 200 divides the screen 600 of the display unit 260, as shown in (a) of FIG. 41, into a first region 610 and a second region 620. Subsequently, the controller 270 of the second terminal 200 displays the first screen information containing the content information 611, 612 and 613 of the first terminal 100 on the first region 610 and also displays the second screen information containing the content information 625 of the second terminal 200 on the second region 620.

Referring to (b) and (c) of FIG. 41, the controller 270 of the second terminal 200 is able to display the first region 610 to have the same shape of an exterior of the first terminal 100 with a size of the screen of the mobile terminal 100.

In (b) of FIG. 41, shown is that the first terminal 100 is a touchscreen type terminal. In (c) of FIG. 41, shown is that the first terminal 100 is a bar type terminal having a character input key.

Meanwhile, while the first and second screen information are displayed on the first and second regions 610 and 620, respectively, if a user selects at least one of the content information within the first region 610 via the input unit 220 or the display unit 260 of a touchscreen type [S803], the controller 270 of the second terminal 200 generates a signal for making a request for the selected content information to the first terminal 100 and then transmits the generated request signal to the first terminal 100 via the communication unit 210.

In this case, if the first terminal 100 is the touchscreen type shown in (b) of FIG. 41, as proposed in the foregoing descriptions with reference to FIG. 4 and FIG. 5, the controller 270 of the second terminal 200 is able to transmit the content information request signal to the first terminal 100 in a manner that location information of the selected content information in the screen is contained in the content information request signal.

If the first terminal 100 is the bar type shown in (c) of FIG. 32, the controller 270 of the second terminal 200 enables a key value, which was inputted by a user for the selection of the content information, to be contained in the content information request signal.

In particular, if the content information within the first region 610 is selected, the controller 270 checks a display location of the content information within the first region 610 and then transmits a request signal containing the checked location information to the first terminal 100.

The controller 180 of the first terminal 100 obtains the location information within the request signal received from the second terminal 200 and then transmits the content information located at the obtained location on a current screen to the second terminal 200.

Finally, the controller 270 of the second terminal 200 receives the requested content information from the first terminal 100 via the communication unit 210 [S805].

A process for selecting the content information in the step S803 is explained in detail with reference to FIGS. 42 to 46 as follows.

Figure 42:
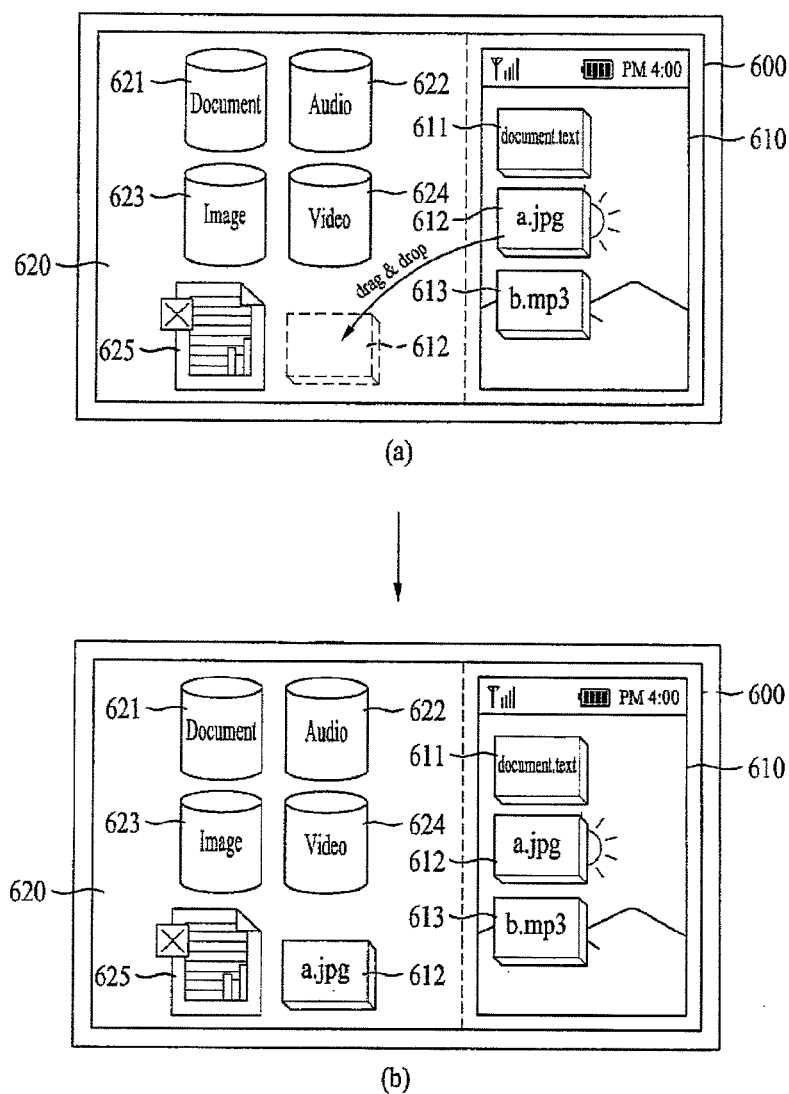
FIGS. 42 to 46 are diagrams of screen configurations for a process for a second terminal to receive and store content information from a first terminal according to a seventh embodiment of the present invention.

First of all, referring to FIG. 42, if content information ('a.jpg') 612 to be downloaded from the first terminal 100 is dragged and dropped to the second region 620 from the first region 610 via a keypad or mouse of the input unit 220 or the touchscreen 260 [(a) of FIG. 42], the controller 270 makes a request for the content information ('a.jpg') 612 to the first terminal 100 and then receives the requested content information ('a.jpg') 612 from the first terminal 100 [(b) of FIG. 42].

In particular, after a user of the second terminal 200 has placed a pointer provided to the screen 600 at the content information ('a.jpg') 612 within the first region 610 by manipulating the keypad or mouse of the input unit 220 or the like, if the content information ('a.jpg') 612 is dragged & dropped into the second region 620, the controller 270 makes a request for the content information ('a.jpg') 612 to the first terminal 100 and then receives it from the first terminal 100.

In more particular, if the content information ('a.jpg') 612 is dragged & dropped into the second region from the first region 610, the controller 270 recognizes that the content information ('a.jpg') 612 has been selected. The controller 270 then transmits the request signal to the first terminal 100 in a manner that the display location information of the content information ('a.jpg') 612 within the first region 610 is contained in the request signal.

If the first terminal 100 receives the request signal containing the display location of the content information ('a.jpg') 612 from the second terminal 200, it transmits the content information ('a.jpg') 612 existing at the received location on the current screen to the second terminal 200.

Subsequently, referring to FIG. 43, If the content information ('a.jpg') 612 is selected, the controller 270 displays a first window 631 for a transmission request for the content information ('a.jpg') 612, a second window 632 for an editing request and a third window 633 for an execution request [(a) of FIG. 43].

Figure 43:
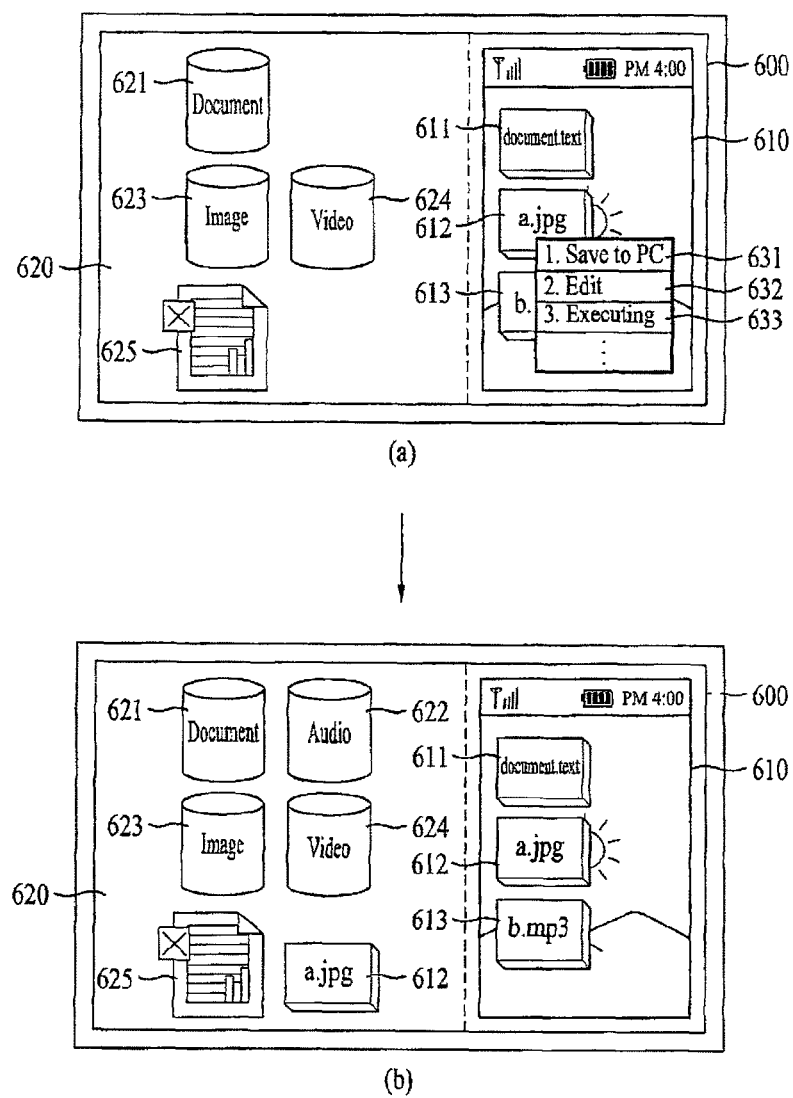

In this case, if the first window 631 for the transmission command of the content information ('a.jpg') 612 is selected by a user, the controller 270 makes a request for the content information ('a.jpg') 612 to the first terminal 100 and then receives the requested content information ('a.jpg') 612 from the first terminal 100 [(b) of FIG. 43].

In (a) of FIG. 43, if the user selects the second window 632, the controller 270 transmits a signal for an editing request for the content information ('a.jpg') 612 to the first terminal 100.

Figure 44:
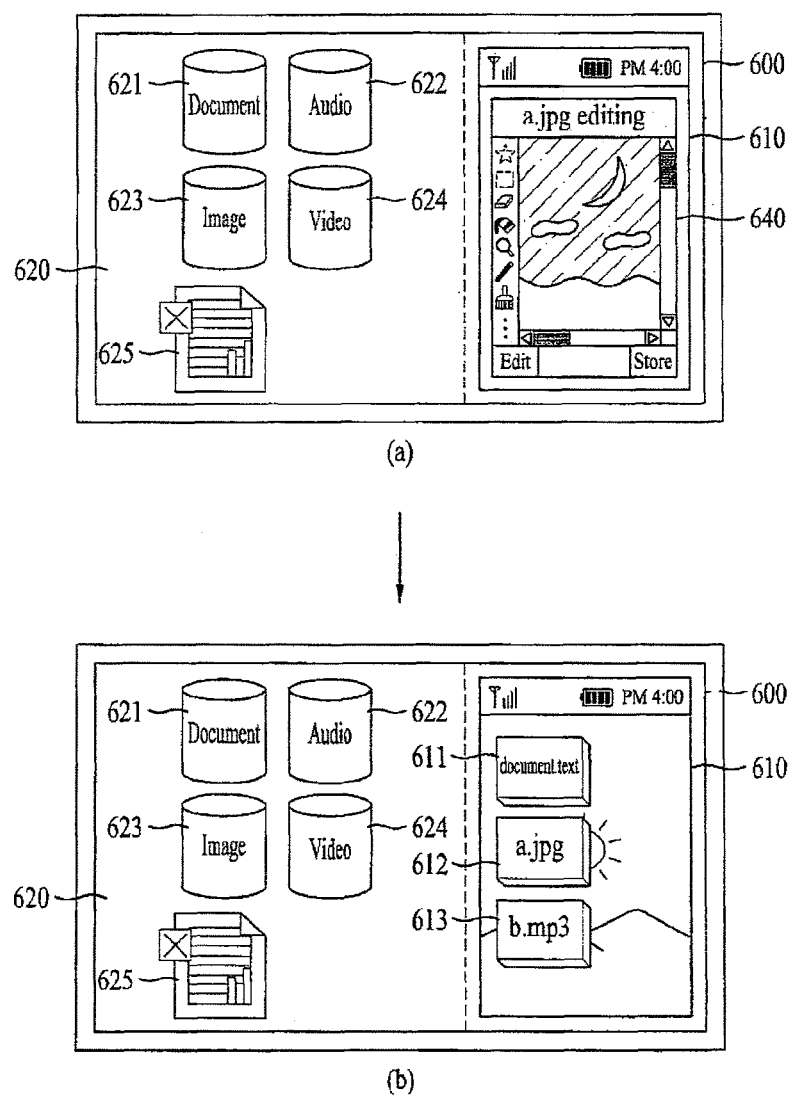
Figure 45:
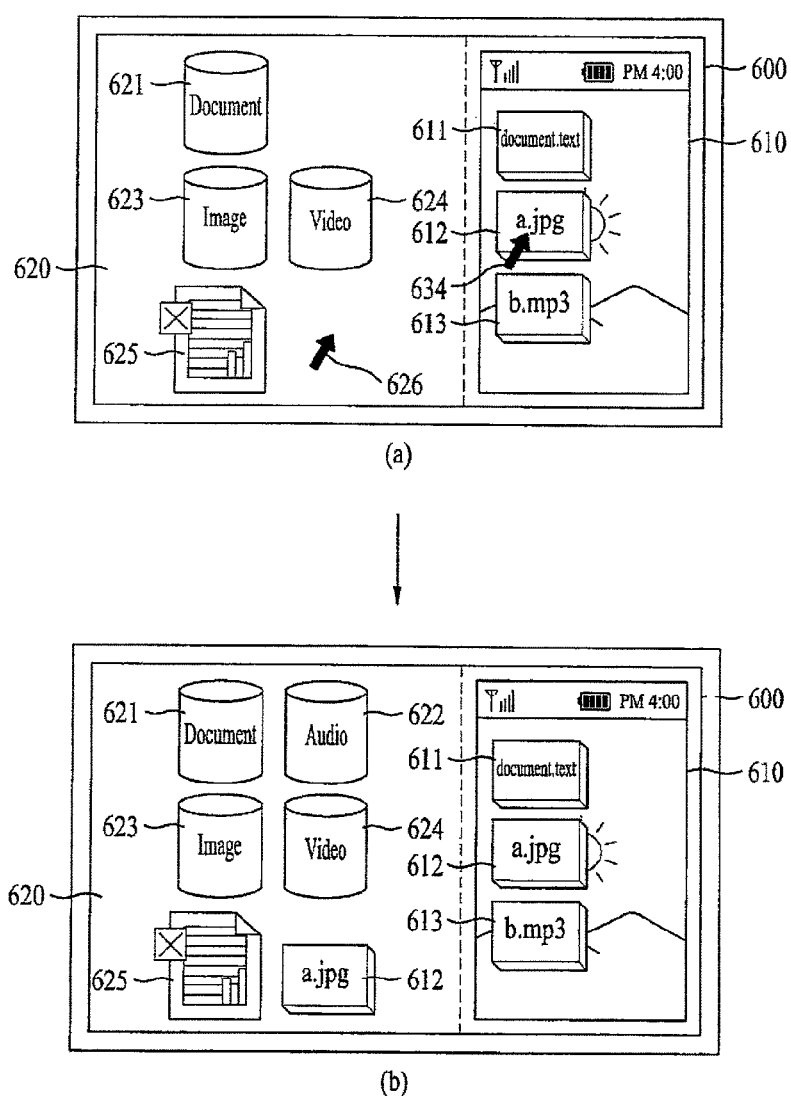

The controller 180 of the first terminal 100 drives an editing application of the content information ('a.jpg') 612, as shown in (a) of FIG. 44, according to the editing request signal received from the second terminal 200 and then transmits the screen information shown in (a) of FIG. 44 to the second terminal 200.

The controller 270 of the second terminal 200 displays the screen information shown in (a) of FIG. 44 on the first region 610. If a command for editing the content information ('a.jpg') 612 is inputted by a user via the input unit 220, the controller 270 of the second terminal 200 transmits the editing command inputted from the input unit 220 to the first terminal 100.

Subsequently, the controller 180 of the first terminal 100 edits the content information ('a.jpg') 612 according to the editing command received from the second terminal 200 and then transmits the screen information, in which the content information ('a.jpg') 612 is edited. To the second terminal 200.

Meanwhile, the controller 270 of the second terminal 200 receives the screen information, in which the content information ('a.jpg') 612 has been edited, from the first terminal 100 and then displays the received screen information on the first region 610. If the content information ('a.jpg') 612 edited by the user is dragged & dropped to the second region 620 from the first region 610, the controller 270 of the second terminal 200 makes a request for the edited content information ('a.jpg') 612 to the first terminal 100 and is then able to receive the requested content information ('a.jpg') 612 from the first terminal 100.

In particular, in FIG. 44, the user of the second terminal 200 directly edits data to download in the first terminal 100 and is then able to download the edited data from the first terminal 100.

The controller 180 of the first terminal 100 drives an editing application of the content information ('a.jpg') 612, as shown in (a) of FIG. 44, according to the editing request signal received from the second terminal 200 and then transmits the screen information shown in (a) of FIG. 44 to the second terminal 200.

The controller 270 of the second terminal 200 displays the screen information shown in (a) of FIG. 44 on the first region 610. If a command for editing the content information ('a.jpg') 612 is inputted by the user via the input unit 220, the controller 270 of the second terminal 200 transmits the editing command inputted from the input unit 220 to the first terminal 100.

The controller 180 of the first terminal 100 edits the content information ('a.jpg') 612 according to the editing command received from the second terminal 200 and then transmits the screen information, in which the content information ('a.jpg') 612 has been edited, to the second terminal 200.

The controller 270 of the second terminal 200 receives the screen information, in which the content information ('a.jpg') 612 has been edited, from the first terminal 100 and then displays the received screen information on the first region 610. If the content information ('a.jpg') 612 is dragged & dropped to the second region 620 from the first region 610 by the user, the controller 270 of the second terminal 200 makes a request for the edited content information ('a.jpg') 612 to the first terminal 100 and is then able to receive the requested content information ('a.jpg') 612, Subsequently, referring to FIG. 45, after the user of the second terminal 200 has made a selection 634 for the content information ('a.jpg') 612, which is to be downloaded from the first terminal 100, by manipulating a keypad or mouse of the input unit 220, if the user selects a specific point 626 of the second region 620 [(a) of FIG. 45], the controller 270 makes a request for the content information ('a.jpg') 612 to the first terminal 100 and then receives the requested content information ('a.jpg') 612 [(b) of FIG. 45].

Figure 46:
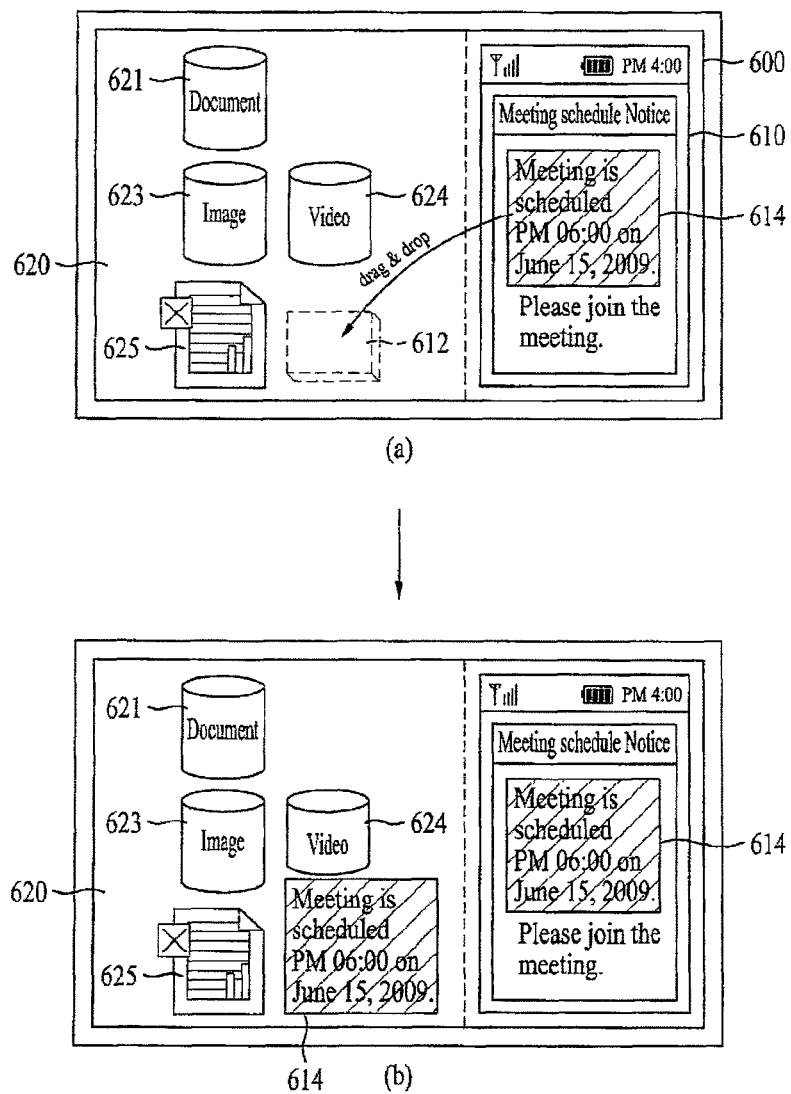

Subsequently, referring to FIG. 46, if the user of the second terminal 200 specifies text content information 614, which is to be downloaded, within the first region 610 by manipulating a keypad or mouse of the input unit 220 [(a) of FIG. 46], the controller 270 makes a request for the specified text content information 614 to the first terminal 100 and then receives the requested text content information 614 [(b) of FIG. 46].

Meanwhile, the controller 270 is able to further perform a process for storing, editing and executing the content information received from the first terminal, as shown in the following steps S806 to S811 or FIGS. 47 to 52.

Figure 47:
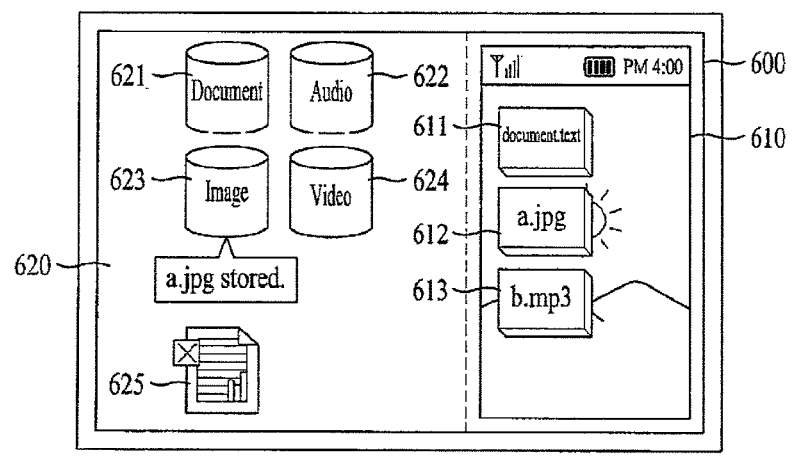
FIG. 47 is a diagram of a screen configuration for a process for a second terminal to classify and store content information received from a first terminal according to a seventh embodiment of the present invention.

First of all, referring to FIG. 47, if a storage command for the content information ('a.jpg') 612 received in (b) of FIG. 42 is inputted by a user [S806], the controller 270 stores the received content information ('a.jpg') 612 in the memory 240.

In this case, the controller 270 obtains a format of the content information ('a.jpg') 612 and is then able to store the content information ('a.jpg') 612 in an 'image' storage space 623 corresponding to the obtained format of the content information ('a.jpg') 612 among storage spaces 621, 622, 623 and 624 which have been already classified per content information format [S807].

Figure 48:
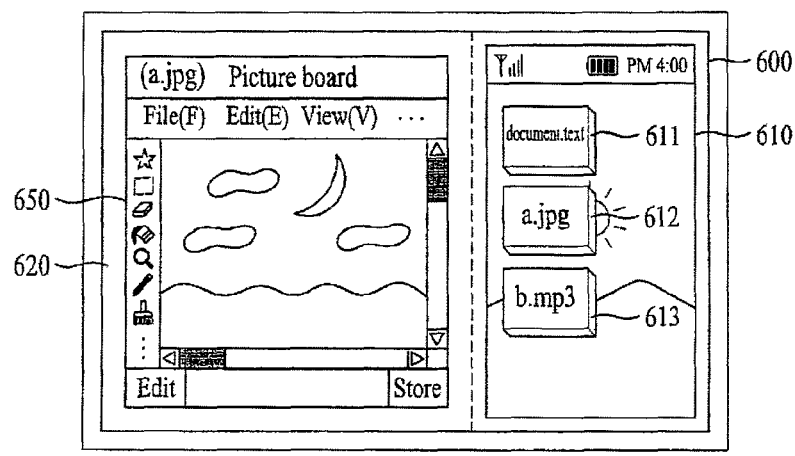

Subsequently, if an editing command for the content information ('a.jpg') 612 received in (b) of FIG. 42 is inputted by a user [S808], the controller 270 drives an image editing relevant application 650 previously provided to the memory 240, as shown in FIG. 48.

In this case, the editing application 650 is provided with a plurality of editing tools for editing the image in various ways. The user of the second terminal 200 is able to edit the content information ('a.jpg') 612 using the editing tools.

Moreover, the controller 270 is able to store the content information ('a.jpg') 612 having been edited by the user through the above editing tools [S809].

Figure 49:
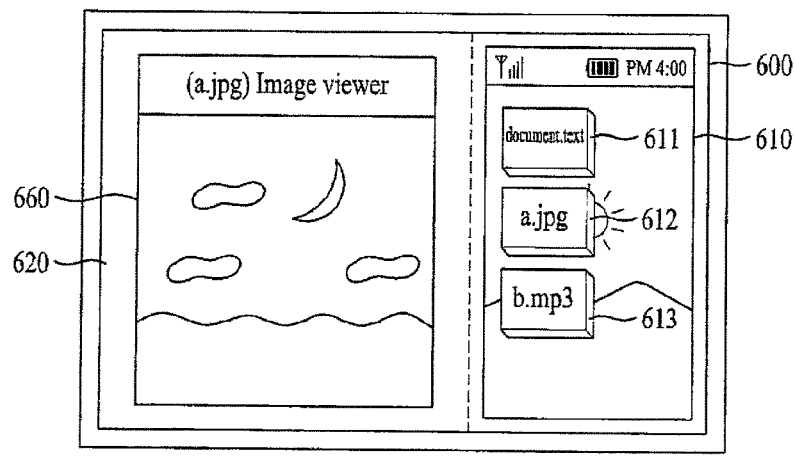

Subsequently, referring to FIG. 49, if an execution command for the content information ('a.jpg') 612 received in (b) of FIG. 42 is inputted by a user [S810], the controller 270 drives an image execution relevant application 660 previously provided to the memory 240 and then executes the content information ('a.jpg') 612 through the image execution application 660 [S811].

In this case, the image execution application 660 can include the image viewer software that displays images in various formats and is able to perform the same editing function of the image editing application 650 shown in FIG. 48.

Namely, it is able to display the content information ('a.jpg') 612 through the image execution application. And, it is also able to edit and store the content information ('a.jpg') 612.

Figure 50:
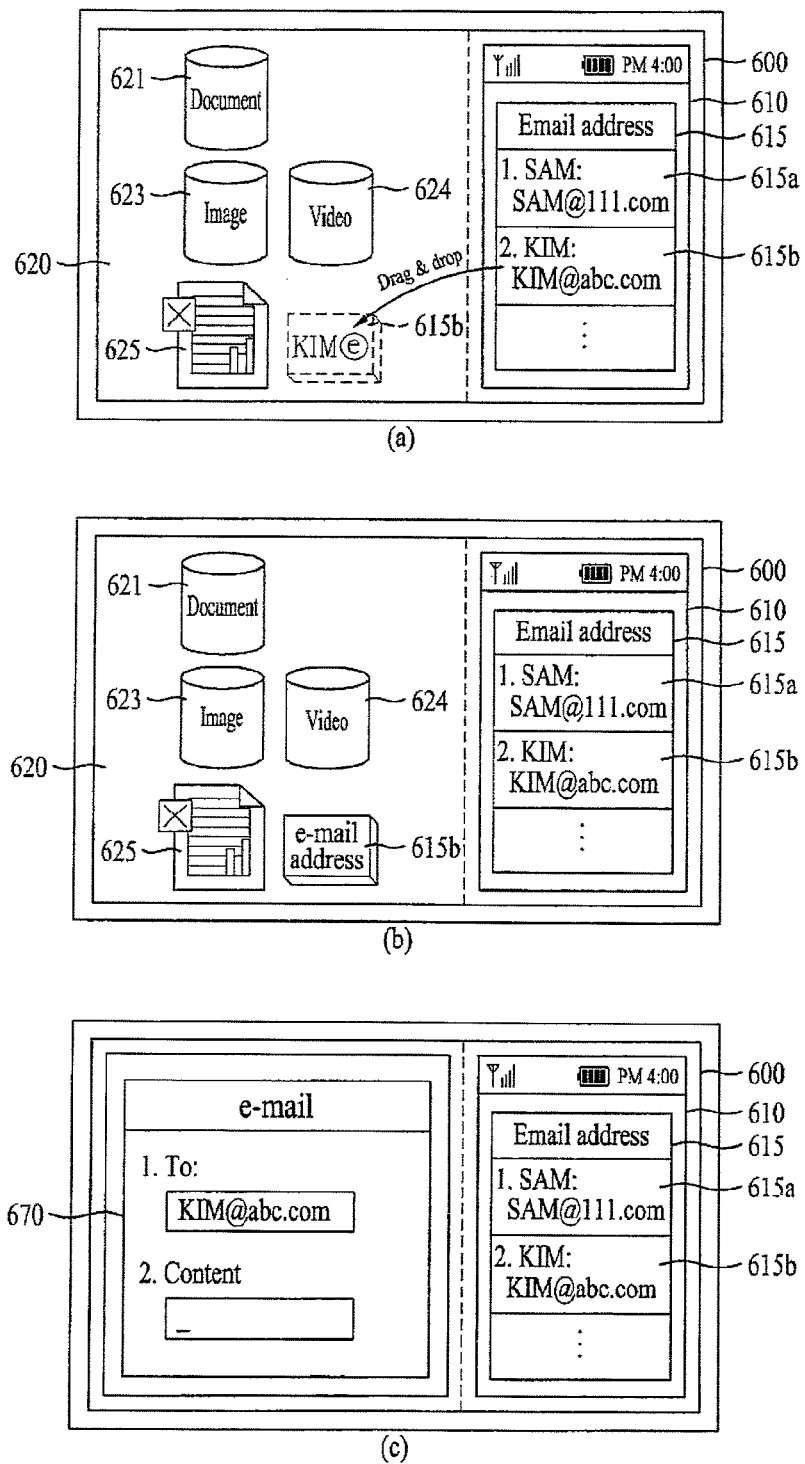

Subsequently, referring to FIG. 50, while an email address list content information 615 is displayed on the first region 610, if an email address ('2. KIM@abc.com') 615b is dragged & dropped to the second region 620 [(a) of FIG. 50], the controller 270 makes a request for the email address ('2. KIM@abc.com') 615b to the first terminal 100 and then receives the requested email address ('2. KIM@abc.com') 615b [(b) of FIG. 50].

If the email address ('2. KIM@abc.com') 615b is selected, the controller 270 drives an email application relevant to the email address ('2. KIM@abc.com') 615b and is then able to display an email writing window 670 for an email supposed to be sent to the email address ('2. KIM@abc.com') 615b [(b) of FIG. 50]. In this case, if a user of the second terminal 200 writes an email content through the email writing window 660, the controller 270 is able to send the written email to the email address ('2. KIM@abc.com') 615b.

Subsequently, referring to FIG. 51, while a phonebook content information 616 is displayed on the first region 610, if a contact information ('2. KIM 010-111-xxx') 616b is dragged & dropped to the second region 620 [(a) of FIG. 51], the controller 270 makes a request for the contact information ('2. KIM 010-111-xxx') 616b to the first terminal and then receives the requested contact information ('2. KIM 010-111-xxx') 616b [(b) of FIG. 51].

If the contact information ('2. KIM 010-111-xxx') 616b is selected, the controller 270 drives a call connection application relevant to the contact information ('2. KIM 010-111-xxx') 616b and is then able to connect a call to the contact information ('2. KIM 010-111-xxx') 616b [(c) of FIG. 51].

Figure 51:
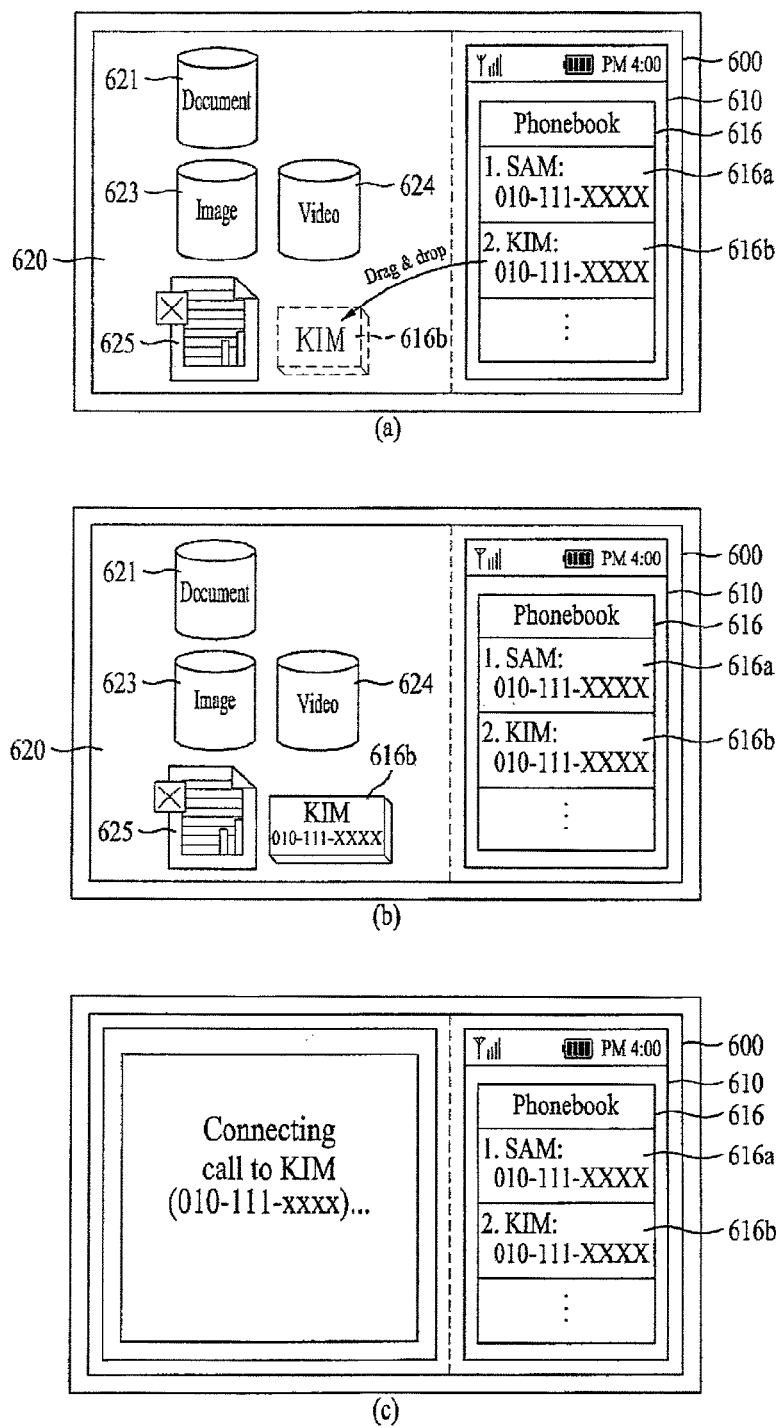

Moreover, although not shown in FIG. 51, if the contact information ('2. KIM 010-111-xxx') 616b is selected, the controller 270 drives a message transmitting application relevant to the contact information ('2. KIM 010-111-xxx') 616b and is then able to display a message writing window for a message to be sent to the contact information ('2. KIM 010-111-xxx') 616b. In this case, if a user of the second terminal 200 writes a message content through the message writing window, the controller 270 is able to send the written message to the contact information ('2. KIM 010-111-xxx') 616b.

Subsequently, referring to FIG. 52, while a webpage address ('http://www.abc.com') 617 is displayed on the first region 610, if the webpage address ('http://www.abc.com') 617 is dragged & dropped to the second region 620 [(a) of FIG. 52], the controller 270 makes a request for the webpage address ('http://www.abc.com') 617 to the first terminal 110 and then receives the requested webpage address ('http://www.abc.com') 617 [(b) of FIG. 52].

If the webpage address ('http://www.abc.com') 617 is selected, the controller 270 drives the internet access application and then accesses the webpage address ('http://www.abc.com') 617 [(c) of FIG. 52].

Moreover, although not shown in the drawing, if the content information received from the first terminal 100 is 'schedule information', the controller 270 of the second terminal 200 drives a schedule management application and is then able to update the schedule management application by editing the received 'schedule information' into the driven schedule management application. And, the controller 270 of the second terminal 200 is able to update the schedule management application without editing the received 'schedule information' into the driven schedule management application.

In particular, all kinds of applications for the execution and editing of content information received from the first terminal 100 can be provided to the memory 230 of the second terminal 200. The controller 270 of the second terminal 200 obtains a format of the content information received from the first terminal 100, drives an application corresponding to the obtained format of the content information, and is then able to provide a user with the execution and editing functions.

Figure 53:
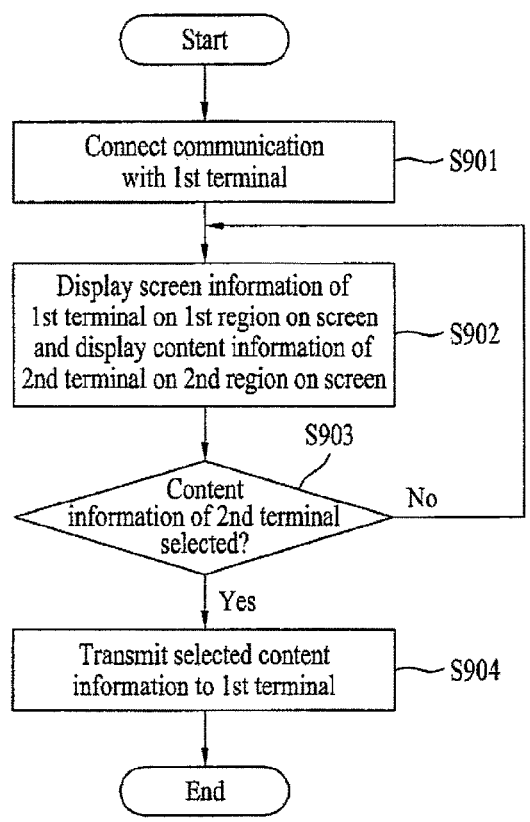
FIG. 53 is a flowchart of a process for transmitting content information of a second terminal to a first terminal according to to a seventh embodiment of the present invention.

Subsequently, referring to FIGS. 53 to 55, if a communication with the first terminal 100 is connected via the communication unit 210 [S901], the controller 270 of the second terminal 200 receives screen information containing at least one content information from the first terminal 100 and then displays the received screen information 610 of the first terminal 100 on a screen 600 of the display unit 260 [S902].

Figure 54:
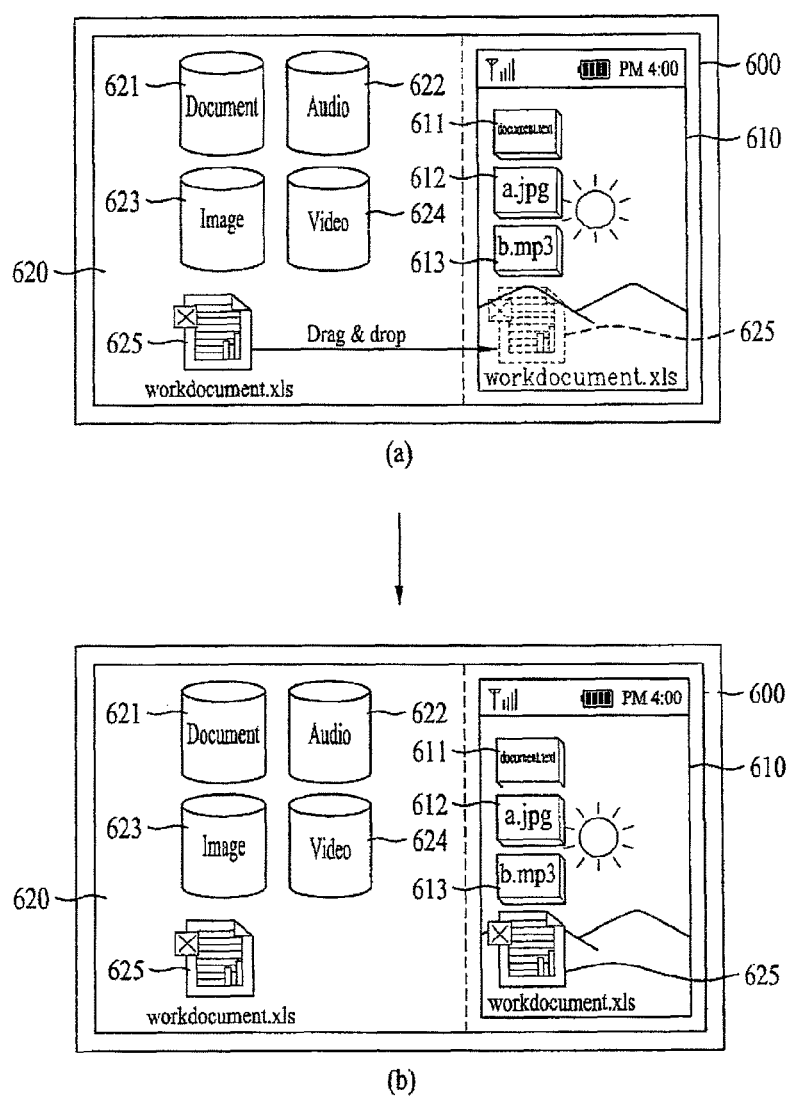
FIG. 54 and FIG. 55 are diagrams of screen configurations of a process for transmitting content information of a second terminal to a first terminal according to a seventh embodiment of the present invention.

In this case, the controller 270 of the second terminal 200 divides the screen 600 of the display unit 260, as shown in (a) of FIG. 54, into a first region 610 and a second region 620. Subsequently, the controller 270 of the second terminal 200 displays the first screen information containing the content information 611, 612 and 613 of the first terminal 100 on the first region 610 and also displays the second screen information containing the content information 625 of the second terminal 200 on the second region 620.

While the first and second screen information are displayed on the first and second regions 610 and 620, respectively, if a user selects content information ('work document.xls') 625 within the second region 620 via the input unit 220 or the display unit 260 of a touchscreen type [S903], the controller 270 of the second terminal 200 transmits the content information ('work document.xls') 625 to the first terminal 100 by controlling the communication unit 210 [S904].

In particular, referring to (a) of FIG. 54, if the content information ('work document.xls') 625, which is to be transmitted to the first terminal 100, is dragged and dropped from the second region 620 to the first region 610 via a keypad or mouse of the input unit 220 or the touchscreen 260 [(a) of FIG. 42], the controller 270 transmits the content information ('work document.xls') 625 to the first terminal 100.

In particular, after a user of the first terminal 100 has placed a pointer provided to the screen 600 at the content information ('work document.xls') 625 within the second region 620 by manipulating the keypad or mouse of the input unit 220 or the like, if the content information ('work document.xls') 625 is dragged & dropped into the first region 610, the controller 270 transmits the content information ('work document.xls') 625 to the first terminal 100.

Moreover, while the content information ('work document.xls') 625 within the second region 620 of the touchscreen type display unit 260 is touched, if the user of the second terminal 200 drags and drops the content information ('work document.xls') 625 into the first region 610, the controller 270 transmits the content information ('work document.xls') 625 to the first terminal 100.

While the user of the second terminal 200 selects the content information ('work document.xls') 625, if the user selects the first region 610 by manipulating the keypad and mouse of the input unit 220, the controller 270 transmits the content information ('work document.xls') 625 to the first terminal 100.

If the user of the second terminal multi-touches the content information ('work document.xls') 625 within the second region 620 of the touchscreen type display unit 260 and the first region 610, the user of the second terminal 200 transmits the content information ('work document.xls') 625 to the first terminal 100.

Figure 55:
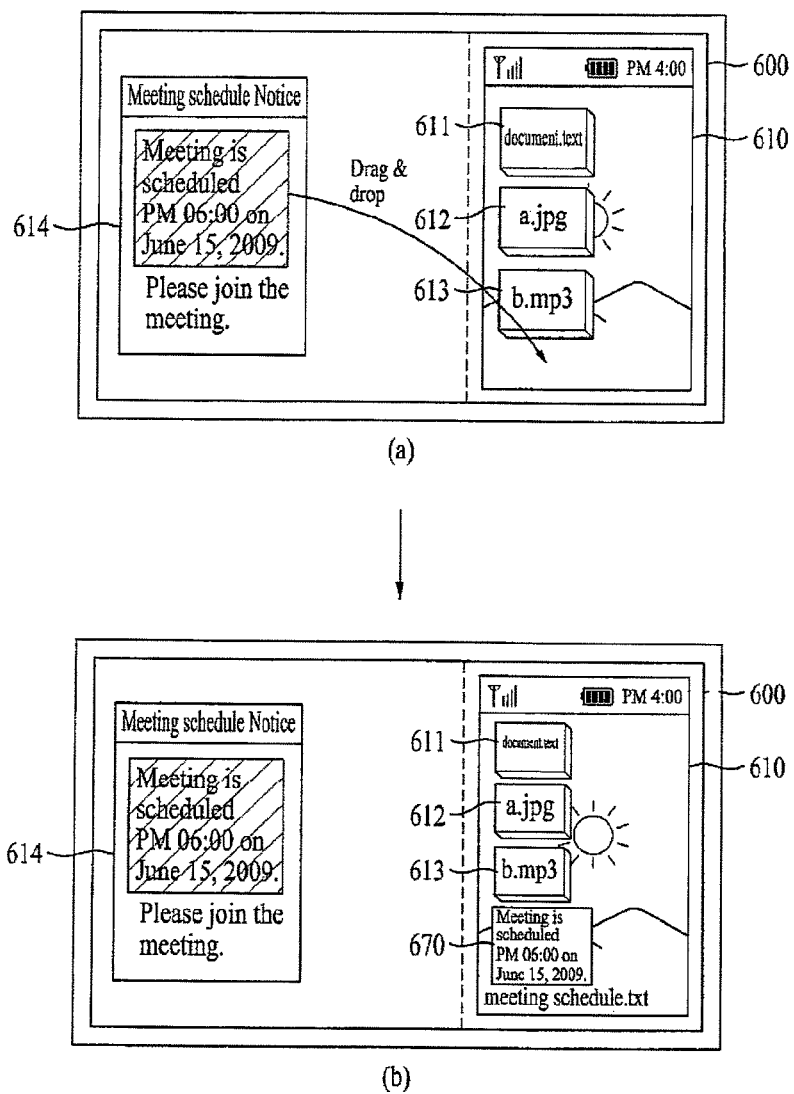

Moreover, if the user of the second terminal 200 specifies text information 670, which is to be transmitted to the first terminal 100, within the second region 620 by manipulating the keypad and mouse of the input unit 220, as shown in (a) of FIG. 55, the controller 270 transmits the content information ('work document.xls') 625 to the first terminal 100, a shown in (b) of FIG. 55.

The first terminal is able to perform the storing, editing and executing processes described with reference to FIGS. 47 to 52 on the content information ('work document.xls') 625 received from the second terminal 200 according to FIGS. 53 to 55. And, the first terminal 100 is able to transmit the storage, editing and execution screen information to the second terminal 200.

Eighth Embodiment

According to an eighth embodiment of the present invention, while a second terminal is connected to communicate with a plurality of first and third terminals, when screen information of the first and third terminals are respectively displayed on a screen of the second terminal, if content information within the screen information of the first terminal is shifted into the screen information of the third terminal, the second terminal delivers the content information of the first terminal to the third terminal. Such a function is provided by the eighth embodiment of the present invention.

In the following description of an eighth embodiment of the present invention, assume that first and third terminals are mobile terminal types and assume that a second terminal is a PC type terminal.

Figure 56:
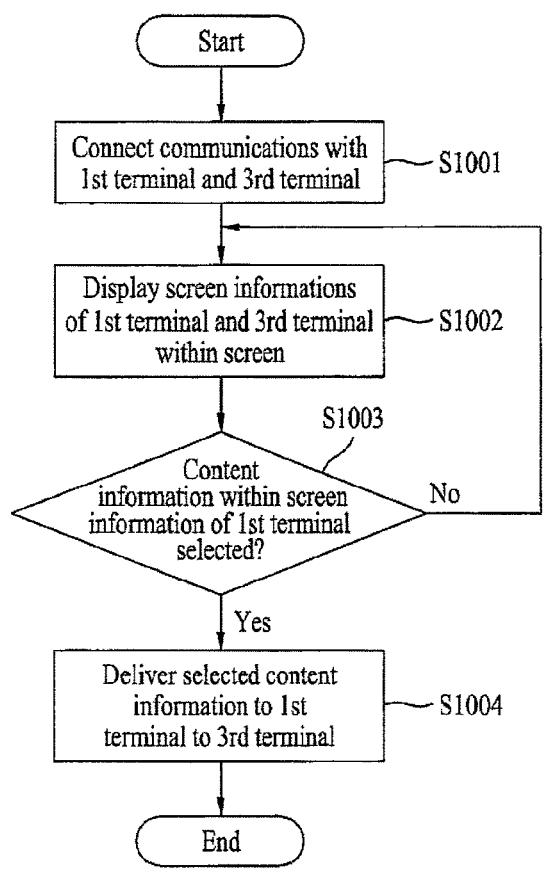
FIG. 56 is a flowchart of a process for a second terminal to deliver content information of a first terminal to a third terminal according to an eighth embodiment of the present invention.
Figure 57:
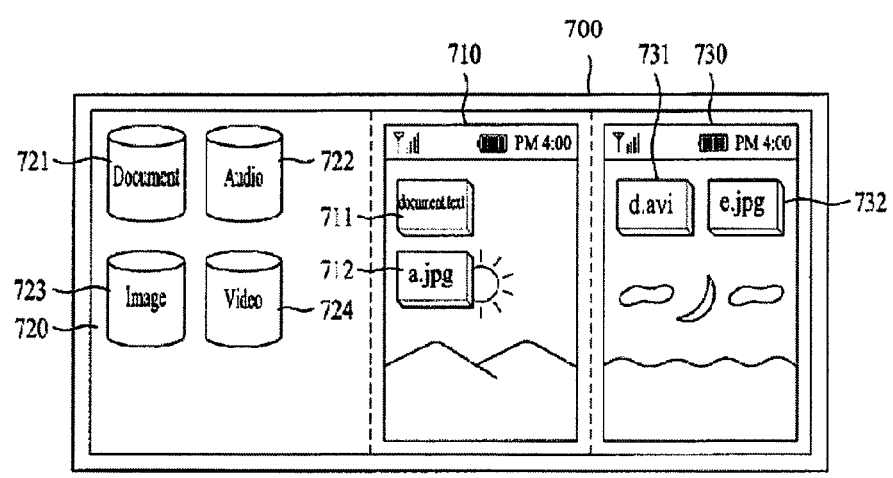
FIG. 57 is a diagram of a screen configuration for a state that screen information of a second terminal and screen information of first and third terminals are displayed on a screen of the second terminal together according to an eighth embodiment of the present invention.
Figure 58:
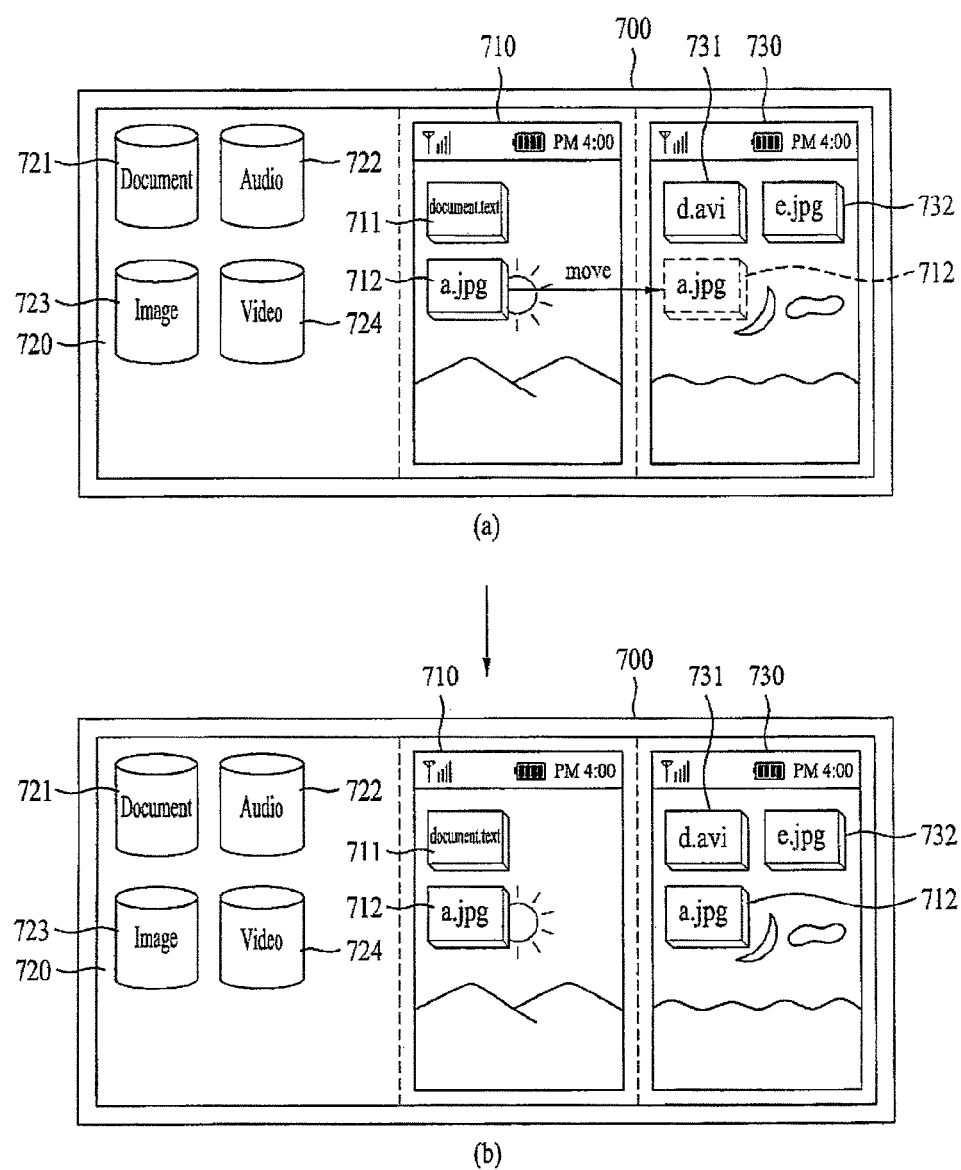
FIG. 58 is a diagram of a screen configuration for a process for a second terminal to deliver content information of a first terminal to a third terminal according to an eighth embodiment of the present invention.

Referring to FIGS. 56 to 58, if communications with first and third terminals 100 and 300 are connected via the communication unit 210 [S1001], the controller 270 of the second terminal 200 receives screen information, each of which contains at least one content information, from the first and third terminals 100 and 300, respectively, and then displays the received screen information 710 and 730 of the first and third terminals 100 and 300 on a screen 700 of the display unit 260 [S1002].

In this case, referring to FIG. 57, the controller 270 of the second terminal 200 divides the screen 700 of the display unit 260 into first to third regions 710, 720 and 730. The controller 270 of the second terminal 200 displays the first screen information containing the content information 711 and 712 on the first region 710. The controller 270 of the second terminal 200 displays the second screen information of the second terminal 200 on the second region 720. And, the controller 270 of the second terminal 200 displays the third screen information containing the content information 731 and 732 on the third region 730.

Meanwhile, while the screen information of the first and second terminals 100 and 300 are displayed on the first and third regions 710 and 730, respectively, if a user selects the content information 712 within the first region 710 and the third region 730 via the input unit 220 or the display unit 260 of a touchscreen type [S1003], the controller 270 of the second terminal 200 delivers the selected content information 712 of the first terminal 100 to the third terminal 300 by controlling the communication unit 210 [S1004].

The content information selecting process of the first terminal 100 in the step S903 is explained in detail with reference to FIG. 58 as follows.

First of all, referring to FIG. 58, if content information ('a.jpg') 712 of the first terminal 100, which is to be delivered to the third terminal 300, is dragged & dropped to the third region 730 from the first region 710 via the keypad of the input unit 220, the mouse or the touchscreen 260 [(a) of FIG. 58], the controller 270 delivers the content information ('a.jpg') 712 to the third terminal 300 [(b) of FIG. 58].

In particular, if a user of the second terminal 200 places a pointer provided to the screen 700 at the content information ('a.jpg') 712 within the first region 710 by manipulating the keypad of the input unit 220, the mouse or the like and then drags & drops the content information ('a.jpg') 712 into the third region 730 [(a) of FIG. 58], the controller 270 delivers the content information ('a.jpg') 712 to the third terminal 300 [(b) of FIG. 58].

If the user of the second terminal 200 selects the third region 730 by manipulating the keypad and mouse of the input unit 200 while selecting the content information ('a.jpg') 712, the controller 270 delivers the content information ('a.jpg') 712 to the third terminal 300.

If the user of the second terminal 200 multi-touches the content information ('a.jpg') 712 within the first region 710 of the touchscreen 260 and the third region 730, the controller 270 delivers the content information ('a.jpg') 712 to the third terminal 300.

In case of delivering the content information 712 selected in FIG. 58 to the third terminal 300, the controller 270 generates a signal for commanding to transmit the content information 712 to the third terminal 300 and then transmits the generated transmission command signal to the first terminal 100 via the communication unit 210.

If so, the first terminal 100 transmits the content information 712 to the third terminal 300 according to the transmission command signal received from the second terminal 200.

In this case, as mentioned in the foregoing description with reference to FIG. 4 and FIG. 5, if the content information 712 of the first region 710 is selected in (a) of FIG. 58, the controller 270 obtains display location information of the content information 712 on the first region 710 and is then able to transmit the transmission command signal in a manner that the obtained location information of the content information 712 is contained in the transmission command signal. If so, the first terminal 100 is able to transmit the content information 712 existing at the received location within a current screen to the third terminal 300.

Moreover, the controller 270 makes a request for the selected content information 712 in FIG. 58 to the first terminal 100 and then receives the requested content information 712. The controller 270 is able to deliver the content information 712 received from the first terminal 100 by transmitting the content information 712 to the third terminal.

Figure 59:
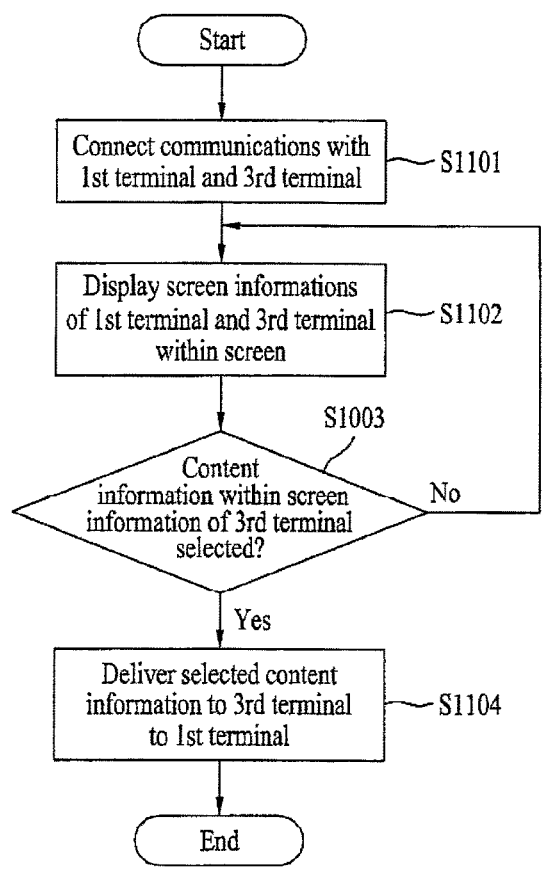
FIG. 59 is a flowchart of a process for a second terminal to deliver content information of a third terminal to a first terminal according to an eighth embodiment of the present invention.

Subsequently, referring to FIG. 59 and FIG. 60, if communications with first and third terminals 100 and 300 are connected via the communication unit 210 [S1101], the controller 270 of the second terminal 200 receives screen information, each of which contains at least one content information, from the first and third terminals 100 and 300, respectively, and then displays the received screen information 710 and 730 of the first and third terminals 100 and 300 on a screen 700 of the display unit 260 [S1102].

Meanwhile, while the screen information of the first and second terminals 100 and 300 are displayed on the first and third regions 710 and 730, respectively, if a user selects the content information 731 within the third region 730 and the first region 710 via the input unit 220 or the display unit 260 of a touchscreen type [S1103], the controller 270 of the second terminal 200 delivers the selected content information 731 of the third terminal 300 to the first terminal 100 by controlling the communication unit 210 [S1104].

Figure 60:
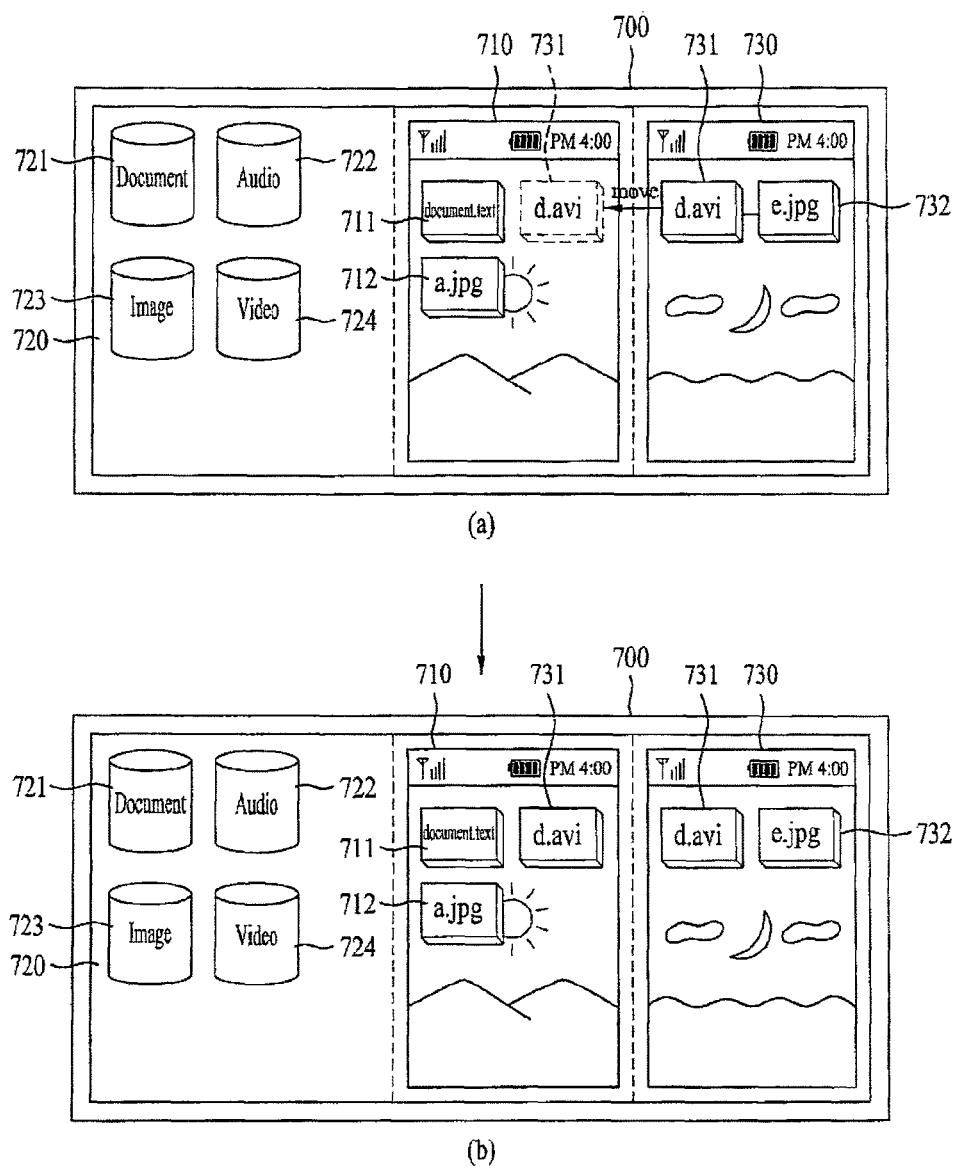
FIG. 60 is a diagram of a screen configuration for a process for a second terminal to deliver content information of a third terminal to a first terminal according to an eighth embodiment of the present invention.

In particular, referring to FIG. 60, if the content information ('d.avi') 731 of the third terminal 300, which is to be delivered to the first terminal 100, is dragged & dropped from the third region 730 to the first region 710 via the keypad of the input unit 220, the mouse or the touchscreen 260 [(a) of FIG. 60], the controller 270 delivers the content information ('d.avi') 731 to the first terminal 300 [(b) of FIG. 60].

If the user of the second terminal 200 selects the first region 710 by manipulating the keypad and mouse of the input unit 200 while selecting the content information ('d.avi') 731, the controller 270 delivers the content information ('d.avi') 731 to the first terminal 100.

If the user of the second terminal 200 multi-touches the content information ('d.avi') 731 within the third region 730 of the touchscreen 260 and the first region 710, the controller 270 delivers the content information ('d.avi') 731 to the first terminal 100.

Ninth Embodiment

According to a ninth embodiment of the present invention, while a short-range communication for a wireless operation control of the present invention is connected between a first terminal and a second terminal, if the first terminal is connected to a mobile communication with an external third terminal, the first terminal converts short-range communication data received from the second terminal to mobile communication data and then transmits this mobile communication data to the third terminal. Moreover, the first terminal converts mobile communication data received from the third terminal to short-range communication data and then transmits this short-range communication data to the second terminal. Therefore, the object of the ninth embodiment of the present invention is to provide a tripartite heterogeneous communication function.

In the following description of a ninth embodiment of the present invention, assume that first and third terminals are mobile terminal types and assume that a second terminal is a PC type terminal.

A ninth embodiment of the present invention is explained in detail with reference to FIG. 61 and FIG. 62 as follows.

Figure 61:
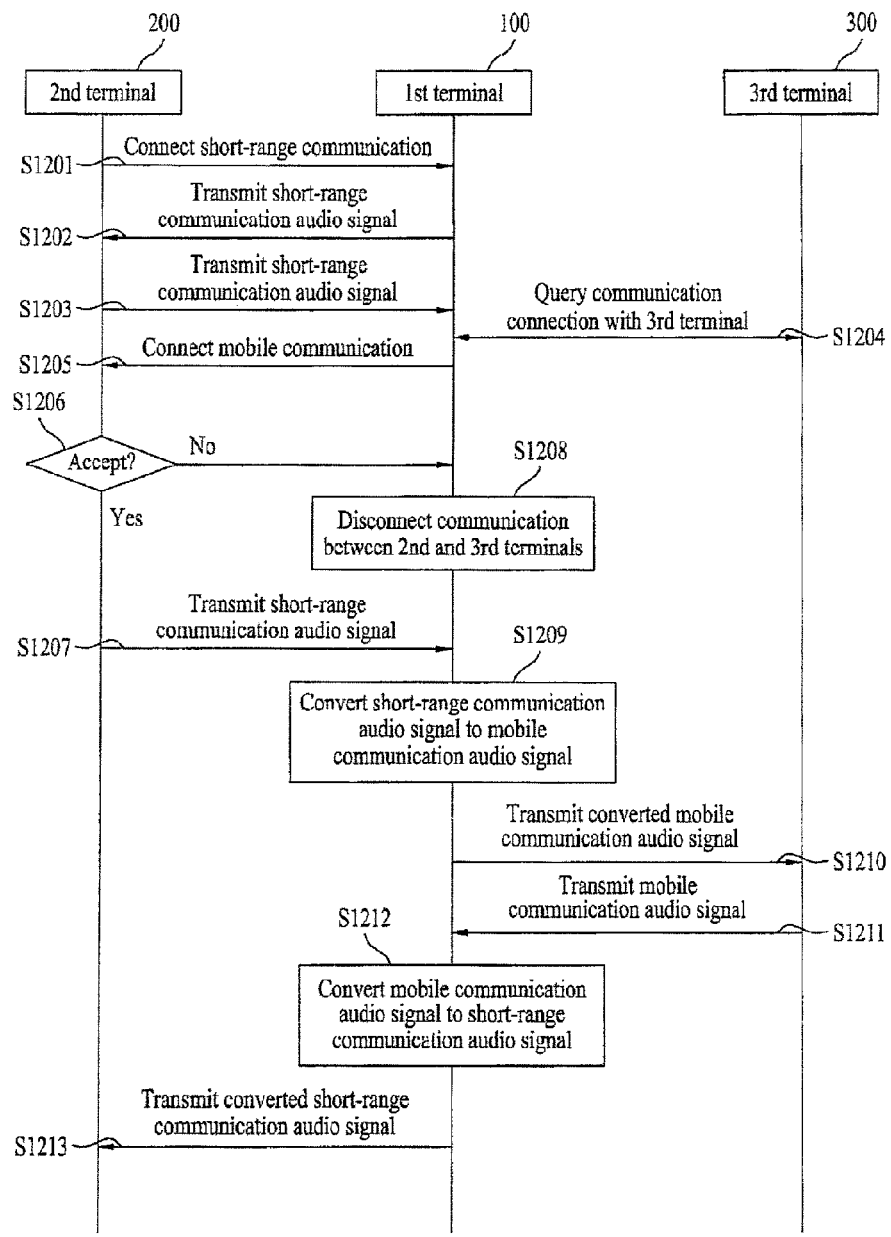
FIG. 61 is a signal processing diagram of a process for performing a voice call among a second terminal, a first terminal and a third terminal using different communication systems according to a ninth embodiment of the present invention.

FIG. 61 is a signal processing diagram of a process for performing a voice call among a second terminal, a first terminal and a third terminal using different communication systems according to a ninth embodiment of the present invention.

Referring to FIG. 61, If a remote control communication with the second terminal 200 is connected [S1201], the controller 180 of the first terminal 100 is able to perform the above-mentioned operations of the first to eighth embodiments. And, the controller 180 of the first terminal 100 is able to perform a voice call with the second terminal 200 using the short-range communication.

In particular, the controller 270 of the second terminal 200 converts a user audio inputted via the microphone to a short-range communication audio signal and then transmits the converted short-range communication audio signal to the first terminal 100 via the communication unit 210 [S1202]. Moreover, the controller 270 of the second terminal 200 outputs a speech signal of the first terminal 100, which was received via the communication unit 210, to the speaker 240.

The controller 180 of the first terminal 100 converts a user audio inputted via the microphone 122 to a short-range communication audio signal and then transmits the converted short-range communication audio signal to the second terminal 200 via the communication unit 110 [S1203]. Moreover, the controller 180 of the first terminal 100 outputs a speech signal of the second terminal 200, which was received via the communication unit 110, to the audio output module 152.

Thus, in the course of the voice call using the short-range communication with the second terminal 200, if a mobile communication with an external third terminal 300 is connected [S1204], the controller 180 of the first terminal 100 generates a signal for querying a presence or non-presence of a communication connection to the third terminal 200 and then transmits the generated query signal to the second terminal 200 [S1205].

In this case, the mobile communication can adopt one of Code Division Multiple Access (CDMA), Universal Mobile Telecommunications Systems (UMTS), Global System for Mobile Communications (GSM) and Wideband Code Division Multiple Access (WCDMA).

If the query signal is received from the first terminal 100, the controller 270 of the second terminal 200 displays a selection window for selecting a presence or non-presence of a communication connection with the third terminal 200 on the screen of the display unit 260.

If an acceptance of a communication connection with the third terminal 300 is selected from the selection window [S1206], the controller 27 transmits a signal for announcing the communication connection acceptance to the first terminal 100 and transmits a user's audio signal inputted via the microphone 250 to the first terminal 100 [S1207].

Moreover, if a communication disconnection from the third terminal 300 is selected from the selection window, the controller 270 of the second terminal 200 transmits a signal for announcing the communication disconnection to the first terminal 100.

If the signal for announcing the communication disconnection is received from the second terminal 200, the first terminal 100 disconnects the communication between the second terminal 200 and the third terminal 300 [S1208].

Meanwhile, if the short-range communication audio signal is received from the second terminal 200 [S1207], the controller 180 of the first terminal 100 converts the received short-range communication audio signal to a mobile communication audio signal [S1209] and then transmits the converted mobile communication audio signal to the third terminal 300 [S1210].

Moreover, if the mobile communication audio signal is received from the third terminal 300 [S1211], the controller 180 of the first terminal 100 converts the received mobile communication audio signal to a short-range communication audio signal [S1212] and then transmits the converted short-range communication audio signal to the second terminal 200 [S1213].

Figure 62:
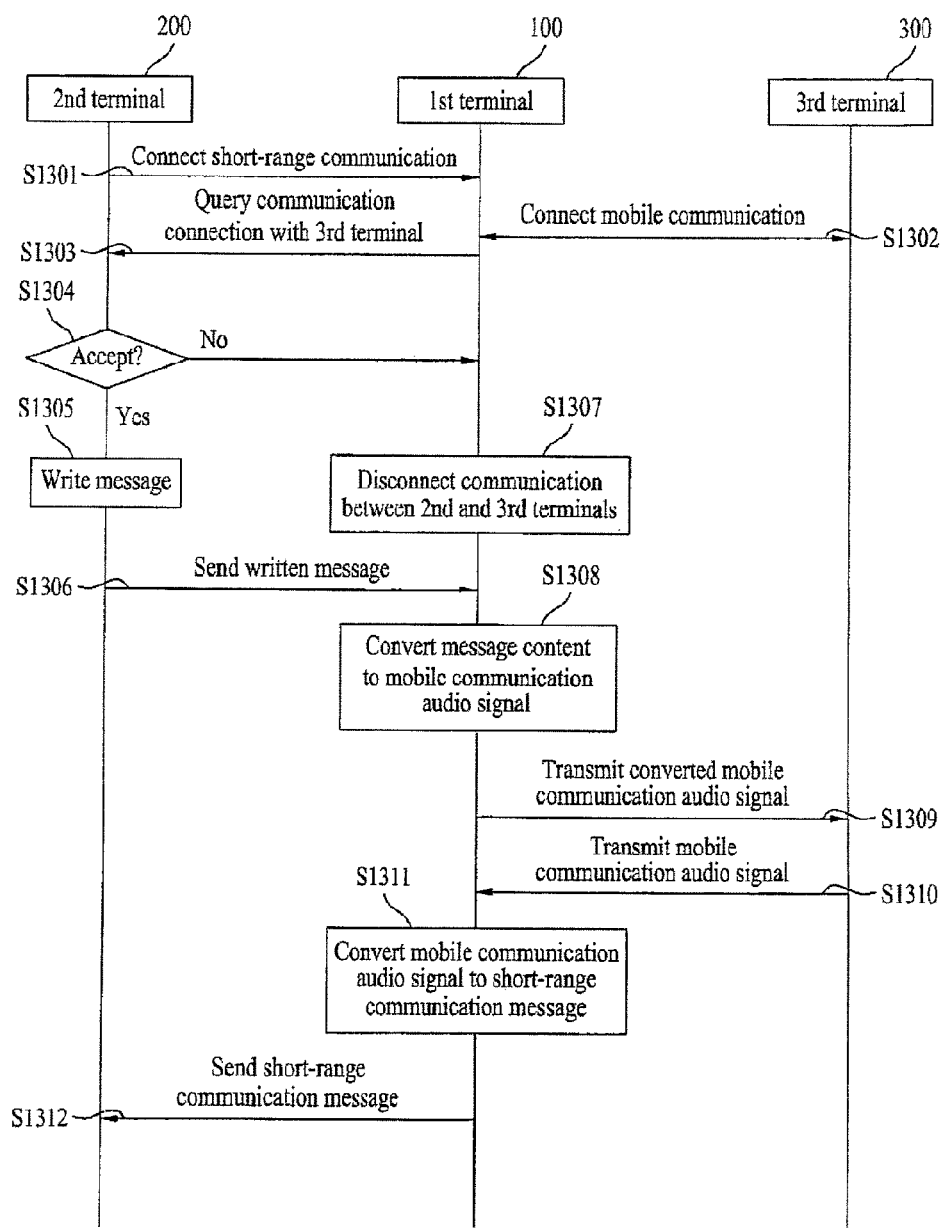
FIG. 62 is a signal processing diagram of a process for performing a voice call among a second terminal, a first terminal and a third terminal using messages and speech according to a ninth embodiment of the present invention.

FIG. 62 is a signal processing diagram of a process for performing a voice call among a second terminal, a first terminal and a third terminal using messages and speech according to a ninth embodiment of the present invention.

Referring to FIG. 62, the first terminal 100 is connected to the second terminal 200 by a short-range communication system [S1301] and is also connected to the third terminal 300 by a mobile communication system [S1302].

In this case, the first terminal 100 performs a text message communication with the second terminal using the short-range communication system and also performs a speech call with the third terminal 300 using the mobile communication system.

The first terminal 100 transmits a signal for querying a presence or non-presence of a communication connection with the third terminal to the second terminal 200 [S1303].

If the query signal is received from the first terminal 100, the second terminal 200 displays a selection window for selecting a presence or non-presence of a communication connection with the third terminal 300 on the screen of the display unit 260.

If an acceptance of a communication connection with the third terminal 300 is selected from the selection window [S1304], the second terminal 200 transmits a signal for announcing the acceptance of the communication connection to the first terminal 100, receives an input of a message content from a user [S1305], and then sends a message inputted by the user to the first terminal [S1306].

If a communication disconnection from the third terminal 300 is selected from the selection window, the second terminal 200 transmits a signal for announcing the communication disconnection to the first terminal 100.

If the signal for announcing the communication disconnection is received from the second terminal 200, the first terminal 100 disconnects the communication between the second terminal 200 and the third terminal 300 [S1307].

Meanwhile, if a short-range communication message is received from the second terminal 200 [S1306], the first terminal 100 converts the message content to a mobile communication audio signal using the text to speech converting unit 181 [S1308] and then transmits the converted mobile communication audio signal to the third terminal 300 [S1309].

In particular, the first terminal 100 converts the message content of the second terminal 200 to a speech call content and then transmits the speech call content to the third terminal 300. Therefore, a user of the third terminal 300 is able to make a speech call to the third terminal 300 through the first terminal 100.

If the mobile communication audio signal is received from the third terminal 300 [S310], the first terminal 100 converts the received mobile communication audio signal to a short-range communication message using the text to speech converting unit 181 [S1311] and then sends the converted short-range communication message to the second terminal 200 [S1312].

In particular, the first terminal 100 converts the speech call content of the third terminal 300 to a text message and then sends the text message to the second terminal 200. Therefore, a user of the second terminal 200 is able to perform a message communication with the third terminal 300 through the first terminal 100.

Alternatively, although the first terminal 100 converts the message of the second terminal 200 to the mobile communication audio signal in the step S1308, the second terminal 200 converts a message content written by a user to a mobile communication audio signal and is then able to transmit this mobile communication audio signal to the first terminal 100.

Accordingly, the present invention provides the following effects and/or advantages.

First of all, data of a first terminal is executable in a second terminal. And, all functions of the first terminal are usable using the second terminal.

Secondly, content information contained in a first terminal screen can be freely used by a second terminal.

Thirdly, a tripartite heterogeneous communication function can be provided to first to third terminals using a short-range communication system and a mobile communication system.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a first device and a second device, the method comprising:
    establishing communication between the first device and the second device;
    transmitting first data from the first device to the second device;
    receiving the first data by the second device;
    reproducing first screen information based on the first data on a screen of the second device;
    receiving, in the second device, an input signal for selecting content information in the first screen information reproduced on the screen of the second device;
    transmitting location information corresponding to the selected content information from the second device to the first device;
    receiving the location information and executing a function based on the location information in the first device;
    transmitting second data from the first device to the second device, wherein the second data is based on the executed function; and
    reproducing second screen information based on the second data on the screen of the second device,
    wherein the first data is related to contents displayed in the first device before receiving the location information from the second device,
    wherein the second data is related to contents displayed in the first device after receiving the location information from the second device and executing the function based on the location information from the second device,
    wherein the location information includes coordinate information,
    wherein the coordinate information is relative coordinates of the selected content information in the first screen information reproduced on the screen of the second device,
    wherein the establishing communication between the first device and the second device further comprises the first device searching for nearby devices to establish communication and to authenticate access, and
    wherein the establishing communication between the first device and the second device further comprises the second device receiving an authentication access request from the first device and the second device granting the authentication access request for sending and receiving information with the first device.

2. The method of claim 1, wherein the first device is a mobile device capable of wirelessly communicating with other display devices.

3. The method of claim 1, wherein the input signal is received via an input device adapted to move a cursor and select content from the first screen information.

4. A method of controlling a first device from a second device, the method comprising:
    establishing communication with the first device;
    receiving first data from the first device;
    reproducing first screen information based on the first data on a screen of the second device;
    receiving an input signal for selecting content information in the first screen information reproduced on the screen of the second device;
    transmitting location information corresponding to the selected content information to the first device for executing a function based on the location information in the first device;
    receiving second data from the first device, wherein the second data is based on the executed function; and
    reproducing second screen information based on the second data received from the first device on the screen of the second device,
    wherein the first data is related to contents displayed in the first device before receiving the location information from the second device,
    wherein the second data is related to contents displayed in the first device after receiving the location information from the second device and executing the function based on the location information from the second device,
    wherein the location information includes coordinate information, wherein the coordinate information is relative coordinates of the selected content information in the first screen information reproduced on the screen of the second device, wherein the establishing coomunication with the first device further comprises the second device receiving a communication request from the first device, and wherein the establishing communication with the first device further comprises the second device receiving an authentication access request from the first device and the second device granting the authentication access request for sending and receiving information with the first device.

5. The method of claim 4, wherein the input signal is received via an input device adapted to move a cursor and select content from the first screen information.

6. A second device comprising:

a wireless communication unit configured to establish communication with a first device, wherein the wireless communication unit is further configured to receive first data;

a display unit configured to reproduce first screen information based on the first data on a screen of the second device; and a control unit configured to receive an input signal for selecting content information and transmit location information corresponding to the selected content information to the first device for executing a function based on the location information in the first device, and receive second data from the first device, wherein the second data is based on the executed function;

wherein the control unit is further configured to control the display unit to reproduce second screen information based on the second data on the screen of the second device, wherein the first data is related to contents displayed in the first device before receiving the location information from the second device, wherein the second data is related to contents displayed in the first device after receiving the location information from the second device and executing the function based on the location information from the second device, wherein the location information includes coordinate information, wherein the coordinate information is relative coordinates of the selected content information in the first screen information reproduced on the screen of the second device, wherein the establishing communication with the first device further comprises the second device receiving a communication request from the first device, and wherein the establishing communication with the first device further comprises the second device receiving an authentication access request from the first device and the second device granting the authentication access request for sending and receiving information with the first device.

7. The second device of claim 6, wherein the wireless communication unit is further configured to establish communication with the first device and to transceive data with the first device.

8. The second device of claim 6, wherein the input signal is received via an input device configured to move a cursor and select content from first screen information.

9. A method of controlling a second device from a first device, the method comprising:

establishing communication with the second device;

transmitting first data from the first device to the second device for reproducing first screen information based on the first data on a screen of the second device;

receiving location information on content information selected from the second device and executing a function based on the received location information; and transmitting second data to the second device for reproducing second screen information based on the second data on the screen of the second device, wherein the second data is based on the executed function, wherein the first data is related to contents displayed in the first device before receiving the location information from the second device, wherein the second data is related to contents displayed in the first device after receiving the location information from the second device and executing the function based on the location information from the second device, wherein the location information includes coordinate information, wherein the coordinate information is relative coordinates of the selected content information in first screen information reproduced on a screen of the second device, wherein the establishing communication with the second device further comprises the first device searching for nearby devices to establish communication and to authenticate access, and wherein the establishing communication with the second device further comprises the first device transmitting an authentication access request to the second device for sending and receiving information with the second device.

10. The method of claim 9, wherein the first device is a mobile device configured to wirelessly communicate with other display devices.

11. A first device comprising:

a wireless communication unit configured to establish communication with a second device, wherein the wireless communication unit is further configured to transmit first data for reproducing first screen information based on the first data on a screen of a second device;

a display unit configured to display contents on a screen of the first device; and a control unit configured to receive location information from the second device and execute a function based on the received location information, wherein the control unit is further configured to transmit second data to the second device for reproducing second screen information based on the second data on the screen of the second device, wherein the second data is based on the executed function, wherein the first data is related to contents displayed in the first device before receiving the location information from the second device, wherein the second data is related to contents displayed in the first device after receiving the location information from the second device and executing the function based on the location information from the second device, wherein the location information includes coordinate information, wherein the coordinate information is relative coordinates of the selected content information in first screen information reproduced on a screen of the second device, wherein the establishing communication with the second device further comprises the first device searching for nearby devices to establish communication and to authenticate access, and wherein the establishing communication with the second device further comprises the first device transmitting an authentication access request to the second device for sending and receiving information with the second device.

12. The first device of claim 11, wherein the first device is a mobile device configured to wirelessly communicate with other display devices.

* * * * *